(12) United States Patent
Ishii et al.

(10) Patent No.: US 8,191,342 B2
(45) Date of Patent: Jun. 5, 2012

(54) RIDING LAWNMOWER VEHICLE

(75) Inventors: Norihiro Ishii, Hyogo (JP); Kengo Sasahara, Hyogo (JP); Kazunari Koga, Hyogo (JP); Jun Matsuura, Hyogo (JP); Tomoyuki Ebihara, Hyogo (JP); Katsumoto Mizukawa, Hyogo (JP)

(73) Assignee: Kanzaki Kokyukoki Manufacturing Company, Ltd. (JP)

( * ) Notice: Subject to any disclaimer, the term of this patent is extended or adjusted under 35 U.S.C. 154(b) by 185 days.

(21) Appl. No.: 12/107,354

(22) Filed: Apr. 22, 2008

(65) Prior Publication Data

US 2008/0264026 A1    Oct. 30, 2008

(30) Foreign Application Priority Data

Apr. 24, 2007   (JP) ................. 2007-114744
Apr. 24, 2007   (JP) ................. 2007-114745
Apr. 24, 2007   (JP) ................. 2007-114746

(51) Int. Cl.
*A01D 69/00* (2006.01)
(52) U.S. Cl. .................... 56/11.9; 56/320.1
(58) Field of Classification Search ............ 56/11.9, 56/320.1, 14.7
See application file for complete search history.

(56) References Cited

U.S. PATENT DOCUMENTS

| | | | |
|---|---|---|---|
| 3,732,671 A | | 5/1973 | Allen et al. |
| 4,042,055 A | * | 8/1977 | Ward ............................ 180/60 |
| 4,114,353 A | * | 9/1978 | Ansbaugh et al. ............ 56/13.3 |
| 4,899,525 A | * | 2/1990 | Takei et al. .................... 56/202 |
| 5,794,422 A | * | 8/1998 | Reimers et al. ............... 56/11.9 |
| 5,913,802 A | * | 6/1999 | Mullet et al. ................... 56/10.8 |
| 6,449,933 B1 | * | 9/2002 | Umemoto et al. ............. 56/13.3 |
| 6,591,593 B1 | | 7/2003 | Brandon et al. |
| 6,854,249 B1 | * | 2/2005 | Samejima et al. ............. 56/13.3 |
| 6,935,093 B2 | * | 8/2005 | Velke et al. .................... 56/15.2 |
| 6,948,299 B2 | | 9/2005 | Osborne |
| 7,017,327 B2 | | 3/2006 | Hunt et al. |
| 7,051,499 B2 | * | 5/2006 | Goto et al. ...................... 56/14.9 |
| 7,194,850 B2 | * | 3/2007 | Asahara et al. ................ 56/202 |

(Continued)

FOREIGN PATENT DOCUMENTS

EP          1943894 B1    5/2010

(Continued)

OTHER PUBLICATIONS

Notice of Grounds for Rejection for Japanese Patent Application No. 2007-114744 mailed Nov. 22, 2011, with English translation.

(Continued)

*Primary Examiner* — Alicia Torres
(74) *Attorney, Agent, or Firm* — Cantor Colburn LLP

(57) ABSTRACT

A riding lawnmower vehicle includes two main drive wheels, at least one caster wheel, an electric traction motor, an internal combustion engine, a generator driven by the internal combustion engine, and a lawnmower. The electric energy generated by the generator can be supplied directly or via an electric accumulator to the electric traction motor. The main drive wheels are independently driven by the electric traction motor, which can operate as a traction power source. When viewed from one end to the other end in the width direction of the vehicle, the internal combustion engine and a secondary battery operable as the electric accumulator overlap each other, and the main drive wheels overlap at least a part of at least one of the internal combustion engine, the generator, the secondary battery, a fuel cell, a capacitor, an inverter, a cooling device, a mower driving motor, and a grass-collecting duct.

2 Claims, 34 Drawing Sheets

U.S. PATENT DOCUMENTS

| | | |
|---|---|---|
| 7,389,847 B2 | 6/2008 | Sakikawa |
| 2001/0001170 A1* | 5/2001 | Velke et al. .................... 56/14.7 |
| 2004/0055266 A1 | 3/2004 | Reimers et al. |
| 2004/0112027 A1 | 6/2004 | Komorida et al. |
| 2006/0010844 A1* | 1/2006 | Angott ................................ 56/7 |

FOREIGN PATENT DOCUMENTS

| | | |
|---|---|---|
| GB | 2433867 A | 7/2007 |
| JP | 5-158534 A | 6/1993 |
| JP | 5-70230 U | 9/1993 |
| JP | 11-056059 A | 3/1999 |
| JP | 11-275927 A | 10/1999 |
| JP | 2004-283102 A | 10/2004 |
| JP | 2004-350475 A | 12/2004 |
| JP | 2005-153703 A | 6/2005 |
| JP | 2006-507789 A | 3/2006 |
| JP | 2006-325555 A | 12/2006 |
| WO | 2006-086412 A2 | 8/2006 |

OTHER PUBLICATIONS

Extended European Search Report for Application No./Patent No. 08004722.8-2313/1985487, dated Feb. 2, 2012.

Japanese Office Action, Notice of Grounds for Rejection for Japanese Patent Application No. 2007-114746 mailing date of Feb. 24, 2012 with English Translation.

Japanese Office Action, Notice of Grounds for Rejection for Japanese Patent Application No. 2007-114745 mailing date of Feb. 14, 2012 with English Translation.

* cited by examiner

RIDING LAWNMOWER VEHICLE

PRIORITY INFORMATION

The present invention claims priority from Japanese Patent Application No. 2007-114744, Japanese Patent Application No. 2007-114745, and Japanese Patent Application No. 2007-114746 all filed Apr. 24, 2007, which are hereby incorporated herein in their entirety.

BACKGROUND

1. Technical Field

A first aspect of the present invention relates to a riding lawnmower vehicle including main drive wheels that can be driven by a traction power source and a lawnmower. A second aspect of the present invention relates to a riding lawnmower vehicle that includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation amount of an operation unit, and a lawnmower. A third aspect of the present invention relates to a riding lawnmower vehicle including drive wheels that can be driven by an electric motor and a lawnmower.

2. Related Art

Conventional lawnmower vehicles including lawnmower can generally be classified into two types: walk behind lawnmower vehicles that a user operates from the rear, and riding lawnmowers vehicle that a user rides and operates. A conventional riding lawnmower vehicle includes main drive wheels that can be driven by a traction power source and a lawnmower. A user riding on a vehicle of this type can maneuver the lawnmower to cut lawn grass at a predetermined height.

As discussed in U.S. Pat. Nos. 7,017,327 or 6,591,593, an electrically driven riding lawnmower vehicle, related to the first or third aspect of the present invention, includes an engine, a generator driven by the engine, and an electric traction motor. The electric energy generated by the generator can be supplied to the electric traction motor operable to drive the two rear wheels (U.S. Pat. No. 7,017,327) or two front wheels (U.S. Pat. No. 6,591,593). This type of riding lawnmower vehicle can be referred to as a hybrid-type riding lawnmower vehicle.

According to the riding lawnmower vehicle discussed in U.S. Pat. No. 6,591,593, related to the first aspect of the present invention, a lawnmower is provided forward of two front wheels and two rear wheels.

Furthermore, as discussed in International Patent Publication No. 2006/086412, a riding lawnmower vehicle relating to the first or third aspect of the present invention includes two front wheels, one caster wheel (rear wheel), a fuel cell, and an electric traction motor. The electric energy generated by the fuel cell can be supplied to the electric traction motor operable to drive the two front wheels. Furthermore, a riding lawnmower vehicle discussed in U.S. Pat. No. 3,732,671 includes two front wheels, two rear wheels, a battery, and an electric traction motor operable to drive the two rear wheels when electric energy is supplied to the electric traction motor from the battery.

According to the riding lawnmower vehicle described in U.S. Pat. No. 3,732,671, a transaxle is provided between two rear wheels.

Furthermore, a conventional riding lawnmower vehicle relating to the second aspect of the present invention includes a front frame supporting front wheels, a rear frame supporting rear wheels, and an articulated-type turning mechanism that connects the front frame and the rear frame via a joint unit so that the vehicle body can twist. When the riding lawnmower vehicle includes such an articulated-type turning mechanism, an appropriate steering apparatus is provided to change the twist angle between the front frame and the rear frame when a user operates a steering wheel or a comparable operation unit.

According to the riding lawnmower vehicle discussed in U.S. Pat. No. 6,591,593, a forward vehicle body and a rear vehicle body are connected via a joint unit including a hitch arm/ball arrangement. An operator can ride on the forward vehicle body, while an engine, a generator, and an inverter are mounted on the rear vehicle body. The forward (front) vehicle body supports motor driven wheels. The rear vehicle body supports caster wheels.

The conventional lawnmower vehicles discussed in U.S. Pat. Nos. 6,591,593, 7,017,327, International Patent Publication No. 2006/086412, and U.S. Pat. No. 3,732,671 are related to the second aspect of the invention.

In all of the riding lawnmower vehicles discussed in U.S. Pat. Nos. 7,017,327, 6,591,593, International Patent Publication No. 2006/086412, and U.S. Pat. No. 3,732,671, which relate to the first aspect of the present invention, there is room for improvement in the manner in which the finite space available on the lawnmower vehicle is used; that is, the efficiency of use of the space can be improved in each of these vehicles. According to riding lawnmower vehicle discussed in U.S. Pat. No. 7,017,327, an engine is mounted on the front side of a driver's seat and a battery is located near the driver's seat positioned next to an inverter. The battery is largely offset from the engine in the longitudinal direction of the vehicle. Therefore, room for improvement is available should it be found necessary to increase the efficiency of use of space in the riding lawnmower vehicle be necessary.

Furthermore, a mower driving motor is directly set up on the lawnmower. Although the mower driving motor has a flat, circular "pancake" shape, the relationship between the overall axial length and the outer diameter is not restricted. Therefore, there is sufficient room for improvement if it is required to widen the space between the lawnmower and the vehicle body frame. There is sufficient room for improvement if it is required to enhance the efficiency of use of a limited space. Additionally, the lower end of the engine is positioned higher than a rotation center axis of rear wheels (drive wheels). Not only is the position of the centroid (and of the center of mass) relatively high but also the lower space of the vehicle can be effectively used. There is sufficient room for improvement if it is required to enhance the degree of effectively using a limited space.

With the riding lawnmower vehicle discussed in U.S. Pat. No. 6,591,593, there is sufficient room for improvement in the efficiency of use of a limited space of the vehicle including a battery is available, because the installation location of the battery is not restricted. Furthermore, in the arrangement of the mower driving motor positioned above a lawnmower blade, there is no restriction applied to the relationship between the overall axial length and the outer diameter. Therefore, a margin for improvement is available if it is necessary to widen the space between the lawnmower and the vehicle body frame. There is also a margin for improvement in the efficiency of use of a limited space. Furthermore, the disclosure of that publication includes no disclosure regarding the positional relationship between the lower end of the engine and the rotation center axis of the drive wheels (front wheels). As such, it is possible that the lower space of the vehicle may not be effectively used and that, thus, a margin for improvement in the efficiency of use of a limited space is available, if required.

According to the riding lawnmower vehicle discussed in International Patent Publication No. 2006/086412, all of the battery, the fuel cell, and the mower driving motor are offset from the front wheels (drive wheels) in the longitudinal direction of the vehicle. Thus, further improvement in the efficiency of use of the finite space available is possible. Furthermore, the related-art mower driving motor is located outside a lawnmower reel in the width direction of the vehicle and there is no description concerning the relationship between the overall axial length and the outer diameter in the arrangement of the mower driving motor. Therefore, still further improvement in the efficiency of use of the finite space available is possible. Furthermore, as there is no description regarding the positional relationship between the lower end of the battery (or the fuel cell) and the rotation center axis of the front wheels (drive wheels), the lower space of the vehicle may not be effectively used. Thus, still further improvement in the efficiency of use of the finite space available is possible.

According to the riding lawnmower vehicle discussed in U.S. Pat. No. 3,732,671, although the battery overlaps the rear wheels (drive wheels) in the width direction of the vehicle, the two rear wheels cannot be independently driven. Because the transaxle extends between two rear wheels, a large portion of the battery cannot be overlapped with the rear wheels when viewed from the side (one end to the other end in the width direction) of the vehicle. As such, improvement in the efficiency of use of the finite space available is possible. Furthermore, the mower driving motor is positioned above the lawnmower blade and has a rotational shaft extending in the vertical direction, and the overall axial length of the mower driving motor is longer than the outer diameter. Therefore, still further improvement in the efficiency of use of the finite space available is possible.

Furthermore, because the lower end of the battery is positioned higher than the rotation center axis of the rear wheels (drive wheels), the lower space of the vehicle may not be effectively used. Thus, still further improvement in the efficiency of use of the finite space available is possible. As described above, in the structure of any one of the above-described conventional riding lawnmower vehicles, improvement in the efficiency of use of the finite space available is possible.

Improvement in the efficiency of use of the finite space available on the mower is also possible in connection with the conventional riding lawnmower vehicle that includes an articulated-type turning mechanism connecting a front frame and a rear frame so that the vehicle body can twist, which relates to the second aspect of the present invention. For example, in the conventional riding lawnmower vehicle, the configuration of the relationship between a grass-collecting duct connecting the lawnmower to a grass storage tank and a power transmission mechanism capable of transmitting the driving force of the mower driving motor to the lawnmower can be improved to enhance the efficiency of use of a limited space. Furthermore, it is also possible to improve the power by improving its fuel efficiency or making it possible to use more common parts or components.

U.S. Pat. No. 6,591,593 contains no disclosure of the articulated-type turning mechanism applicable to a riding lawnmower vehicle. Furthermore, according to the riding lawnmower vehicle discussed in U.S. Pat. No. 6,591,593, improvement in the efficiency of use of the limited space is possible. Furthermore, there is room for improvement in use of common parts or components. As described above, the configuration of the riding lawnmower vehicle discussed in U.S. Pat. No. 6,591,593 can be significantly improved. The riding lawnmower vehicle discussed in any one of U.S. Pat. No. 7,017,327, International Patent Publication No. 2006/086412, and U.S. Pat. No. 3,732,671 does not include any articulated-type turning mechanism.

According to the above-described conventional riding lawnmower vehicle relating to the third aspect of the present invention, there is sufficient room for improvement in the cooling system for an electric motor. For example, the above-described conventional riding lawnmower vehicles may include various electric motors, such as electric motor operable to drive a wheel, electric motor operable to steer a caster wheel, and electric motor operable to drive a lawnmower. To assure sufficient performance, it is desired to appropriately cool respective electric motors because temperature of the electric motors are inclined to rise when they are used. In this respect, according to the above-described conventional riding lawnmower vehicles, there is sufficient room for improvement if it is required to cool the electric motor. If the riding lawnmower vehicle includes a control circuit unit and an inverter to drive an electric motor, there is sufficient room for improvement if it is required to cool the control circuit unit and the inverter. Furthermore, if the riding lawnmower vehicle includes a coolant piping in which coolant flows to cool an electric motor, there is sufficient room for improvement in the coolant piping.

SUMMARY

In a first aspect of the present invention, exemplary embodiments are directed to a riding lawnmower vehicle that can enhance the efficiency of use of the limited space available on a vehicle.

In a second aspect of the present invention, exemplary embodiments are directed to a riding lawnmower vehicle that includes an improved articulated vehicle body structure connecting a front frame and a rear frame so as to change a twist angle according to an operation of an operation unit.

In a third aspect of the present invention, exemplary embodiments are directed to a riding lawnmower vehicle that includes an improved cooling system for an electric motor.

According to the first aspect of the present invention, a riding lawnmower vehicle includes two main drive wheels, at least one caster wheel, an electric traction motor, an internal combustion engine, a generator driven by the internal combustion engine, and a lawnmower. Electric energy generated by the generator can be supplied directly or via an electric accumulator to the electric traction motor. At least the two main drive wheels are independently driven by the electric traction motor that can operate as a traction power source. When viewed from one end to the other end in the width direction (from one side) of the vehicle, the internal combustion engine and a secondary battery operable as the electric accumulator overlap each other, and the main drive wheels overlap at least a part of at least one of the internal combustion engine, the generator, the secondary battery, a fuel cell, a capacitor, an inverter, a cooling device, a mower driving motor, and a grass-collecting duct.

Furthermore, according to the first aspect of the present invention, a riding lawnmower vehicle includes two main drive wheels, at least one caster wheel, an electric traction motor, and a lawnmower. At least the two main drive wheels are independently driven by the electric traction motor, which can operate as a traction power source. When viewed from one end to the other end in the width direction (from one side) of the vehicle, the main drive wheels overlap at least a part of at least one of the secondary battery, a fuel cell, a capacitor, an inverter, a cooling device, a mower driving motor, and a grass-collecting duct.

Furthermore, according to the first aspect of the present invention, a riding lawnmower vehicle includes main drive wheels that can be driven by a traction power source, a lawnmower that can be driven by a mower driving motor, and a power transmission mechanism that can transmit the driving force of the mower driving motor to the lawnmower. The power transmission mechanism includes a plurality of power transmission shafts connected via universal coupling or a belt wound around at least two pulleys, and the mower driving motor is fixed to a vehicle body frame.

Furthermore, according to the first aspect of the present invention, it is preferable that the mower driving motor is positioned on the front side of a rotation center axis of the main drive wheels.

Furthermore, according to the first aspect of the present invention, a riding lawnmower vehicle includes main drive wheels that can be driven by a traction power source and a lawnmower that can be driven by a mower driving motor. A lower end of at least one of an internal combustion engine, a secondary battery, and a fuel cell is positioned at the same height as a rotation center axis of the main drive wheels, or positioned below the rotation center axis of the main drive wheels.

Furthermore, according to the first aspect of the present invention, it is preferable that two caster wheels are supported to a vehicle body frame on the rear side of the main drive wheels, and the lawnmower is positioned on the front side of the main drive wheels. When viewed from upside to downside (from the top) in the vertical direction of the vehicle, at least a part of at least one of the internal combustion engine, a generator, the secondary battery, the fuel cell, a capacitor, an inverter, and a cooling device is positioned between the two caster wheels in an area defined by a front end position and a rear end position where the caster wheels are reachable when rotating about vertical axes.

Furthermore, according to the first aspect of the present invention, it is preferable that a grass storage tank is provided on the rear side of a driver's seat, and the grass storage tank is connected to the lawnmower via a grass-collecting duct.

Furthermore, according to the first aspect of the present invention, it is preferable that at least one of the internal combustion engine, the generator, the secondary battery, the fuel cell, the capacitor, and the inverter is positioned under the grass storage tank.

Furthermore, according to the first aspect of the present invention, it is preferable that the lawnmower is connected to a grass storage tank via a grass-collecting duct, and the grass-collecting duct is overlapped with at least one the mower driving motor, the secondary battery, and the capacitor when viewed from one end to the other end in the width direction of the vehicle.

Furthermore, according to the first aspect of the present invention, it is preferable that a lawnmower driving apparatus drives the lawnmower, and a grass-collecting duct connects the lawnmower to a grass storage tank. At least one of the lawnmower driving apparatus and the grass-collecting duct is offset from the center of the vehicle in the width direction thereof.

Furthermore, according to the first aspect of the present invention, it is preferable that at least one of the inverter, a DC/DC converter, and a control circuit unit is disposed under a driver's seat.

Furthermore, according to the first aspect of the present invention, a riding lawnmower vehicle includes main drive wheels that can be driven by a traction power source and a lawnmower that can be driven by a mower driving motor. The overall axial length of the mower driving motor is shorter than an outer diameter of the mower driving motor. The mower driving motor is disposed on a deck constituting the lawnmower. The deck is positioned above a mower blade constituting the lawnmower, and the mower driving motor has a rotational shaft extending in the vertical direction.

Furthermore, according to the first aspect of the present invention, a riding lawnmower vehicle includes drive wheels that can be driven by a traction power source and a lawnmower that can be driven by a mower driving motor. The overall axial length of the mower driving motor is longer than an outer diameter of the mower driving motor. The mower driving motor is disposed on a deck constituting the lawnmower. The deck is positioned above a mower blade constituting the lawnmower, and the mower driving motor has a rotational shaft extending in the horizontal direction.

Furthermore, according to the first aspect of the present invention, it is preferable that a braking mechanism is provided for the mower driving motor.

Furthermore, according to the first aspect of the present invention, it is preferable that a deceleration device including at least one deceleration stage is provided in a power transmission mechanism that transmits the driving force of the mower driving motor to the mower blade.

Furthermore, according to the first aspect of the present invention, it is preferable that the mower driving motor is an electric type or a hydraulic type.

With a riding lawnmower vehicle according to the first aspect of the present invention, the efficiency and degree of flexibility of use of space on the vehicle can be improved. For example, a riding lawnmower vehicle includes two main drive wheels, at least one caster wheel, an electric traction motor, an internal combustion engine, a generator driven by the internal combustion engine, and a lawnmower, wherein electric energy generated by the generator can be supplied directly or via an electric accumulator to the electric traction motor, at least the two main drive wheels are independently driven by the electric traction motor that can operate as a traction power source, wherein when viewed from one end to the other end in the width direction of the vehicle, the internal combustion engine and a secondary battery operable as the electric accumulator overlap each other, and the main drive wheels overlap at least a part of at least one of the internal combustion engine, the generator, the secondary battery, a fuel cell, a capacitor, an inverter, a cooling device, a mower driving motor, and a grass-collecting duct.

According to this example, the riding lawnmower vehicle can include the two main drive wheels, the caster wheels, the electric traction motor, the internal combustion engine, the generator driven by the internal combustion engine, and the lawnmower. The electric energy generated by the generator can be supplied directly or via an electric accumulator to the electric traction motor. At least the two main drive wheels can be independently driven by the electric traction motor that can operate as a traction power source. Thus, the example riding lawnmower vehicle can eliminate or reduce an offset between the internal combustion engine and the secondary battery (electric accumulator) in the longitudinal direction of the vehicle. Furthermore, according to the example riding lawnmower vehicle, when viewed from one end to the other end in the width direction of the vehicle, the main drive wheels can be overlapped with part of at least one of the internal combustion engine, the generator, the secondary battery, the fuel cell, the capacitor, the inverter, the cooling device, the mower driving motor, and the grass-collecting duct. Thus, the example riding lawnmower vehicle can effectively use the inner space between the main drive wheels, can enhance the degree of effectively using a limited space, and can lower the centroid of the vehicle.

Furthermore, the riding lawnmower vehicle may alternatively include two main drive wheels, at least one caster wheel, an electric traction motor, and a lawnmower, wherein at least the two main drive wheels are independently driven by the electric traction motor that can operate as a traction power source, and when viewed from one end to the other end in the width direction of the vehicle, the main drive wheels are overlapped with part of at least one of the secondary battery, a fuel cell, a capacitor, an inverter, a cooling device, a mower driving motor, and a grass-collecting duct.

According to this example, the riding lawnmower vehicle can include the two main drive wheels, the caster wheel(s), the electric traction motor, and the lawnmower. At least the two main drive wheels can be independently driven by the electric traction motor that can operate as a traction power source. Furthermore, according to this example, when viewed from one end to the other end in the width direction of the vehicle, the main drive wheels can be overlapped with part of at least one of the secondary battery, the fuel cell, the capacitor, the inverter, the cooling device, the mower driving motor, and the grass-collecting duct. Thus, the example lawnmower vehicle can effectively use the inner space between the main drive wheels, can enhance the degree of effectively using a limited space, and can lower the centroid of the vehicle.

Furthermore, another riding lawnmower vehicle includes main drive wheels that can be driven by a traction power source, a lawnmower that can be driven by a mower driving motor, and a power transmission mechanism that can transmit the driving force of the mower driving motor to the lawnmower, wherein the power transmission mechanism includes a plurality of power transmission shafts connected via universal coupling or a belt wound around at least two pulleys, and the mower driving motor is fixed to a vehicle body frame.

According to this example, the mower driving motor can be fixed to the vehicle body frame. The mower driving motor can be offset from the lawnmower in the longitudinal direction of the vehicle. The space between the lawnmower and the vehicle body frame can be widened. The degree of effectively using a limited space can be enhanced. That is, while maintaining a wide space comparable to that of a conventional lawnmower vehicle, the vehicle body frame can be lowered and the lower space of the vehicle can be effectively used. As a result, this example can enhance the degree of effectively using a limited space of the vehicle. Furthermore, if the vehicle body frame can be lowered, the centroid of the vehicle can be lowered. This example lawnmower vehicle can use some of the parts (or components) used for a conventional riding lawnmower vehicle that includes a power transmission mechanism for transmitting the driving force of an internal combustion engine to a lawnmower. As a result, this example lawnmower vehicle can realize cost reduction.

Furthermore, another riding lawnmower vehicle includes main drive wheels that can be driven by a traction power source and a lawnmower that can be driven by a mower driving motor, wherein a lower end of at least one of an internal combustion engine, a secondary battery, and a fuel cell is positioned at the same height as a rotation center axis of the main drive wheels, or positioned below the rotation center axis of the main drive wheels. According to this example, the lower end of at least one of the internal combustion engine, the secondary battery, and the fuel cell can be positioned at the same height as, or below, the rotation center axis of the main drive wheels. Therefore, the centroid of the vehicle can be lowered and the lower space of the vehicle can be effectively used. As a result, the efficiency of use of the lower space of the vehicle can be enhanced.

Furthermore, another riding lawnmower vehicle includes main drive wheels that can be driven by a traction power source and a lawnmower that can be driven by a mower driving motor, wherein an overall axial length of the mower driving motor is shorter than an outer diameter of the mower driving motor, the mower driving motor is disposed on a deck constituting the lawnmower, the deck is positioned above a mower blade constituting the lawnmower, and the mower driving motor has a rotational shaft extending in the vertical direction. Moreover, the riding lawnmower vehicle may alternatively include drive wheels that can be driven by a traction power source and a lawnmower that can be driven by a mower driving motor, wherein the overall axial length of the mower driving motor is longer than an outer diameter of the mower driving motor, the mower driving motor is disposed on a deck constituting the lawnmower, the deck is positioned above a mower blade constituting the lawnmower, and the mower driving motor has a rotational shaft extending in the horizontal direction.

According to these examples, the upper end of the mower driving motor can be lowered even when the mower driving motor is disposed on the deck of the lawnmower. Therefore, the space between the deck of the lawnmower and the vehicle body frame can be widened, and the efficiency of use of the finite space on the vehicle can be further enhanced. More specifically, while maintaining a wide space comparable to that of a conventional lawnmower vehicle, the vehicle body frame can be lowered and the lower space of the vehicle can be effectively used. As a result, the efficiency of use of the lower space of the vehicle can be enhanced. Furthermore, if the vehicle body frame can be lowered, the centroid of the vehicle can be lowered.

According to the second aspect of the present invention, a riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, a lawnmower, a grass-collecting duct connecting a lawnmower to a grass storage tank, and a power transmission mechanism that can transmit the driving force of the mower driving motor to the lawnmower. The power transmission mechanism includes a plurality of power transmission shafts connected via universal coupling or a belt wound around at least two pulleys, and at least one of the grass-collecting duct and the power transmission mechanism is positioned between two front wheel drive motors that drive the front wheels.

Furthermore, according to the second aspect of the present invention, a riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation amount of an operation unit, and a lawnmower, wherein at least one of an internal combustion engine, a generator, a secondary battery, a fuel cell, a capacitor, and an inverter is fixed to the rear frame.

Furthermore, according to the second aspect of the present invention, it is preferable that at least one of the internal combustion engine, the generator, the secondary battery, and the fuel cell is positioned between the two rear wheels.

Furthermore, according to the second aspect of the present invention, it is preferable that the secondary battery is fixed to the front frame under a driver's seat.

Furthermore, according to the second aspect of the present invention, a riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, and a lawnmower, wherein a mower driving motor that drives the lawnmower is fixed to the front frame.

Furthermore, according to the second aspect of the present invention, a riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, a lawnmower, an electric traction motor, an internal combustion engine, and a generator driven by the internal combustion engine, wherein electric energy generated by the generator can be supplied directly or via an electric accumulator to the electric traction motor, the driving force of the internal combustion engine can be transmitted to the lawnmower via a power transmission mechanism, the power transmission mechanism includes an intermediate element having a power transmission rotational shaft with a pulley or a gear fixed thereto, two power transmission elements can transmit a rotational force via the intermediate element, and a swing center of the joint unit connecting the front frame to the rear frame is positioned coaxially with the power transmission rotational shaft.

Furthermore, according to the second aspect of the present invention, a riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, and a lawnmower, wherein an electric traction motor drives at least either the front wheels or the rear wheels.

Furthermore, according to the second aspect of the present invention, it is preferable that two independent electric traction motors drive at least either the front wheels or the rear wheels.

Furthermore, according to the second aspect of the present invention, it is preferable that at least either the front wheels or the rear wheels are driven by a common electric traction motor.

Furthermore, according to the second aspect of the present invention, it is preferable that either the front wheels or the rear wheels are driven by independent electric traction motors, and the rest of the front or rear wheels are driven by a common electric traction motor.

Furthermore, according to the second aspect of the present invention, in the arrangement that at least either the front wheels or the rear wheels are driven by a common electric traction motor or in the arrangement that either the front wheels or the rear wheels are driven by independent electric traction motors and the rest of the front or rear wheels are driven by a common electric traction motor, it is preferable that a single motor unit includes the common electric traction motor, a deceleration gear mechanism including at least one deceleration stage, and a differential gear mechanism, and the driving force of the common electric traction motor can be transmitted to the rear wheels or the front wheels via the deceleration gear mechanism and the differential gear mechanism.

Furthermore, according to the second aspect of the present invention, it is preferable that the differential gear mechanism includes a differential lock mechanism that can equalize the rotational speeds of the rear wheels or the front wheels.

Furthermore, according to the second aspect of the present invention, it is preferable that the differential gear mechanism includes a differential limiting mechanism that can generate a differential limiting force according to a rotational speed difference between the rear wheels or the front wheels or an input torque of the differential gear mechanism.

Furthermore, according to the second aspect of the present invention, it is preferable that an axle of the rear wheel or the front wheel is rotatably supported by a bearing fixed to the rear frame or the front frame.

Furthermore, according to the second aspect of the present invention, it is preferable that the common electric traction motor is offset from the center of the vehicle in the width direction thereof.

Furthermore, according to the second aspect of the present invention, it is preferable that the grass storage tank is provided on the rear side of a driver's seat, and the grass storage tank is connected to the lawnmower via the grass-collecting duct.

Furthermore, according to the second aspect of the present invention, it is preferable that at least one of the internal combustion engine, the generator, the secondary battery, the fuel cell, the capacitor, and the inverter is disposed under the grass storage tank.

Furthermore, according to the second aspect of the present invention, it is preferable that the lawnmower is connected to the grass storage tank via the grass-collecting duct, and the grass-collecting duct overlap at least one of the mower driving motor, the secondary battery, and the capacitor when viewed from one end to the other end in width direction of the vehicle.

Furthermore, according to the second aspect of the present invention, it is preferable that the lawnmower is connected to the grass storage tank via the grass-collecting duct, and at least a portion of the grass-collecting duct has a bellows-like configuration, and the grass-collecting duct extends rearward between the front wheels and upward between the rear side of a driver's seat upper side of the joint unit of the front frame and the rear frame.

Furthermore, according to the second aspect of the present invention, it is preferable that the lawnmower is connected to the grass storage tank via the grass-collecting duct, and the grass-collecting duct is configured at least partly into bellows and extends along a detour passing the outside of one of the front wheels and is connected to the grass storage tank.

Furthermore, according to the second aspect of the present invention, it is preferable that a lawnmower driving apparatus drives the lawnmower and a grass-collecting duct connects the lawnmower to the grass storage tank, wherein at least one of the lawnmower driving apparatus and the grass-collecting duct is offset from the center of the vehicle in the width direction thereof.

Furthermore, according to the second aspect of the present invention, it is preferable that at least one of the inverter, a DC/DC converter, and a control circuit unit is disposed under a driver's seat.

The riding lawnmower vehicle according to the second aspect of the present invention can improve the arrangement for connecting a front frame and a rear frame which cooperatively constitute an articulated vehicle body which can be changed a twist angle between the front frame and the rear frame according to an operation of an operation unit. For example, a riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, a lawnmower, a grass-collecting duct connecting a lawnmower to a grass storage tank, and a power transmission mechanism that can transmit the driving force of the mower driving motor to the lawnmower, wherein the power transmission mechanism includes a plurality of power transmission shafts connected via universal coupling or a belt wound around at least two pulleys, and at least one of the grass-collecting duct and the power transmission mechanism is positioned between two front wheel drive motors that drive the front wheels.

According to this example, the grass-collecting duct can be connected between the lawnmower and the grass storage tank. The power transmission mechanism can transmit the driving force of the mower driving motor to the lawnmower. The power transmission mechanism can include a plurality of power transmission shafts connected via universal coupling or a belt wound around at least two pulleys. At least one of the grass-collecting duct and the power transmission mechanism can be positioned between the front wheel drive motors that drive the front wheels. This example configuration makes it possible to more effectively use the space between two front wheels drive motors and can enhance the efficiency of use of the space on the vehicle. Furthermore, if the grass-collecting duct is positioned between two front wheels drive motors, the grass-collecting duct connecting the lawnmower and the grass storage tank can be configured into a nearly straight shape which is easy to collect the grass.

Furthermore, another riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, and a lawnmower, wherein at least one of an internal combustion engine, a generator, a secondary battery, a fuel cell, a capacitor, and an inverter is fixed to the rear frame. If the driver's seat is provided on the front frame, the space of the rear frame can be effectively used and the efficiency of use of the finite space on the vehicle can be enhanced.

Furthermore, another riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, and a lawnmower, wherein a mower driving motor that drives the lawnmower is fixed to the front frame. According to this example, the mower driving motor driving the lawnmower can be fixed to the front frame. The mechanism for driving the lawnmower is not provided on the rear frame. Thus, the degree of effectively using a limited space can be enhanced. The mower driving motor can be offset from the lawnmower in the longitudinal direction of the vehicle. The space between the lawnmower and the front frame can be widened. The efficiency of use of the finite space on the vehicle can therefore be further enhanced.

More specifically, while maintaining a wide space comparable to that of a conventional lawnmower vehicle, the front frame and the rear frame can be lowered and the lower space of the vehicle can be effectively used. As a result, the efficiency of use of the finite space on the vehicle can be enhanced. Furthermore, the centroid of the vehicle can be lowered if the front frame and the rear frame can be lowered. The example lawnmower vehicle can use some of the parts (or components) used for a conventional riding lawnmower vehicle that includes a power transmission mechanism for transmitting the driving force of an internal combustion engine to a lawnmower. As a result, cost of producing the example lawnmower vehicle can be reduced.

Furthermore, another example riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, a lawnmower, an electric traction motor, an internal combustion engine, and a generator driven by the internal combustion engine, wherein electric energy generated by the generator can be supplied directly or via an electric accumulator to the electric traction motor, the driving force of the internal combustion engine can be transmitted to the lawnmower via a power transmission mechanism, the power transmission mechanism includes an intermediate element having a power transmission rotational shaft with a pulley or a gear fixed thereto, two power transmission elements can transmit a rotational force via the intermediate element, and a swing center of the joint unit connecting the front frame and the rear frame is positioned coaxially with the power transmission rotational shaft.

According to this example, irrespective of any change in the twist angle, the distance between the intermediate element and the lawnmower does not change. Furthermore, the distance between the intermediate element and the internal combustion engine does not change. Therefore, the example lawnmower vehicle can use some of the parts or components used for a conventional riding lawnmower vehicle that includes a power transmission mechanism for transmitting the driving force of an internal combustion engine to a lawnmower. As a result, the cost of producing the example lawnmower vehicle can be reduced. Furthermore, if at least one of two power transmission elements is constituted by a belt wound around at least two pulleys, the lawnmower vehicle does not require any tension adjustment mechanism for maintaining the tension of the belt at a constant level. Furthermore, at least one of two power transmission elements can be constituted by a plurality of power transmission shafts connected via universal coupling.

Furthermore, another riding lawnmower vehicle includes a front frame supporting at least two front wheels, a rear frame supporting at least two rear wheels, a joint unit connecting the front frame and the rear frame which cooperatively constitute an articulated vehicle body, a steering apparatus changing a twist angle between the front frame and the rear frame according to an operation of an operation unit, and a lawnmower, wherein an electric traction motor drives at least either the front wheels or the rear wheels. According to this example, at least either the front wheels or the rear wheels can be driven by the electric traction motor. Thus, this configuration is advantageous if required to reduce consumption of fuel in the arrangement for changing the twist angle of the articulated vehicle body consisting of the front frame and the rear frame according to an operation of the operation unit.

According to the third aspect of the present invention, a riding lawnmower vehicle includes drive wheel(s) that can be driven by an electric motor, a lawnmower, and a cooling fan fixed on a rotational shaft of the electric motor.

Furthermore, according to the third aspect of the present invention, a riding lawnmower vehicle includes two drive wheels that can be driven by an electric motor, and a lawnmower, wherein the two drive wheels are driven by two electric motors, and a single coolant pump is provided to circulate coolant flowing in a coolant channel to cool respective electric motors.

Furthermore, according to the third aspect of the present invention, a riding lawnmower vehicle includes drive wheel(s) that can be driven by an electric motor, and a lawnmower, wherein the driving force of the electric motor can be transmitted to the drive wheels via a deceleration gear mechanism, the electric motor is cooled with oil or water, and lubricating oil or grease is stored in a sealed casing accommodating the deceleration gear mechanism.

Furthermore, according to the third aspect of the present invention, a riding lawnmower vehicle includes drive wheel(s) that can be driven by an electric motor, a lawnmower, an internal combustion engine, and a generator driven by the internal combustion engine, wherein electric energy generated by the generator can be supplied directly or via an electric accumulator to the electric motor, and the electric motor is cooled with cooling water supplied from a radiator for cooling the internal combustion engine.

Furthermore, according to the third aspect of the present invention, a riding lawnmower vehicle includes drive wheel(s) that can be driven by an electric motor, a lawnmower, and caster wheel(s) steerable about a vertical axis, wherein a cooling fin is provided outside a casing accommodating at least one of an electric steering motor operable to change the orientation of the caster wheel and an electric drive motor operable to drive the caster wheel.

Furthermore, according to the third aspect of the present invention, a riding lawnmower vehicle includes drive wheel(s) that can be driven by an electric motor, a lawnmower, and an electric mower driving motor operable to drive the lawnmower, wherein the electric mower driving motor is disposed in the stream of air for cooling flowing against a radiator or an oil cooler.

Furthermore, according to the third aspect of the present invention, a riding lawnmower vehicle includes drive wheel(s) that can be driven by an electric motor, and a lawnmower, wherein at least one of a control circuit unit and an inverter is cooled with coolant circulating for the electric motor.

Furthermore, according to the third aspect of the present invention, a riding lawnmower vehicle includes drive wheel(s) that can be driven by an electric motor, and a lawnmower, wherein a coolant piping of the coolant that cools the electric motor is disposed inside two vertical plate portions protruding from both lateral ends of a frame that supports the drive wheels.

The riding lawnmower vehicle according to the third aspect of the present invention can provide an improved cooling system for an electric motor. For example, a riding lawnmower vehicle includes drive wheels that can be driven by an electric motor, a lawnmower, and a cooling fan fixed on a rotational shaft of the electric motor. According to this configuration, the electric motor can be efficiently cooled with air for cooling flowing from the cooling fan fixed to the rotational shaft of the electric motor.

Furthermore, another riding lawnmower vehicle includes drive wheels that can be driven by an electric motor, and a lawnmower, wherein the drive wheels are driven by two electric motors, and a single coolant pump is provided to circulate coolant in a coolant channel to cool respective electric motors. According to this example, two electric motors can be efficiently cooled with the coolant because the electric motors are operable to drive the drive wheels and are commonly cooled with the coolant circulated by the single pump.

Furthermore, another example riding lawnmower vehicle includes drive wheels that can be driven by an electric motor, and a lawnmower, wherein the driving force of the electric motor can be transmitted to the drive wheels via a deceleration gear mechanism, the electric motor is cooled with oil or water, and lubricating oil or grease is stored in a sealed casing accommodating the deceleration gear mechanism. According to this example, the driving force of the electric motor can be transmitted to the drive wheels via a deceleration gear mechanism. The electric motor can be cooled with oil or water, and lubricating oil or grease is stored in a sealed casing accommodating the deceleration gear mechanism. Thus, the cooling oil or water for the electric motor is not used for the deceleration gear mechanism. The electric motor can be efficiently cooled.

Furthermore, another riding lawnmower vehicle includes drive wheels that can be driven by an electric motor, a lawnmower, an internal combustion engine, and a generator driven by the internal combustion engine, wherein electric energy generated by the generator can be supplied directly or via an electric accumulator to the electric motor, and the electric motor is cooled with coolant supplied from a radiator for cooling the internal combustion engine. According to this example, electric energy generated by the generator can be supplied directly or via the electric accumulator to the electric motor. Furthermore, the coolant supplied from the radiator to the internal combustion engine can be used to cool the electric motor. Thus, the coolant circuit circulating coolant and the associated radiator and the coolant pump can be commonly used for the internal combustion engine and the electric motor. Thus, the example lawnmower vehicle can reduce the total number of components and can realize cost reduction. Furthermore, the example lawnmower vehicle can reduce the total weight of the vehicle. Moreover, the example lawnmower vehicle can enhance the degree of effectively using a limited space of the riding lawnmower vehicle.

Furthermore, another example riding lawnmower vehicle includes drive wheels that can be driven by an electric motor, a lawnmower, and a caster wheel steerable about a vertical axis, wherein a cooling fin is provided outside a casing accommodating at least one of an electric steering motor operable to change the orientation of the caster wheel and an electric drive motor operable to drive the caster wheel. According to this example, at least one of the electric steering motor and the electric drive motor can be efficiently cooled because the cooling fin is provided outside the casing accommodating at least one of the electric steering motor operable to change the orientation of the caster wheel and the electric drive motor operable to drive the caster wheel.

Furthermore, another riding lawnmower vehicle includes drive wheels that can be driven by an electric motor, a lawnmower, and an electric mower driving motor operable to drive the lawnmower, wherein the electric mower driving motor is disposed in the stream of air for cooling flowing against a radiator or an oil cooler. According to this example, the electric mower driving motor operable to drive the lawnmower can be efficiently cooled because the electric mower driving motor operable to drive the lawnmower is disposed in the stream of air for cooling flowing against the radiator or the oil cooler.

Furthermore, another riding lawnmower vehicle includes drive wheels that can be driven by an electric motor, a lawnmower, wherein at least one of a control circuit unit and an inverter is cooled with coolant circulating for the electric motor. According to this example, at least one of the control circuit unit and the inverter can be efficiently cooled because at least one of the control circuit unit and the inverter is cooled with coolant circulating for the electric motor. This example can provide an improved cooling system for the electric motor.

Furthermore, another riding lawnmower vehicle includes drive wheels that can be driven by an electric motor, and a lawnmower, wherein a coolant piping of the coolant that cools the electric motor is disposed inside two vertical plate portions protruding from both lateral ends of a frame that supports the drive wheels. According to this example, the degree of effectively using a limited space of the riding lawnmower vehicle including a coolant piping can be enhanced because the coolant piping of the coolant for the electric motor is disposed inside two vertical plate portions protruding from both lateral ends of the frame that supports the drive wheels. Furthermore, this example can effectively prevent the coolant piping from being damaged. As described above, the riding lawnmower vehicle according to the third aspect of the present invention can provide an improved cooling system for an electric motor.

DESCRIPTION OF EXEMPLARY EMBODIMENTS

First Exemplary Embodiment

Figure 1:
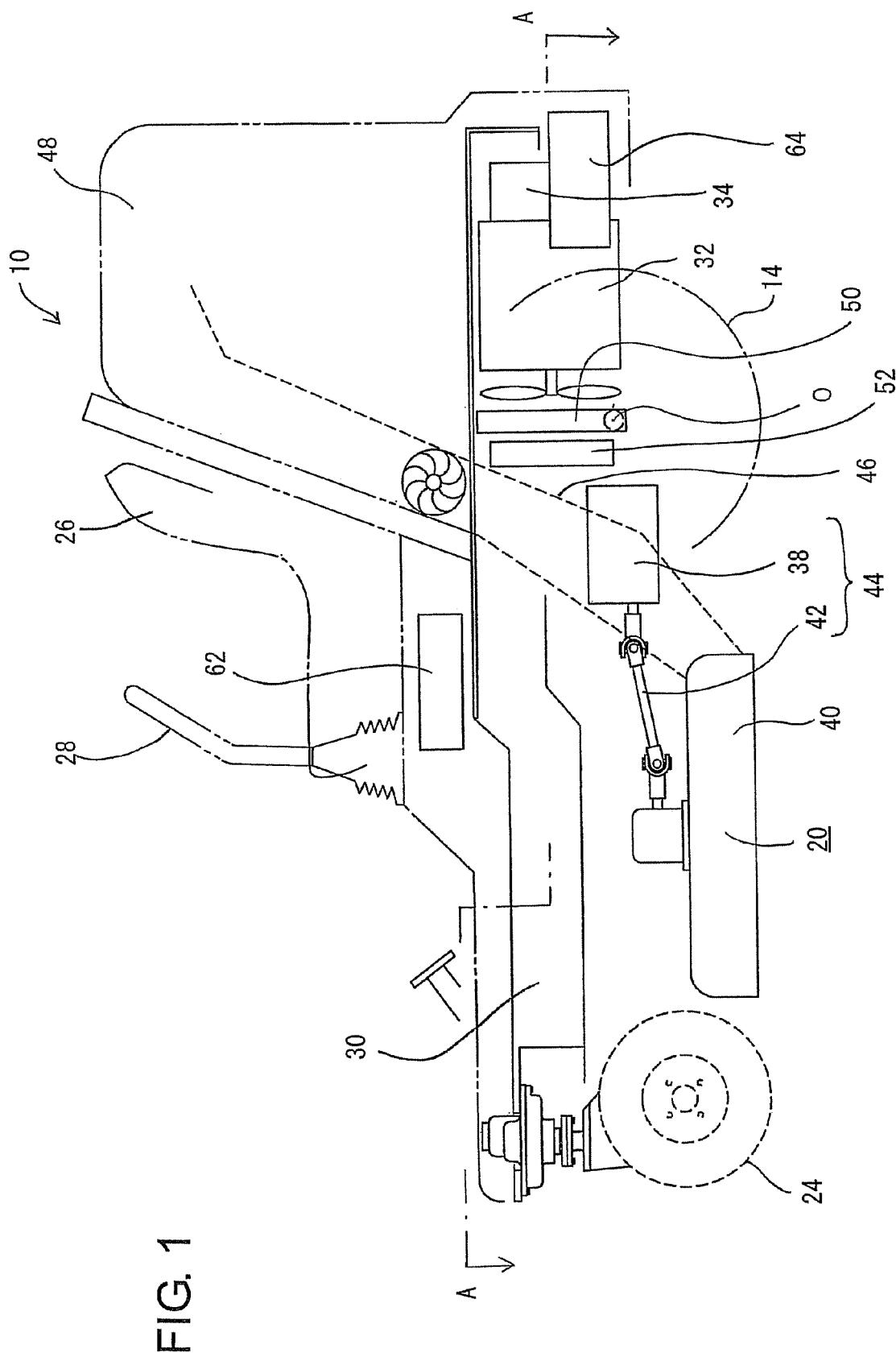
FIG. 1 illustrates a schematic diagram of configuration of a lawnmower vehicle according to a first exemplary embodiment of the present invention.
Figure 2:
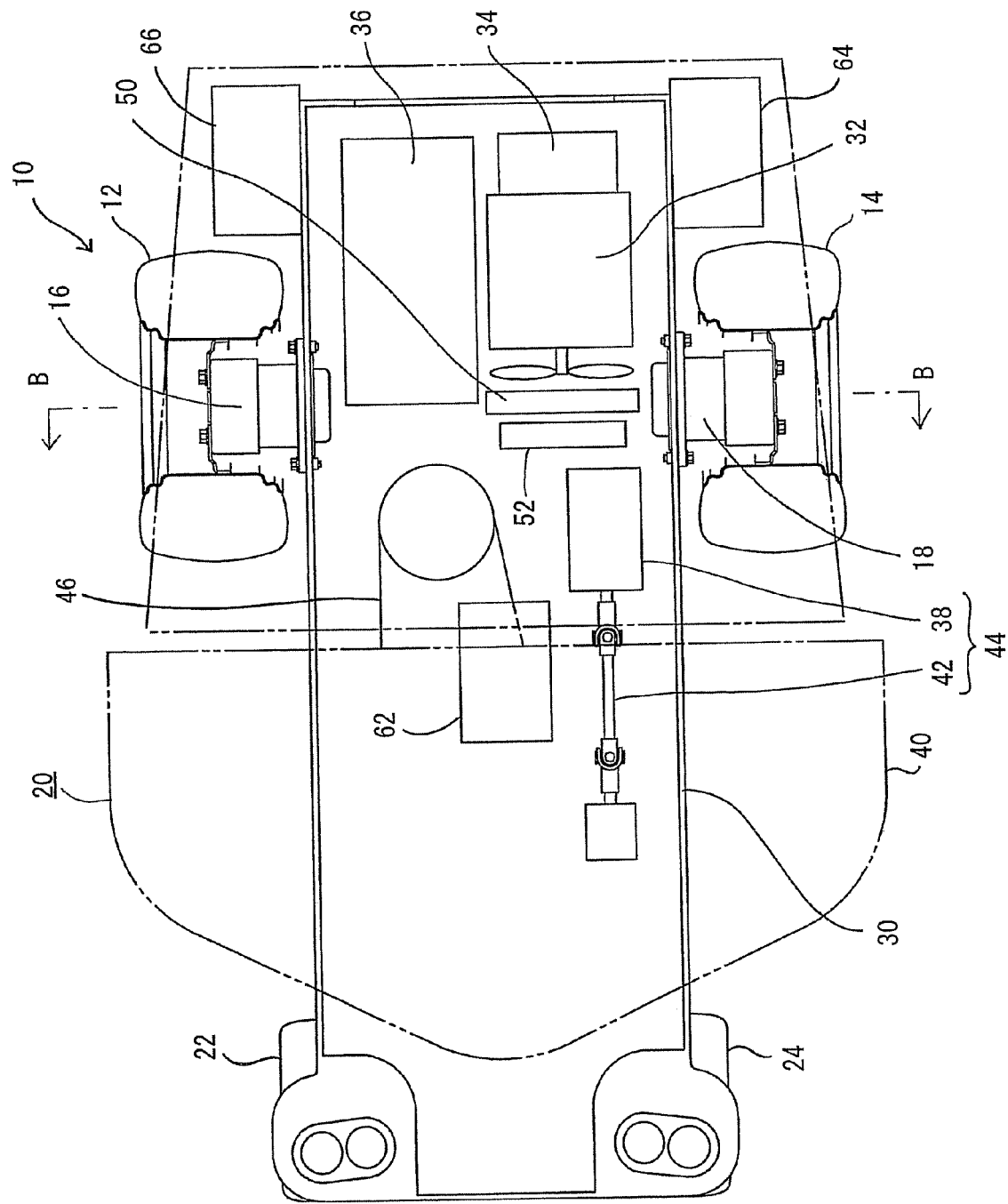
FIG. 2 illustrates a cross-sectional view substantially taken along a line A-A of FIG. 1.

In the following, a first exemplary embodiment according to the present invention that relates to a first aspect is described in detail using the drawings. FIG. 1 and FIG. 2 are views that illustrate the first embodiment. FIG. 1 is a schematic illustration that shows the configuration of a lawnmower vehicle 10 as a riding lawnmower vehicle of the present embodiment. FIG. 2 is a cross sectional view substantially along the line A-A shown in FIG. 1. In the following description, the expression "front" and "rear" accords with front and rear of a vehicle (refer to left and right in FIGS. 1 and 2). A lawnmower vehicle according to an exemplary embodiment includes two (right and left) rear wheels operable as main drive wheels and two (right and left) front wheels operable as caster wheels. However, according to a modified embodiment, the lawnmower vehicle can be configured as a 3-wheel lawnmower vehicle including only one caster wheel. Furthermore, in the following description, an electric power supply source for an electric motor is a secondary battery although the secondary battery can be replaced with a capacitor.

Furthermore, the function of an electric motor operable to drive wheel(s) is not limited to transmitting a rotational driving force to at least the main drive wheel(s) when electric power is supplied. The electric motor also may function as an electric generator that can recover regenerative energy when braking force is applied to at least main drive wheel(s). Still further, hereafter an electric motor power supply source is considered to be a power supply unit that is a storage unit or a secondary battery and a so-called hybrid riding lawnmower that uses an engine and an electricity generator as power supply sources for the power supply unit is described. The power supply unit may be a secondary battery that may be charged from an external power source, or may be a unit having self-electricity generating function, such as a fuel cell or a solar battery. It may, for example, be preferable to provide a power generation panel for a solar battery on a lawnmower vehicle body, fender, sun visor, grass storage tank, or the like.

A lawnmower vehicle 10 (generally referred to as "ZTR-type") includes two (right and left) main drive wheels (rear wheels in the illustrated example) 12 and 14 which can be independently driven by two electric motors, i.e., a first electric motor (right axle motor) 16 and a second electric motor (left axle motor) 18, as illustrated in FIGS. 1 and 2. The lawnmower vehicle 10 comprises a mower 20 (lawnmower) as a working machine and travels over the ground surface using the two (right and left) main drive wheels 12 and 14 and two caster wheels 22 and 24 on the right and left. In the vicinity of a driver's seat 26, on which the operator sits, are provided operating levers 28 as an operation unit with two levers. The operating levers 28 are collectively a two lever-type operator in which two levers are provided separately from each other in the right and left directions for turning, accelerating, and decelerating the lawnmower vehicle 10. In FIG. 1, only one of the two operating levers 28 is illustrated. Further, although not illustrated in FIG. 1 or FIG. 2, operation units, such as a starting switch that is a separate operation unit for operating the mower 20 or a brake pedal for executing a brake operation of the lawnmower vehicle 10 and a parking brake lever comprising a mechanical brake for maintaining a stopped state, are also provided in the vicinity of the driver's seat 26.

The lawnmower vehicle 10 comprises a main frame 30 that constitutes the vehicle body, an engine 32, which an internal combustion engine, supported on the main frame 30, an electric generator 34 that is operatively coupled with an output shaft of the engine 32, i.e. a drive shaft thereof is operatively coupled to the output shaft, and a secondary battery 36 that stores electric power supplied with electric power from the electric generator 34 (see FIG. 2). For example, a drive shaft comprising the electricity generator 34 is coupled to an end of the output shaft of the engine 32, or the output shaft of the engine 32 and a drive shaft of the electricity generator 34 are configured in an integrated manner using a common shaft. A configuration can also be adopted in which a drive pulley is fixed to the end of an output shaft of the engine 32, and the electricity generator 34 is driven by the engine 32 via this drive pulley, a belt, and a driven pulley that is fixed to the drive shaft of the electricity generator 34. The first electric motor 16 and the second electric motor 18 are driven by electric power that is supplied from the secondary battery 36. A casing accommodating the first electric motor 16 and a casing accommodating the second electric motor 18 are fixed to a main frame 30.

Further, at a portion near the rear of the main frame 30 (near the right side in FIG. 1 and FIG. 2), the right and left main drive wheels 12 and 14 (top and bottom of FIG. 2) are supported, and at a portion divided among the right and left sides (top and bottom of FIG. 2) at the front end of the main frame 30 (left side end in FIG. 1 and FIG. 2), right and left caster wheels 22 and 24 are supported. The mower 20 is provided between the main drive wheels 12 and 14 and the caster wheels 22 and 24 with respect to the front to rear direction of the main frame 30 (left to right direction of FIG. 1 and FIG. 2). The mower 20 is operatively coupled with a mower driving motor 38 as a power source for driving the mower 20. A mower driving motor 38 is fixed to the main frame 30 illustrated in FIG. 1, at a position lower than a horizontal plate constituting the main frame 30. Furthermore, the mower driving motor 38 is positioned on the rear side (i.e., right side in FIG. 1) of a deck 40 (i.e., a cover of a mower 20) in the longitudinal direction of the lawnmower vehicle 10 (i.e., in the right-and-left direction in FIG. 1). Furthermore, the mower driving motor 38 is positioned on the front side (i.e., left side in FIG. 1) of a rotation center axis O of the main drive wheels 12 and 14.

The mower driving motor 38 is, for example, an electric motor or a hydraulic motor. According to the illustrated example, a power transmission mechanism 42 is provided between the mower driving motor 38 and the mower 20. The mower 20 includes one or more mower blades which can rotate around a vertical axis supported in the deck 40 (although not illustrated in FIGS. 1 and 2). The power transmission mechanism 42 can transmit the driving force of the mower driving motor 38 to the mower 20. The power transmission mechanism 42 includes a plurality of power transmission shafts connected via universal coupling. That is to say, the section between the mower driving motor 38 and the mower 20 is operatively coupled, i.e. in a manner enabling transmission of power, by the power transmission mechanism 42. The mower driving motor 38 and the power transmission mechanism 42 constitute a mower driving apparatus 44.

The height of the mower 20 can be adjusted by a working machine lifting actuator (not shown). If a working machine lifting actuator includes a hydraulic cylinder, an electric motor or an engine 32 can drive a hydraulic pump (i.e., a hydraulic source) that supplies pressure oil to the hydraulic cylinder. Further, a discharge duct 46, that is a grass-collecting duct, for discharging grass that is mowed to the rear of the vehicle is connected to the mower 20. The discharge duct 46 extends diagonally upward along the rear of the driver's seat 26, and the top part thereof is connected to a grass storage tank 48 (a grass storage container) that is provided on the rear side of the driver's seat 26. A middle section of the discharge duct 46 extends diagonally in the vertical direction so as to pass through a hole provided in a horizontal plate portion constituting the main frame 30. A grass storage tank 48 (i.e., a grass storage tank) is connected, via a discharge duct 46, to the mower 20 (i.e., a rear end portion of the deck 40 of the mower 20). The mower blade can, for example, be configured to include a steel wire or a resin-made (e.g., polyamide resin) wire at its head end portion.

With a mower according to this configuration, an operator can smoothly cut lawn grass using the rapidly spinning wire protruding laterally from the deck 40. The energy consumption of the mower 20 can be reduced. Furthermore, a deceleration device including a deceleration mechanism (e.g., a gear mechanism including at least one deceleration stage) can be provided in the power transmission mechanism 42 that transmits the driving force of the mower driving motor 38 to the drive shaft of the mower blade.

The mower driving motor 38 and the discharge duct 46 overlap each other when viewed from one end to the other end in the width direction of the lawnmower vehicle 10 (i.e., from the front to the rear in FIG. 1, or from downside to upside in FIG. 2). Furthermore, the discharge duct 46 may overlap the mower driving motor 38 or at least one of a secondary battery 36 (FIG. 2) and a capacitor (not illustrated) when the lawnmower vehicle 10 is viewed in the width direction from one end to the other end.

Furthermore, as illustrated in FIG. 2, both the mower driving apparatus 44 and the discharge duct 46 are offset from the center of the lawnmower vehicle 10 in the width direction thereof (i.e., in the up-and-down direction in FIG. 2). Alternatively, only one of the mower driving apparatus 44 and the discharge duct 46 can be offset from the center of the lawnmower vehicle 10 in the width direction thereof.

As illustrated in FIG. 2, the engine 32, a generator 34, and the secondary battery 36 are positioned on the rear side of the discharge duct 46 under the flat horizontal plate constituting the main frame 30. Thus, the discharge duct 46 does not interfere with the engine 32, a generator 34, and the secondary battery 36. More specifically, the engine 32, the generator 34, and the secondary battery 36 are positioned under the grass storage tank 48 (FIG. 1). The engine 32 and the secondary battery 36 have a lower end positioned at the same height as, or below, the rotation center axis O (FIG. 1) of the main drive wheels 12 and 14.

Furthermore, the secondary battery 36 (FIG. 2) can be configured to be easily detachable from the main frame 30 or a member fixed to the main frame 30 by means of a clamp or the like. If at least one of a capacitor and a fuel cell is provided together with the secondary battery 36, or if the secondary battery 36 is replaced by at least one of a capacitor and a fuel cell, at least one of the capacitor and the fuel cell can be configured to be easily detachable from the main frame 30 or a member fixed to the main frame 30 by means of a clamp or the like.

The engine 32 according to this embodiment is smaller than a typical engine provided to a general lawnmower vehicle that can generate a sufficient power to drive main drive wheels without using any electric motor (i.e., a non-hybrid type). A fuel tank (capable of storing gasoline) according to this embodiment is also smaller than a typical fuel tank provided to a general lawnmower vehicle.

Similarly, at least one of the engine 32, the generator 34, the secondary battery 36 (FIG. 2), the fuel cell, the capacitor, and an inverter can be positioned under the grass storage tank 48 (FIG. 1). The engine 32 and the secondary battery 36 appear to overlap when viewed from one end to the other end in the width direction of the vehicle. Furthermore, the main drive wheels 12 and 14 overlap some part or the whole of the engine 32, the secondary battery 36, a radiator 50 (cooling device), an oil cooler 52 (cooling device), the mower driving motor 38, and the discharge duct 46 when viewed from one end to the other end in the width direction of the vehicle. The radiator 50 is capable of cooling a coolant fluid returning from the engine 32, to which it is re-supplied. The oil cooler 52 can cool lubrication oil supplied to and returning from to the engine 32, or cools cooling oil supplied to and returning from the electric motors 16 and 18.

In this embodiment, the mower driving motor 38 can be positioned in the stream of air for cooling flowing against the radiator 50 and the oil cooler 52. For example, the mower driving motor 38 can be positioned in front of the radiator 50 and the oil cooler 52 so that the mower driving motor 38 can be cooled by the air for cooling flowing against the radiator 50 and the oil cooler 52 when the vehicle travels. According to this arrangement, the mower driving motor 38 can be efficiently cooled. It is also possible to dispose the mower driving motor 38 in the stream of air for cooling flowing against at least one of the radiator 50 and the oil cooler 52.

Figure 3:
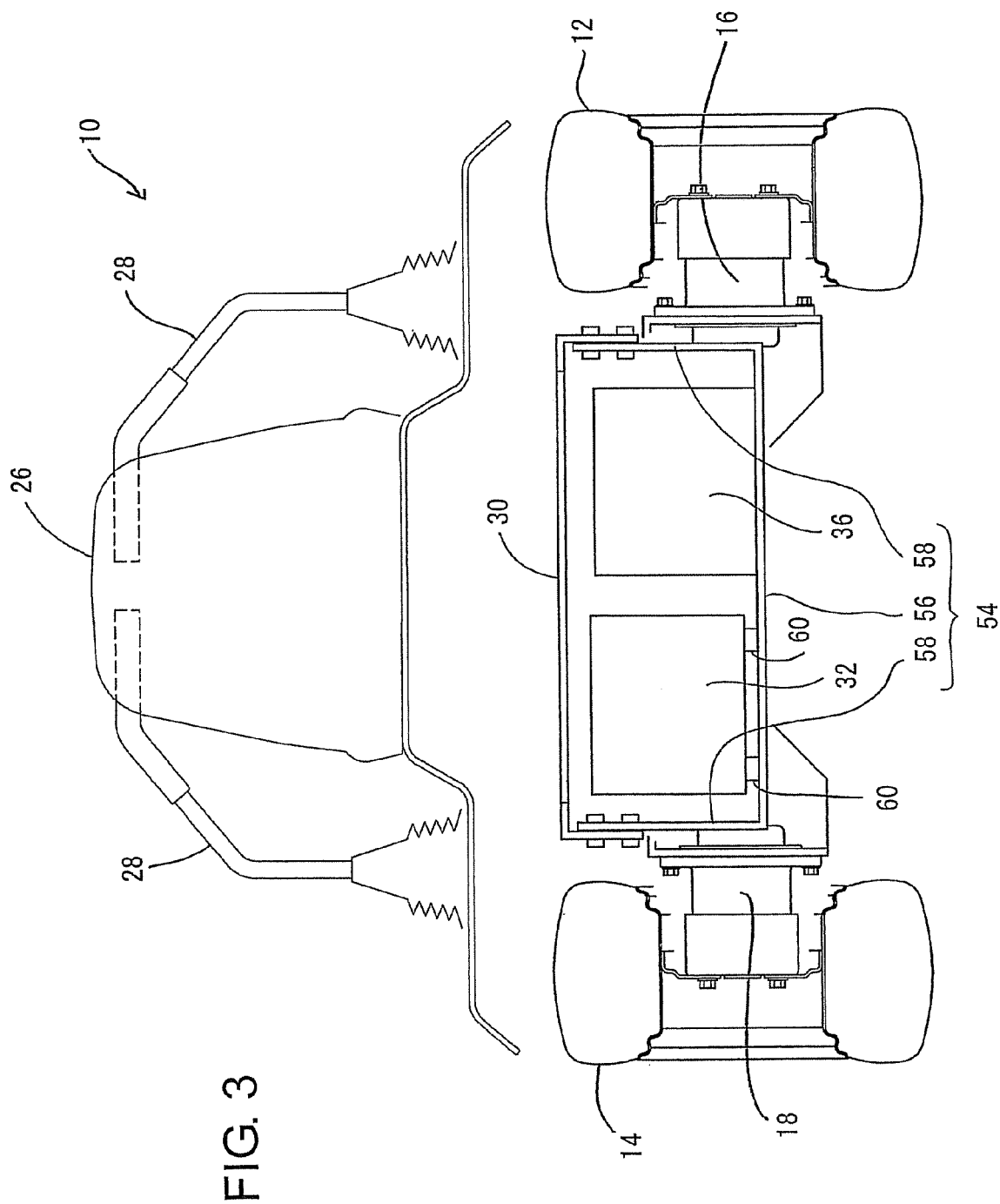
FIG. 3 illustrates an example supporting structure for an engine and a secondary battery in the lawnmower vehicle according to the first embodiment, corresponding to a cross-sectional view taken along a line B-B of FIG. 2.

FIG. 3 illustrates an example structure capable of fixing the engine 32 and the secondary battery 36 to the main frame 30, corresponding to a cross-sectional view taken along a line B-B of FIG. 2. According to the example illustrated in FIG. 3, a lower frame 54 is fixed to the main frame 30 under the main frame 30. The lower frame 54 includes a support plate 56 and a pair of wall plates 58. The engine 32 and the secondary battery 36 are fixed on the support plate 56 so that the engine 32 and the secondary battery 36 overlap each other when viewed from one end to the other end in the width direction of the vehicle (i.e., from left to right in FIG. 3). The engine 32 is fixed to the support plate 56 via a vibration-insulation material 60.

Referring again to FIG. 2, motor control units 62, 64 and 66 can control operations of various constituent components (including the secondary battery 36, the first electric motor 16, and the second electric motor 18). The motor control units 62, 64 and 66 are set at appropriate positions on an upper surface side or a lower surface side of the main frame 30. The motor control units 62, 64, and 66 include a controller (i.e., a control circuit unit), an inverter, and a DC/DC converter. In the example shown in FIG. 1 and FIG. 2, the motor control unit 62, 64, and 66 are arranged such that they are distributed among a total of three locations, consisting of one position under the driver's seat 26 on top of the main frame 30, and two positions near the first electric motor 16 and the second electric motor 18 on the bottom of the main frame 30. The motor control unit 62, 64, and 66 may be connected to each other with a suitable signal cable or the like. In such a case, driver circuits which comprise inverter, DC/DC convertor or the like that are used for the first electric motor 16 and the second electric motor 18 are principally disposed in the motor control units 64 and 66 that are disposed at positions close to the first electric motor 16 and the second electric motor 18, and a control logic circuit which comprises a CPU or the like is principally disposed in the motor control unit 62 that is disposed at a position close to the driver's seat 26. Here, the motor control units 62, 64, and 66 can also be integrated at one or two positions.

Furthermore, when the controller is positioned under the driver's seat 26, at least one of the DC/DC converter and the inverter can also be disposed under the driver's seat 26. Alternatively, the controller can be replaced by at least one of the DC/DC converter and the inverter. Furthermore, it is possible to dispose the controller and the driver circuit in the motor control unit 62 under the driver's seat 26, while the capacitor can be disposed in one of or both of the motor control units 64 and 66.

The first electric motor 16 and the second electric motor 18 drive the two main drive wheels 12 and 14, respectively, by driving a rotary shaft. The two electric motors 16 and 18 enable rotational driving in both the forward and reverse directions that is a DC brushless motor or the like. It is also possible to control the number of revolutions per unit time of the two electric motors 16 and 18.

The motor control units 62, 64 and 66 include a first electric motor driving circuit and a second electric motor driving circuit. For example, the first electric motor driving circuit drives the first electric motor 16 according to a control signal supplied from a central processing unit (CPU) which corresponds to the state of an operating lever. As feedback from the first electric motor 16, signals representing rotational speed (number of revolutions per unit time), rotational direction, current value, and the like are sent to the motor control units 62, 64 and 66. Furthermore, an electrically driven braking unit (not illustrated) that applies a braking force to the right main drive wheel 12 (FIG. 2) is provided at an appropriate portion corresponding to the first electric motor 16. The motor control units 62, 64 and 66 generate a control signal supplied to the braking unit. The electric energy generated by the generator 34 can be supplied directly or via the secondary battery 36 to the first electric motor 16.

Similar to the first electric motor driving circuit, the second electric motor driving circuit drives the second electric motor 18 according to a control signal supplied from the CPU. The first electric motor 16 and the second electric motor 18 can generate electric power (i.e., can operate as a generator) when the main drive wheels 12 and 14 are decelerated under application of a braking force. The electric energy generated by the first and second electric motors 16 and 18 can be stored via corresponding electric power regeneration unit(s) into the secondary battery 36.

The secondary battery 36 has a function of storing electrical energy and, as necessary, supplying electrical power to a load of the electric motors 16 and 18 and the like. A lead storage battery, lithium ion battery pack, nickel hydrogen battery pack, or the like can be used as the secondary battery 36.

For example, the mower driving motor 38 (i.e., power source for the mower 20) receives electric energy from the secondary battery 36. The operation of the mower driving motor 38 is controlled by turning a mower starting switch (not shown) provided near the driver's seat 26 on or off. For example, the motor control units 62, 64, and 66 detect the on/off state of the mower starting switch and, based on that detection, control the operations of circuits for driving the mower driving motor 38 to activate or stop the mower driving motor 38. If the mower driving motor 38 is an electric motor, the mower driving motor 38 can drive the mower 20 when the engine 32 is stopped. A user can then operate the mower while producing less noise.

Furthermore, two caster wheels 22 and 24 can freely rotate (i.e., can enable free steering) about a vertical axis. When the vehicle causes a turning motion based on a rotational speed difference between the right and left electric motors 16 and 18, the caster wheels 22 and 24 automatically face their orientations to a corresponding direction. If a dedicated electric motor is provided for the caster wheels 22 and 24, the caster wheels 22 and 24 can be forcibly steered by the electric motor. Furthermore, if an appropriate switching mechanism is provided, an operator can select between free steering and forcible steering for the caster wheels 22 and 24 by inputting a user's instruction via a switch or the like of an operating unit. When an electric motor is provided for forcibly steering the caster wheels 22 and 24 (FIG. 2), it may be preferable to operate this electric motor in accordance with the operation of the electric motors 16 and 18 (i.e., driving sources for the main drive wheels 12 and 14).

When an operator maneuvers right and left operating levers 28 to turn or accelerate the lawnmower vehicle 10, two electric motors 16 and 18 corresponding to the main drive wheels 12 and 14 (FIG. 2) start operating according to a signal from an operating amount sensor. When an operator moves the right and left operation levers 28 (FIG. 1) in the front-and-rear direction, various motions (e.g., turning, acceleration, and deceleration) of the vehicle can be realized by driving the electric motors 16 and 18 corresponding to the main drive wheels 12 and 14.

Furthermore, according to the above-described lawnmower vehicle 10, if the right and left main drive wheels 12 and 14 rotate in the opposite directions at the same speed, the vehicle body causes a spin turn or a stationary turn in either the right or left direction. More specifically, when the turning center is positioned on the center between setup positions of the right and left main drive wheels 12 and 14, the vehicle body causes a turning motion in either the right or left direction.

If two caster wheels 22 and 24 are configured to be driven by electric traction motors (not illustrated), the configuration corresponding to the first electric motor driving circuit and the second electric motor driving circuit can be provided for driving the caster wheels 22 and 24. Furthermore, a system configuration corresponding to the first electric motor 16 and the second electric motor 18 as well as the braking units for the electric motors 16 and 18 can be provided. According to the above-described lawnmower vehicle 10, at least two main drive wheels 12 and 14 can be independently driven by the first electric motor 16 and the second electric motor 18 (i.e., traction power source).

In the above-described lawnmower vehicle 10, the engine 32 and the secondary battery 36 overlap each other when viewed from one end to the other end in the width direction of the vehicle (i.e., from front to the rear in FIG. 1, or from downside to upside in FIG. 2). Furthermore, when viewed from one side of the vehicle, the main drive wheels 12 and 14 overlap a part or the whole of the engine 32, the secondary battery 36, the radiator 50 (cooling device) and the oil cooler 52 (cooling device), the mower driving motor 38, and the discharge duct 46. The lawnmower vehicle 10 includes two main drive wheels 12 and 14, two caster wheels 22 and 24, two electric traction motors 16 and 18, engine 32, the generator 34 driven by the engine 32, and the mower 20. The electric energy generated by the generator 34 can be supplied directly or via the secondary battery 36 to the electric traction motors 16 and 18. The main drive wheels 12 and 14 are independently driven by the traction power of the electric traction motors 16 and 18. Thus, the lawnmower vehicle 10 can reduce or completely eliminate the displacement of the engine 32 and the secondary battery 36 in the longitudinal direction of the vehicle (i.e., in the length direction).

Furthermore, when viewed from one end to the other end in the width direction of the lawnmower vehicle 10, the main drive wheels 12 and 14 overlap some portion of the engine 32, the secondary battery 36, the radiator 50, the oil cooler 52, the mower driving motor 38, and the discharge duct 46. Therefore, the inner space between the main drive wheels 12 and 14 can be effectively used. As a result, the efficiency of use of the limited space of the vehicle can be enhanced. Furthermore, the centroid of the lawnmower vehicle 10 can be lowered. In another embodiment, the main drive wheels 12 and 14 can overlap at least a portion of at least one of the generator 34, a fuel cell, a capacitor, and an inverter when viewed from one end to the other end in the width direction of the vehicle.

Furthermore, in this embodiment, the mower driving motor 38 is fixed to the main frame 30. The mower driving motor 38 and the mower 20 are mutually offset in the longitudinal direction of the vehicle. Therefore, a wide space can be provided between the mower 20 and the main frame 30 in the up-and-down direction. The inner space of the lawnmower vehicle 10 can be effectively used. In other words, while maintaining a wide space comparable to that of a conventional lawnmower vehicle, the main frame 30 can be lowered and the lower space of the lawnmower vehicle 10 can be effectively used. As a result, the efficiency of use of a limited space of the vehicle can be enhanced.

Furthermore, if the main frame 30 can be lowered, the centroid of the lawnmower vehicle 10 can be lowered. Furthermore, if a power transmission mechanism including a plurality of power transmission shafts connected via universal coupling can be used to transmit the driving force of the engine 32 to the mower 20, because the configuration in this embodiment can use some of the parts (or components), such as attachment members, used for a conventional riding lawnmower vehicle, further cost reductions are possible.

Furthermore, the engine 32 and the secondary battery 36 have a lower end positioned at the same height as, or below, the rotation center axis O (FIG. 1) of the main drive wheels 12 and 14. Therefore, the centroid of the lawnmower vehicle 10 can be lowered and the lower space of the lawnmower vehicle 10 can be effectively used. The inner space of the lawnmower vehicle 10 can be effectively used.

The lawnmower vehicle, if it does not include the mower driving motor 38, can be configured to drive the mower 20 by the engine 32 via a PTO shaft.

Second Exemplary Embodiment

Figure 4:
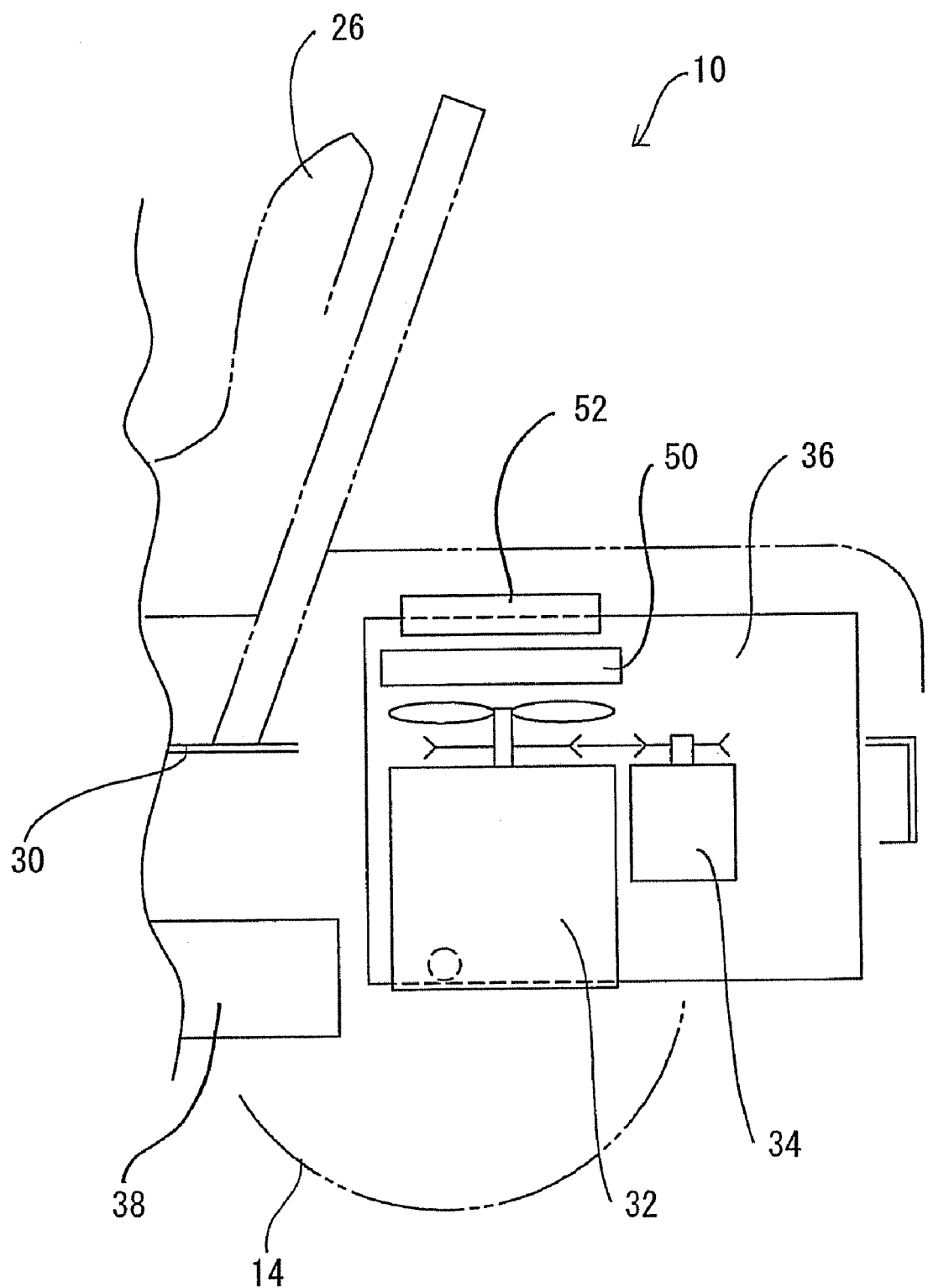
FIG. 4 illustrates a lawnmower vehicle according to a second exemplary embodiment of the present invention, corresponding to the right portion of FIG. 1.

FIG. 4 illustrates a lawnmower vehicle according to a second exemplary embodiment of the present invention that relates to the first aspect, corresponding to the right part of FIG. 1. The lawnmower vehicle according to this embodiment does not include the grass storage tank 48 (refer to FIG. 1) described in the above-described first exemplary embodiment. Instead, the present embodiment utilizes the space behind the driver's seat 26 for the secondary battery 36 as illustrated in FIG. 4. Therefore, the secondary battery 36 having a large capacity can be installed on the vehicle.

Furthermore, the lawnmower vehicle according to this embodiment does not include the discharge duct 46 (refer to FIG. 1), corresponding to omitting the grass storage tank. Furthermore, for the purpose of cost reduction, a manufacturer of the lawnmower vehicle 10 can use common components for both the lawnmower vehicle 10 that does not include the grass storage tank 48 and the lawnmower vehicle 10 equipped with the grass storage tank 48. For example, the main frame 30 can be commonly used for both the lawnmower vehicle 10 that does not include the grass storage tank 48 and the lawnmower vehicle 10 equipped with the grass storage tank 48.

Furthermore, according to the illustrated example, the engine 32 and the generator 34 have rotational shafts disposed in the vertical direction. A belt runs around a drive pulley fixed to the rotational shaft of the engine 32 and a driven pulley fixed to the rotational shaft of the generator, so that the driving force of the engine 32 can be transmitted to the generator 34 via the belt. Both the radiator 50 and the oil cooler 52 are positioned above the engine 32 so as to extend in the horizontal direction. The main drive wheels 12 and 14 (refer to FIG. 2 regarding the wheel 12) overlap at least one of the engine 32, the generator 34, and the secondary battery 36 when viewed from one end to the other end in the width direction of the lawnmower vehicle 10 (i.e., from front side to rear side in FIG. 4). Because the remaining configuration and actions are the same as in the above described first embodiment, the same reference numerals are assigned to equivalent portions and their description is not repeated.

Third Exemplary Embodiment

Figure 5:
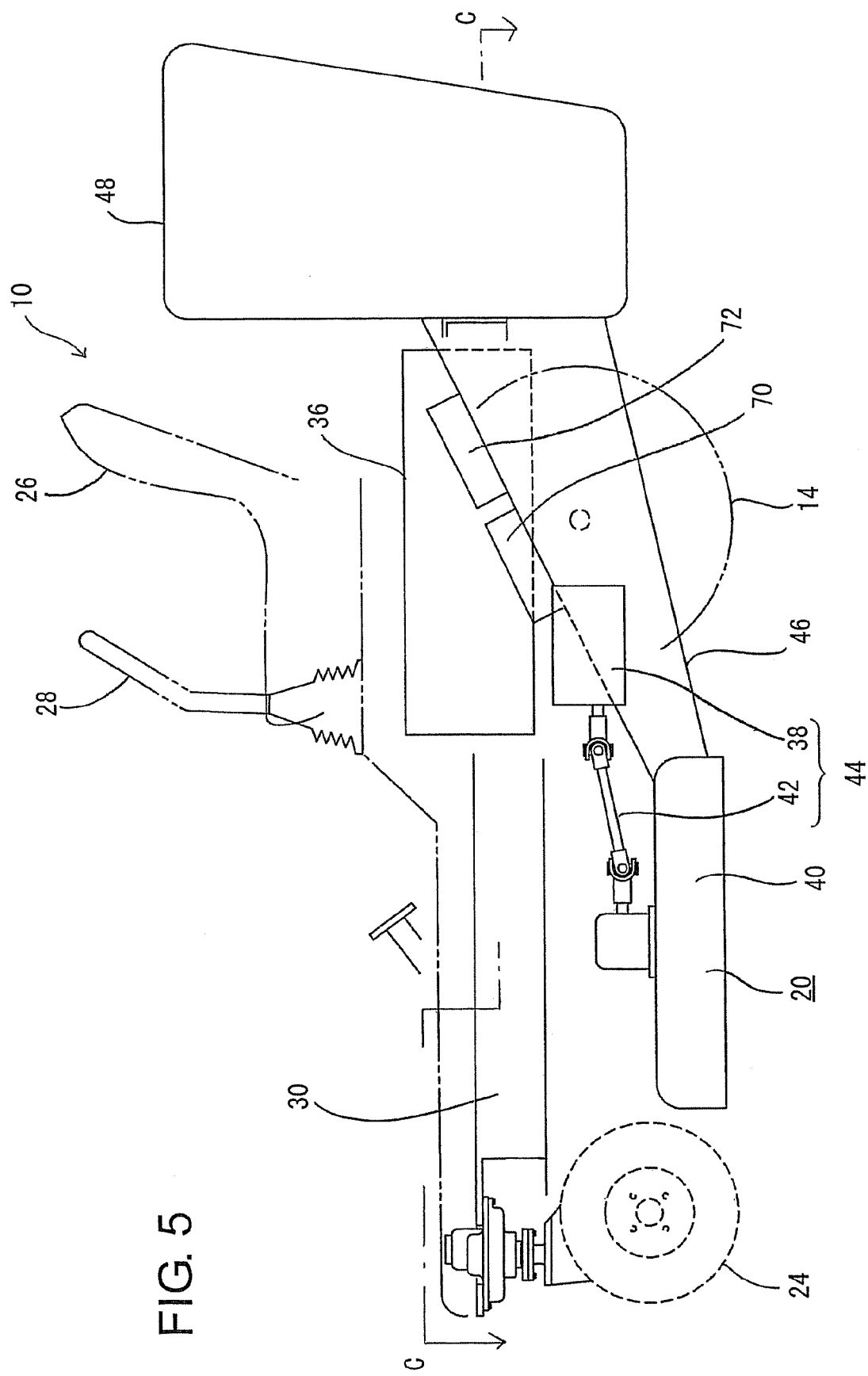
FIG. 5 illustrates a schematic diagram of configuration of a lawnmower vehicle according to a third exemplary embodiment of the present invention.
Figure 6:
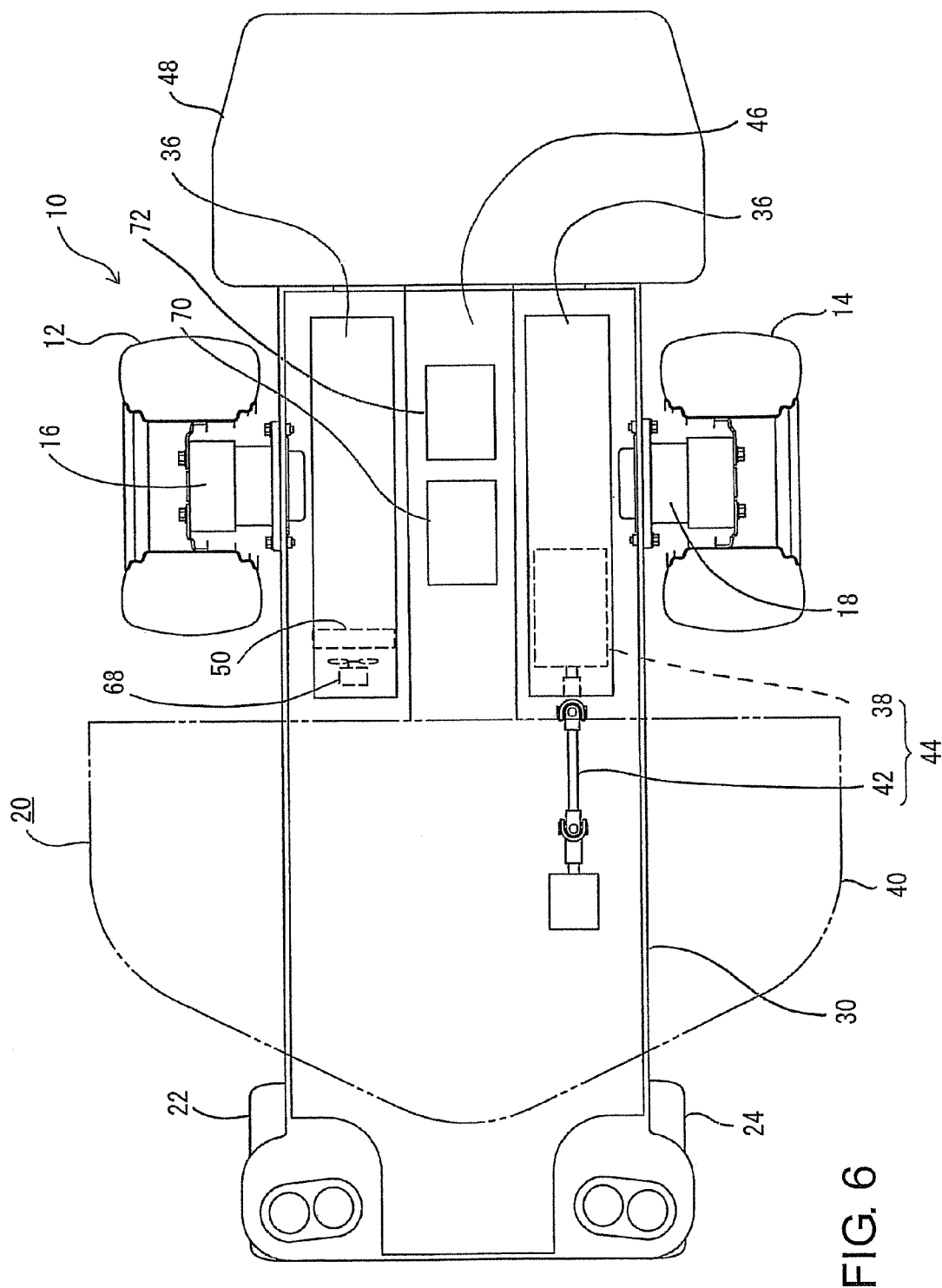
FIG. 6 illustrates a cross-sectional view substantially taken along a line C-C of FIG. 5.

FIG. 5 illustrates an example configuration of a lawnmower vehicle according to a third exemplary embodiment of the present invention that relates to the first aspect. FIG. 6 illustrates a cross-sectional view of the lawnmower vehicle taken along a line C-C of FIG. 5. The lawnmower vehicle 10 according to this embodiment is a full-electric type vehicle that does not include the engine 32 (refer to FIG. 1). The secondary battery 36 supplies electric power to the first electric motor 16 (FIG. 6) and the second electric motor 18 (FIG. 6) to drive the main drive wheels 12 and 14. The secondary battery 36 stores electric energy supplied from an external power source. For example, a plug-in system enables the secondary battery 36 to store electric energy supplied from an external power source.

In each of the above-described embodiments, a plug-in system can be employed to supply electric power to charge the secondary battery 36 (refer to FIG. 2). Furthermore, the grass storage tank 48 can be fixed to a rear end surface of the main frame 30 (i.e., the right end surface in FIGS. 5 and 6). The discharge duct 46 connecting the grass storage tank 48 to the mower 20 is provided at the center in the width direction of the vehicle (i.e., the front-to-back direction in FIG. 5, or vertically in FIG. 6).

Furthermore, two secondary batteries 36 are fixed to both sides of the discharge duct 46 on the main frame 30 in the width direction of the vehicle. Furthermore, the mower driving motor 38 is positioned under the secondary battery 36 at one end in the width direction of the vehicle (i.e., downside in FIG. 6). The radiator 50 and an electrically driven radiator fan 68 are positioned under the secondary battery 36 on the other end in the width direction of the vehicle (i.e., upside in FIG. 6). The radiator 50 cools cooling water supplied to the first electric motor 16 and the second electric motor 18. According to a modified embodiment, the radiator 50 and the radiator fan 68 can be replaced with an oil cooler and an electrically driven oil cooler fan to supply cooling oil to the first electric motor 16 and the second electric motor 18.

Furthermore, motor control units 70 and 72 are fixed on an upper surface of the discharge duct 46 at an intermediate portion thereof. The motor control units 70 and 72 are functionally equivalent to the motor control units 62, 64 and 66 described in the first exemplary embodiment with reference to FIGS. 1 and 2. Furthermore, for the purpose of cost reduction, a manufacturer of the lawnmower vehicle 10 can use common components in manufacturing both a hybrid-type lawnmower vehicle 10 that includes the engine 32 (refer to FIG. 1), the generator 34 (refer to FIG. 1), the first electric motor 16 (refer to FIG. 2), and the second electric motor 18 and a full-electric type lawnmower vehicle 10 that does not include the engine 32 and the generator. For example, the main frame 30 can be commonly used for the hybrid-type lawnmower vehicle 10 and the full-electric type lawnmower vehicle 10.

Furthermore, when viewed from one end to the other end in the width direction of the vehicle (i.e., from front to the rear in FIG. 5, or from downside to upside in FIG. 6), the main drive wheels 12 and 14 overlap a portion or the whole of the secondary battery 36, constituent members (inverter, DC/DC converter, and controller) of the motor control units 70 and 72, the mower driving motor 38, and the discharge duct 46. Because the remaining configuration and actions are the same as in the above described first embodiment illustrated in FIGS. 1 and 2, the same reference numerals are assigned to equivalent portions and a duplicate illustration and description thereof is not repeated.

Fourth Exemplary Embodiment

Figure 7:
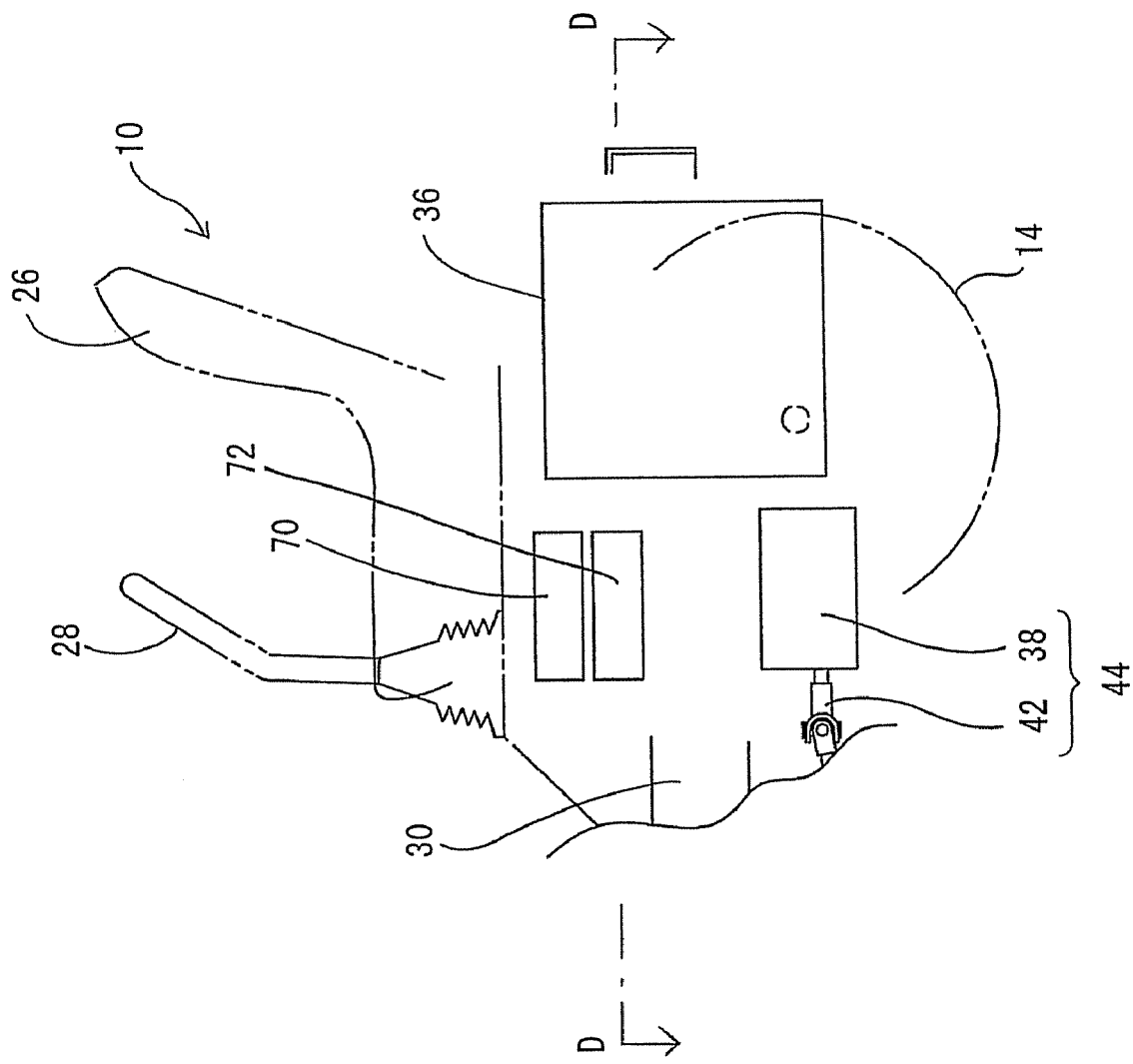
FIG. 7 illustrates a configuration of a lawnmower vehicle according to a fourth exemplary embodiment of the present invention, corresponding to the right portion of FIG. 1.
Figure 8:
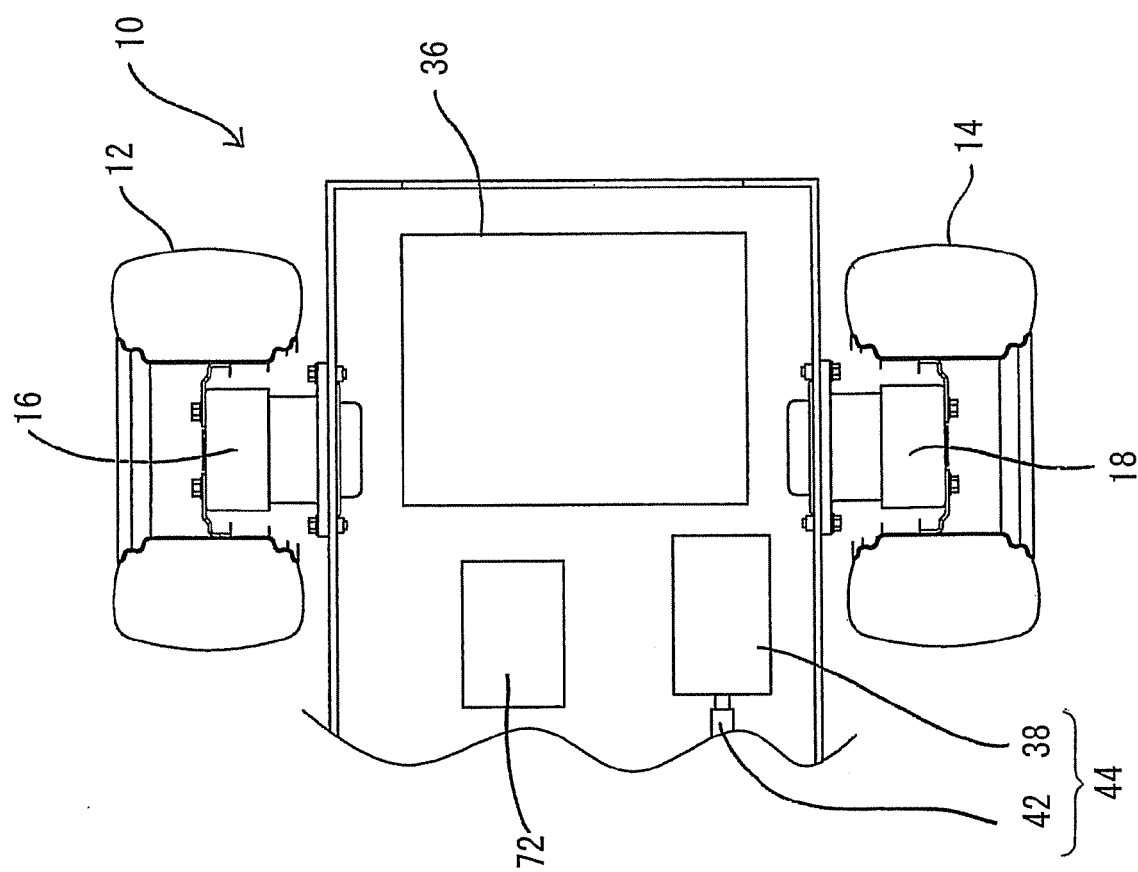
FIG. 8 illustrates a cross-sectional view substantially taken along a line D-D of FIG. 7.

FIG. 7 illustrates an example configuration of a lawnmower vehicle according to a fourth exemplary embodiment of the present invention that relates to the first aspect, corresponding to the right part of FIG. 5. FIG. 8 illustrates a cross-sectional view of the lawnmower vehicle taken along a line D-D of FIG. 7. The lawnmower vehicle according to this embodiment does not include the grass storage tank 48 fixed to the rear end surface of the main frame 30 and the discharge duct 46 connected to the grass storage tank 48 which are described in the third exemplary embodiment with reference to FIGS. 5 and 6.

In this embodiment, one secondary battery 36 is fixed to the main frame 30 and positioned on the rear side of the mower driving motor 38. The secondary battery 36 according to this embodiment has a large capacity compared to the secondary battery 36 illustrated in FIGS. 5 and 6. The mower 20 (refer to FIGS. 5 and 6) discharges the cut grass to one side of the mower 20 via a discharge port directed to the width direction of the lawnmower vehicle 10 (i.e., front-to-back direction in FIG. 7, or the vertical direction in FIG. 8).

Furthermore, according to the illustrated example, two upper and lower motor control units 70 and 72 are disposed under the driver's seat 26. As illustrated in FIG. 8, two motor control units 70 and 72 (refer to FIG. 7 regarding the control unit 70) are offset from the mower driving motor 38 of the vehicle in the width direction thereof. Furthermore, the main drive wheels 12 and 14 overlap a portion of the secondary battery 36 and the mower driving motor 38 when viewed from one end to the other end in the width direction of the vehicle (i.e., from front side to rear side in FIG. 7, or from downside to upside in FIG. 8). Because the remaining configuration and actions are the same as in the above described first embodiment illustrated in FIGS. 1 and 2 or the above described third embodiment illustrated in FIGS. 5 and 6, the same reference numerals are assigned to equivalent portions and a duplicate illustration and description thereof is not repeated.

Fifth Exemplary Embodiment

Figure 9:
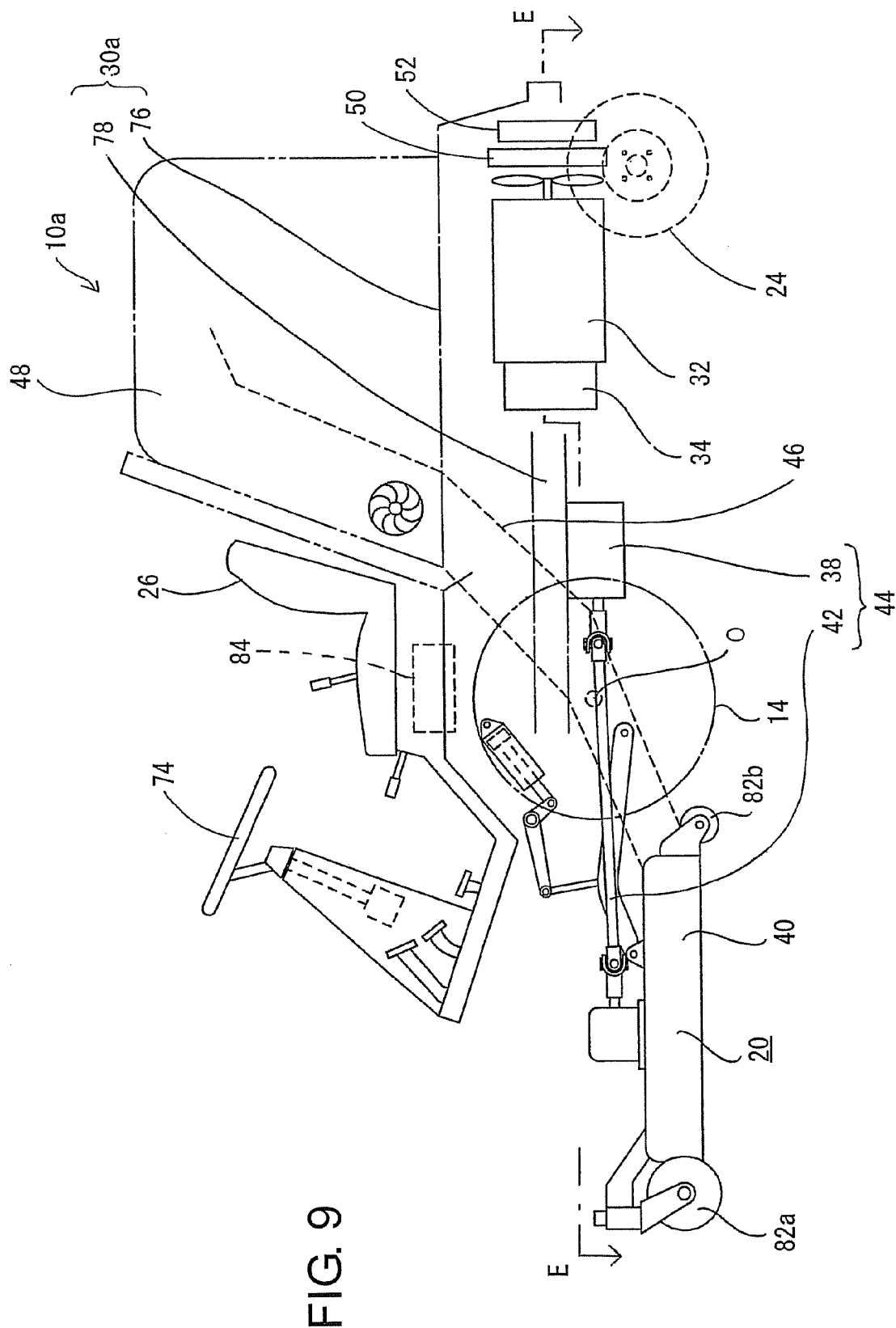
FIG. 9 illustrates a configuration of a lawnmower vehicle according to a fifth exemplary embodiment of the present invention.
Figure 10:
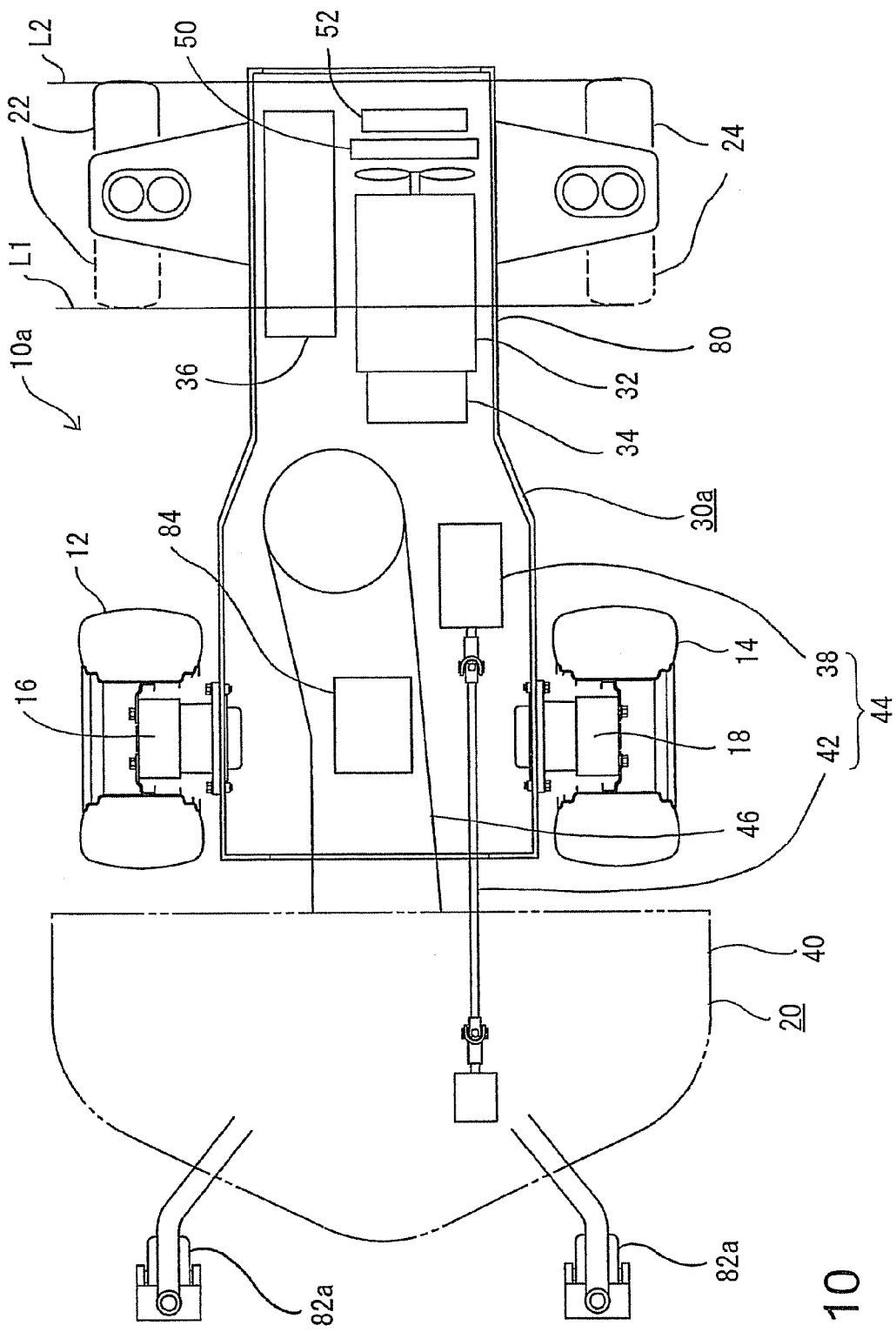
FIG. 10 illustrates a cross-sectional view substantially taken along a line E-E of FIG. 9.

FIG. 9 illustrates an example configuration of a lawnmower vehicle 10a according to a fifth exemplary embodiment of the present invention that relates to the first aspect: FIG. 10 illustrates a cross-sectional view of the lawnmower vehicle taken along a line E-E of FIG. 9. A lawnmower vehicle 10a according to this embodiment includes two (right and left) front wheels operating as main drive wheels and two (right and left) rear wheels operating as caster wheels. However, according to a modified embodiment, the lawnmower vehicle can be configured into a 3-wheel lawnmower vehicle including only one caster wheel.

Furthermore, the lawnmower vehicle 10a according to this embodiment is a hybrid-type lawnmower vehicle that includes the first electric motor 16 and the second electric motor 18 for driving the main drive wheels 12 and 14. The secondary battery 36 (FIG. 10) is an electric accumulator as an electric power supply source (power source unit) that supplies electric power to the first and second electric motors 16 and 18. The engine 32 and the generator 34 cooperatively supply electric energy to the secondary battery 36.

The lawnmower vehicle 10a is an "FMM-type" lawnmower vehicle that includes two (right and left) main drive wheels (front wheels according to the illustrated example) 12 and 14 which can be driven by the first electric motor (right axle motor) 16 and the second electric motor (left axle motor) 18 as illustrated in FIGS. 9 and 10. The lawnmower vehicle 10a can travel on the ground when the (right and left) main drive wheels 12 and 14 and the (right and left) caster wheels 22 and 24 rotate. The caster wheels 22 and 24 can freely rotate about their vertical axes. Furthermore, a steering wheel 74, an accelerator pedal, and a brake pedal are provided in front of the driver's seat 26. An operator sitting on the driver's seat 26 to rotate the steering wheel 74 to turn the lawnmower vehicle 10a. If the lawnmower vehicle 10a includes a hydraulic power steering device that can assist an operator's maneuver on the steering wheel 74, a hydraulic pump (i.e., hydraulic source) can be driven by an electric motor or the engine 32.

The lawnmower vehicle 10a includes the engine 32 supported on the rear end portion of the main frame 30a (i.e., frame constituting the vehicle body). Furthermore, the generator 34 is provided on the front side of the engine 32 so that the engine 32 can transmit the driving force to the generator 34. Furthermore, the engine 32 and the secondary battery 36 have a lower end positioned at the same height as, or below, the rotation center axis O (FIG. 9) of the main drive wheels 12 and 14.

The main frame 30a includes a ceiling plate portion 76 and a bottom plate portion 78 which are spaced in the up-and-down direction. The ceiling plate portion 76 and the bottom plate portion 78 are connected by wall plates 80. The driver's seat 26 and the grass storage tank 48 are fixed on the ceiling plate portion 76. Furthermore, the lawnmower vehicle 10a includes right and left (upper and lower in FIG. 10) main drive wheels 12 and 14 supported on the front side of the main frame 30a (left part in FIGS. 9 and 10) and right and left caster wheels 22 and 24 supported on the rear end portion of the main frame 30a (right part in FIGS. 9 and 10).

Furthermore, the lawnmower vehicle 10a includes the mower 20 provided on the front side of the main drive wheels 12 and 14 in the longitudinal direction of the main frame 30a (right-and-left direction in FIGS. 9 and 10). The mower 20 is operationally connected to the mower driving motor 38 (i.e., power source for driving the mower 20) via the power transmission mechanism 42. The mower driving motor 38, positioned on and fixed to the bottom plate portion 78 (constituting the main frame 30a) under the bottom plate portion 78, is offset rearward (illustrated on the right side in FIGS. 9 and 10) relative to the deck 40 of the mower 20 in the longitudinal direction of the vehicle (i.e., length direction of the vehicle). The mower driving motor 38 and the power transmission mechanism 42 cooperatively constitute the mower driving apparatus 44.

The grass storage tank 48 is connected via the discharge duct 46 to the rear end portion of the deck 40 that constitutes the mower 20. Two auxiliary caster wheels 82a and 82b support the mower 20. Furthermore, the mower 20 includes one or more lawnmower blades each configured to rotate around a vertical axis. The mower 20 is positioned on the front side of the main drive wheels 12 and 14 and the caster wheels 22 and 24. Therefore, an operator can easily cut grass on the front side of the lawnmower vehicle 10a where the main drive wheels 12 and 14 cannot reach.

Furthermore, the mower driving apparatus 44 is offset from the center of the lawnmower vehicle 10a in the width direction thereof (downside in FIG. 10). Furthermore, the engine 32, the generator 34, and the secondary battery 36 are supported under the main frame 30a and positioned on the rear side of the discharge duct 46 as illustrated in FIG. 10. In other words, the engine 32, the generator 34, and the secondary battery 36 do not interfere with the discharge duct 46. Furthermore, the engine 32, the generator 34, and the secondary battery 36 are positioned under the grass storage tank 48. Furthermore, the engine 32 and the secondary battery 36 overlap when viewed from one end to the other end in the width direction of the vehicle (i.e., from the front in FIG. 9, or from the bottom in FIG. 10).

Furthermore, as illustrated in FIG. 10, when viewed from the top in the vertical direction of the vehicle, a portion or the whole of the engine 32, the secondary battery 36, the radiator 50 (cooling device), and the oil cooler 52 (cooling device) is positioned between two caster wheels 22 and 24 in an area defined by a front end position L1 and a rear end position L2 where two caster wheels 22 and 24 are reachable when rotating about vertical axes.

Alternatively, when viewed from the top in the vertical direction of the vehicle, part of at least one of the engine 32, the generator 34, the secondary battery 36, a fuel cell, a capacitor, an inverter, and a cooling device can be disposed between two caster wheels 22 and 24 in an area defined by the front end position L1 and the rear end position L2. In FIG. 10, a solid line represents the position of the caster wheels 22 and 24 during a forward movement of the lawnmower vehicle 10a. A dotted line represents the position of the caster wheels 22 and 24 during a rearward movement of the lawnmower vehicle 10a.

A motor control unit 84 includes a controller (control unit), an inverter, and a DC/DC converter. The motor control unit 84 controls operations of the secondary battery 36, the first electric motor 16, the second electric motor 18, and other constituent components. The motor control unit 84 is disposed on the upper surface of the main frame 30a and positioned under the driver's seat 26.

The first electric motor 16 and the second electric motor 18 can operate independently to drive their rotational shafts connected two main drive wheels 12 and 14, respectively. Furthermore, if an operator rotates the steering wheel 74 provided on the front side of the driver's seat 26, the motor control unit 84 changes a difference (or a ratio) between rotational speeds of the first electric motor 16 and the second electric motor 18 associated with the right and left main drive wheels 12 and 14. An operation amount of the steering wheel 74 and an operation amount of an accelerator pedal can be input into the motor control unit 84 via dedicated operating amount sensors. The motor control unit 84 controls the first electric motor 16 and the second electric motor 18 based on the input operation amounts.

In this embodiment, when viewed from upside to downside in the vertical direction of the vehicle, part or the whole of the engine 32, the secondary battery 36, the radiator 50, and the oil cooler 52 is positioned between two caster wheels 22 and 24 in the area defined by the front end position L1 and the rear end position L2 where two caster wheels 22 and 24 are reachable when rotating about vertical axes. Therefore, the inner space between the caster wheels 22 and 24 can be effectively used. As a result, the degree of efficiency of use of the limited space of the vehicle can be enhanced. Furthermore, the centroid of the vehicle can be lowered. Because the remaining configuration and actions are the same as in the above described first embodiment illustrated in FIGS. 1 and 2, the same reference numerals are assigned to equivalent portions and description thereof is not duplicated.

Sixth Exemplary Embodiment

Figure 11:
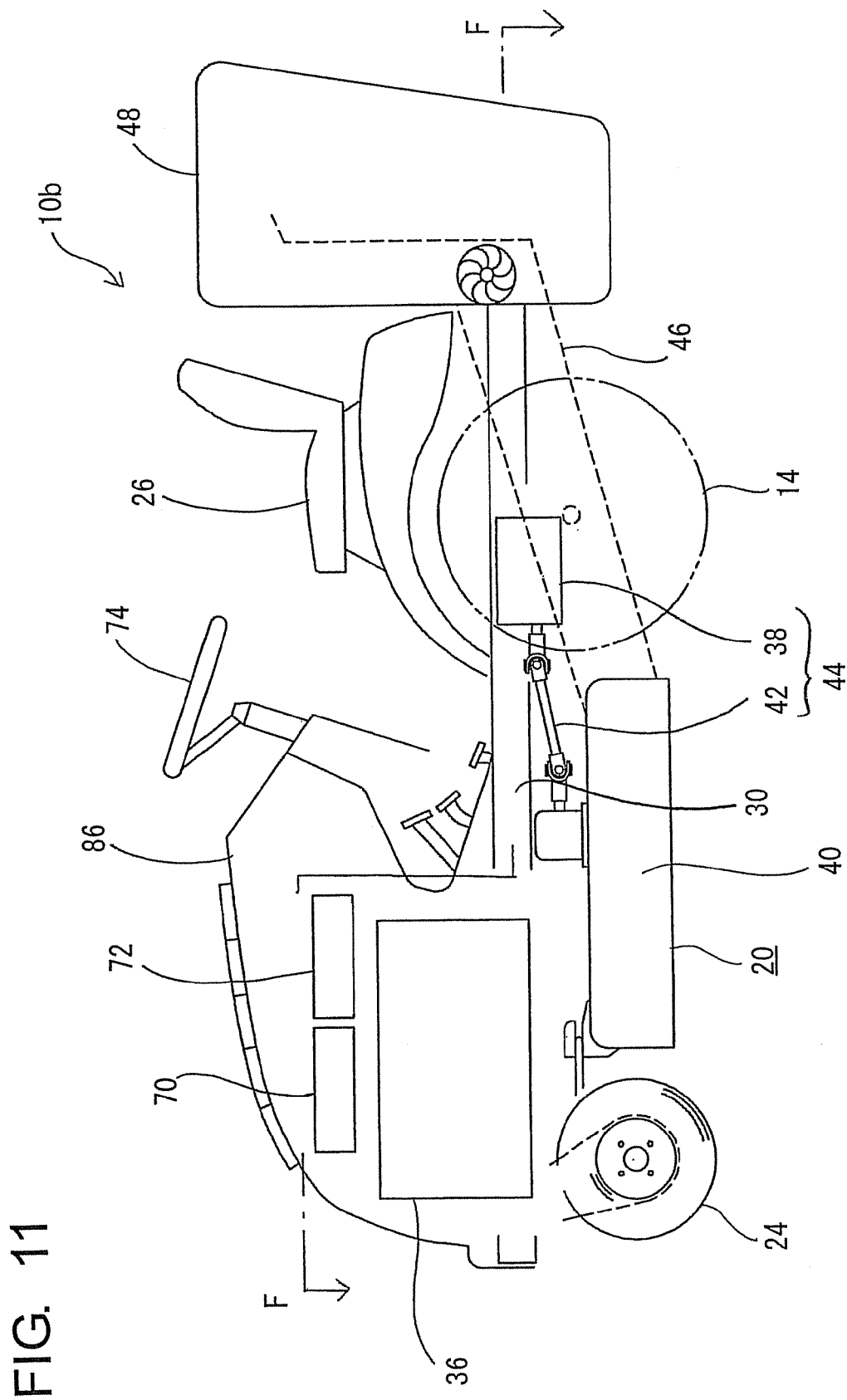
FIG. 11 illustrates a schematic diagram of a lawnmower vehicle according to a sixth exemplary embodiment of the present invention.
Figure 12:
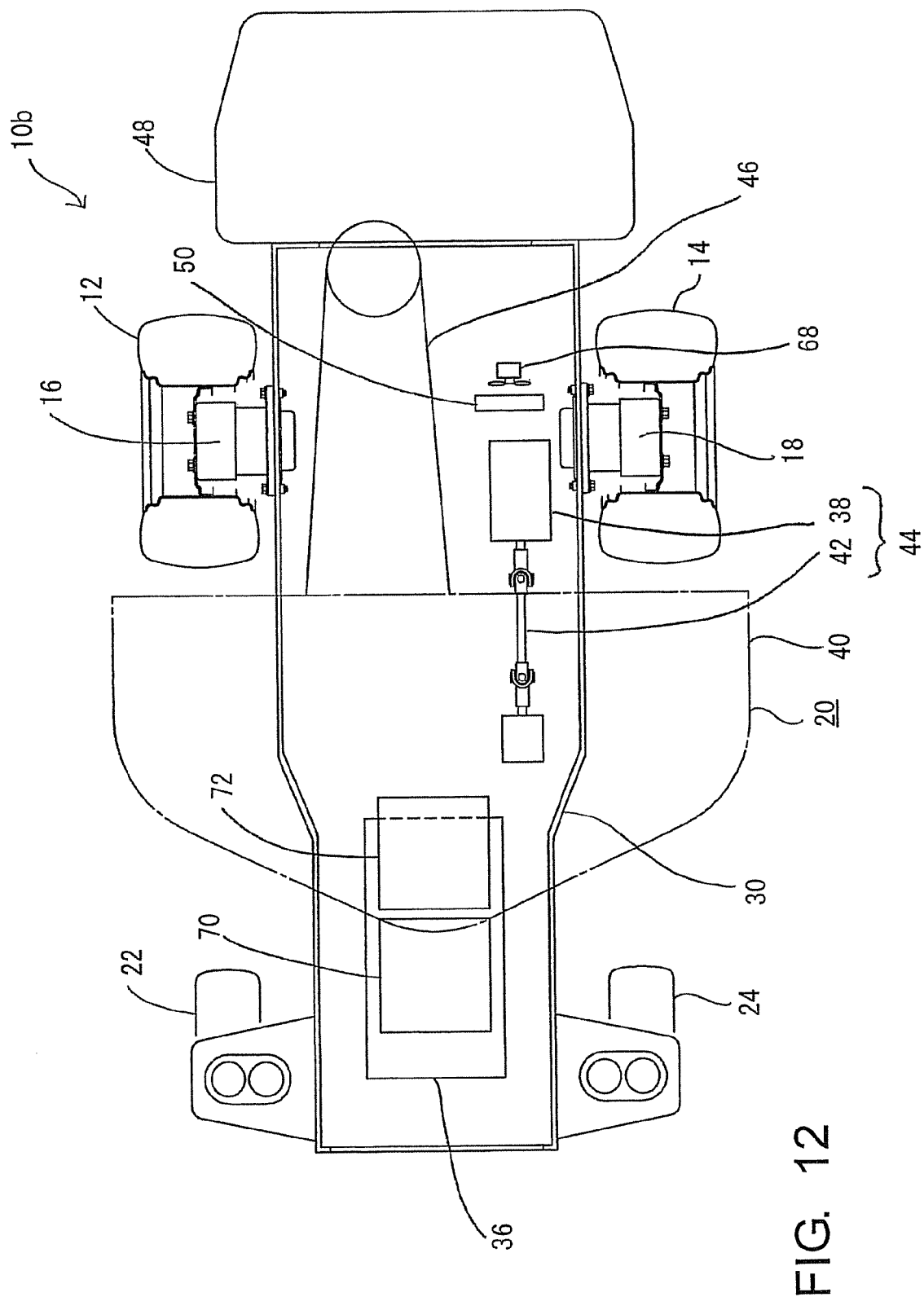
FIG. 12 illustrates a cross-sectional view substantially taken along a line F-F of FIG. 11.

FIG. 11 illustrates a lawnmower vehicle according to a sixth exemplary embodiment of the present invention that relates to the first aspect. FIG. 12 illustrates a cross-sectional view of the lawnmower vehicle taken along a line F-F of FIG. 11. A lawnmower vehicle 10b according to this embodiment includes two (right and left) rear wheels operating as main drive wheels and two (right and left) front wheels operating as caster wheels. However, according to a modified embodiment, the lawnmower vehicle can be configured into a 3-wheel lawnmower vehicle including only one caster wheel.

Furthermore, the lawnmower vehicle 10b according to this embodiment includes first and second electric motors for driving the main drive wheels 12 and 14. The secondary battery 36 is an electric accumulator as an electric power supply source (power source unit) that supplies electric power to the first and second electric motors 16 and 18. The lawnmower vehicle 10b is an SST-type lawnmower vehicle that includes two (right and left) main drive wheels (rear wheels according to the illustrated example) 12 and 14 which can be driven by the first electric motor (right axle motor) 16 and the second electric motor (left axle motor) 18 as illustrated in FIGS. 11 and 12.

Furthermore, the lawnmower vehicle 10b includes the secondary battery 36 and two motor control units 70 and 72 positioned above the secondary battery 36 which are on the front side of the driver's seat 26. Two motor control units 70 and 72 are functionally equivalent to the motor control units 62, 64 and 66 provided in the first exemplary embodiment described with reference to FIGS. 1 and 2. The secondary battery 36 supplies electric power to the first electric motor 16 and the second electric motor 18, and the first and second electric motors 16 and 18 are driven by the electric power. Two motor control units 70 and 72 and the secondary battery 36 are covered with a cover 86. Similar to the lawnmower of the above-described third embodiment illustrated in FIGS. 5 and 6, the lawnmower vehicle 10b according to this embodiment is a full-electric type vehicle that does not include the engine 32 (refer to FIG. 1).

The lawnmower vehicle 10b includes the grass storage tank 48 fixed to the rear end portion of the main frame 30. The discharge duct 46 connects the grass storage tank 48 to the rear end portion of the deck 40 of the mower 20. Furthermore, the lawnmower vehicle 10a includes right and left (upper and lower in FIG. 12) main drive wheels 12 and 14 supported on the rear side of the main frame 30 (right portion of FIGS. 11 and 12) and right and left caster wheels 22 and 24 supported on the front end portion of the main frame 30 (left portion of FIGS. 11 and 12).

The mower 20 is positioned towards the rear of the caster wheels 22 and 24 and in front of the main drive wheels 12 and 14 in the longitudinal direction of the main frame 30 (right-and-left direction in FIGS. 11 and 12). Furthermore, the lawn mower vehicle 10b includes the radiator 50 and an electrically driven radiator fan 68 positioned on the rear side of the mower driving motor 38 under the main frame 30 as illustrated in FIG. 12. The radiator 50 cools cooling water supplied to the first electric motor 16 and the second electric motor 18.

The discharge duct 46 has a front end connected to the mower 20 under the driver's seat 26, an intermediate portion extending obliquely upward, and a rear end connected to the grass storage tank 48 on the rear side of the driver's seat 26. Furthermore, the mower driving apparatus 44 and the discharge duct 46 are offset from the center of the lawnmower vehicle 10b in the width direction thereof (front-to-back direction in FIG. 11, or up-and-down direction in FIG. 12).

Furthermore, the main drive wheels 12 and 14 overlap all or a part of one or more of the mower driving motor 38, and the discharge duct 46 when viewed from one end to the other end in the width direction of the vehicle (i.e., from front side to rear side in FIG. 11, or from downside to upside in FIG. 12). Furthermore, the discharge duct 46 is positioned between the first electric motor 16 and the second electric motor 18 associated with the main drive wheels 12 and 14. Because the remaining configuration and actions are the same as in the above described first embodiment illustrated in FIGS. 1 and 2, the above described third embodiment illustrated in FIGS. 5 and 6, or the above described fifth embodiment illustrated in FIGS. 9 and 10, the same reference numerals are assigned to equivalent portions and description thereof is not repeated.

Seventh Exemplary Embodiment

Figure 13:
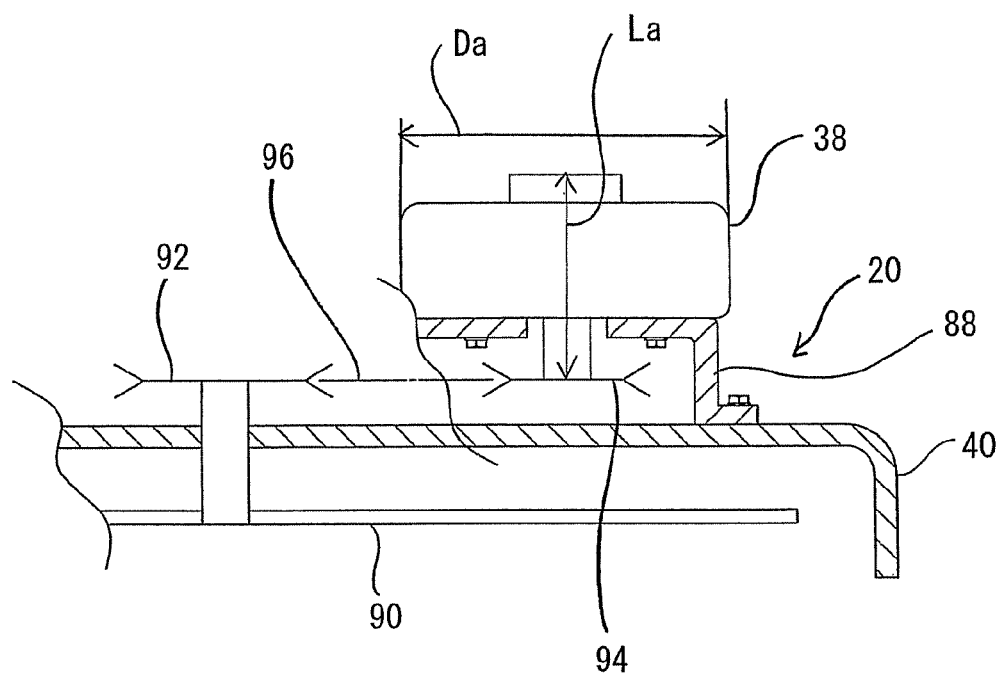
FIG. 13 illustrates a cross-sectional view of a lawnmower and a mower driving motor according to a seventh exemplary embodiment of the present invention.
Figure 14:
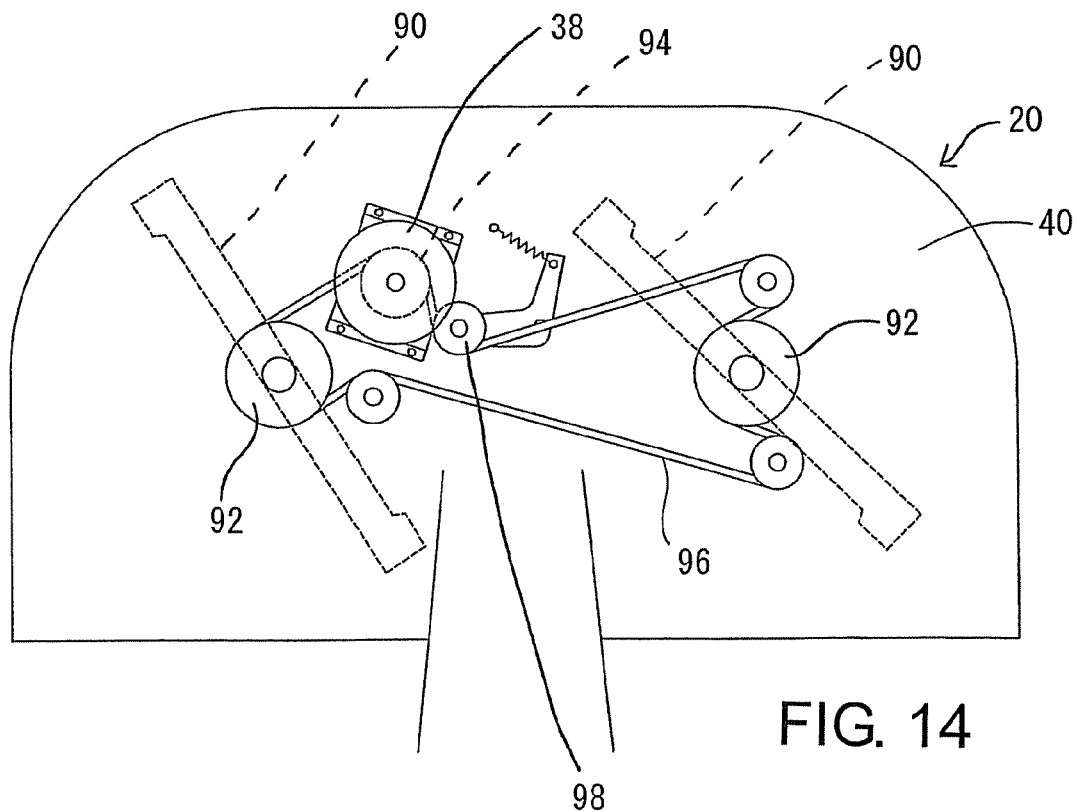
FIG. 14 illustrates a plan view of the lawnmower and the mower driving motor illustrated in FIG. 13.

FIG. 13 illustrates a partial cross-sectional view of the mower 20 and the mower driving motor 38 according to a seventh exemplary embodiment of the present invention that relates to the first aspect. FIG. 14 illustrates a plan view of the mower 20 and the mower driving motor 38. In this embodiment, a motor supporting member 88 is fixed on the deck 40 of the mower 20. A casing of the mower driving motor 38 is fixed on the motor supporting member 88. A lower end of the rotational shaft of the mower driving motor 38 is inserted into the motor supporting member 88. In a configuration wherein the mower driving motor 38 is disposed on the mower 20 (i.e., the deck 40 of the mower 20), the rotational shaft of driving motor 38 extends in the vertical direction. Furthermore, the overall axial length La of the mower driving motor 38 is shorter than an outer diameter Da of the casing accommodating the mower driving motor 38 (La<Da).

Furthermore, a belt 96 is wound around driven pulleys 92 fixed to the drive shafts of mower blades 90 provided in the deck 40 and a drive pulley 94 fixed to the rotational shaft of the mower driving motor 38. The mower 20 illustrated in FIG. 14 includes two mower blades 90 and a single endless belt 96 wound around the driven pulleys 92 fixed to the mower blades 90 and the drive pulley 94. When the mower driving motor 38 starts rotating (when the mower 20 starts operating), the driving force of the mower driving motor 38 is transmitted to the mower blades 90 via the drive pulley 94, the belt 96, and the driven pulleys 92.

As described above, this embodiment can lower the upper end of the mower driving motor 38 even in a state where the mower driving motor 38 is disposed on the deck 40 of the mower 20. Therefore, a space between the deck 40 of the mower 20 and the main frame 30 (refer to FIG. 1) can be widened. The limited space of the vehicle can be effectively used. Namely, while maintaining a wide space comparable to that of a conventional lawnmower vehicle, the main frame 30 can be lowered and the lower space of the vehicle can be effectively used. As a result, the degree of efficiency of use of a limited space of the vehicle can be enhanced. Furthermore, the centroid of the vehicle can be lowered if the main frame 30 can be lowered. Because the remaining configuration and actions are the same as in the above described first embodiment illustrated in FIGS. 1 and 2, the same reference numerals are assigned to equivalent portions and a duplicate illustration and description thereof is omitted.

Eighth Exemplary Embodiment

Figure 15:
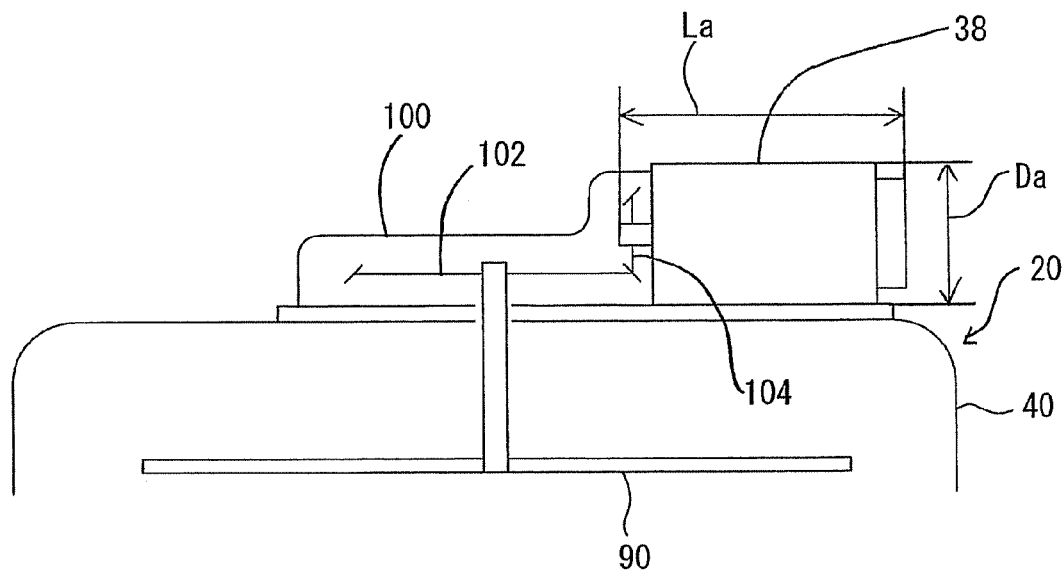
FIG. 15 illustrates a cross-sectional view of a lawnmower and a mower driving motor according to an eighth exemplary embodiment of the present invention.

FIG. 15 illustrates a cross-sectional view of the mower 20 and a mower driving motor 38 according to an eighth exemplary embodiment of the present invention that relates to the first aspect. In this embodiment, a gear cover 100 is fixed on the deck 40 of the mower 20. Furthermore, a casing of the mower driving motor 38 is integrally formed with the gear cover 100 and fixed on the deck 40. The mower driving motor 38 has its rotational shaft extending in the horizontal direction. In a configuration wherein the mower driving motor 38 is disposed on the deck 40, a front end portion of rotational shaft is inserted in the gear cover 100. Furthermore, the overall axial length La of the mower driving motor 38 is longer than the outer diameter Da of the casing accommodating the mower driving motor 38 (La>Da).

Furthermore, a driven bevel gear 102 is fixed on the drive shaft of the mower blade 90 provided in the deck 40. A drive bevel gear 104 is fixed on the rotational shaft of the mower driving motor 38. The driven bevel gear 102 meshes with the drive bevel gear 104. Furthermore, the driven bevel gear 102 meshes, directly or via a gear (not illustrated), with a driven bevel gear fixed on another mower blade (not illustrated). When the mower driving motor 38 begins to rotate (when the mower 20 starts operating), the driving force of the mower driving motor 38 is transmitted to the mower blade 90 via the drive bevel gear 104 and the driven bevel gear 102. The drive bevel gear 104 and the driven bevel gear 102 are disposed inside the gear cover 100. The number of teeth of the drive bevel gear 104 is smaller than the number of teeth of the driven bevel gear 102. In other words, the drive bevel gear 104 and the driven bevel gear 102 constitute a gear mechanism including at least one deceleration stage.

Similar to the above-described seventh embodiment illustrated in FIGS. 13 and 14, this embodiment can lower the upper end of the mower driving motor 38 even in a state where the mower driving motor 38 is disposed on the deck 40 of the mower 20.=Because the remaining configuration and actions are the same as in the above described first embodiment illustrated in FIGS. 1 and 2, the same reference numerals are assigned to equivalent portions and their description not repeated.

Ninth Exemplary Embodiment

Figure 16:
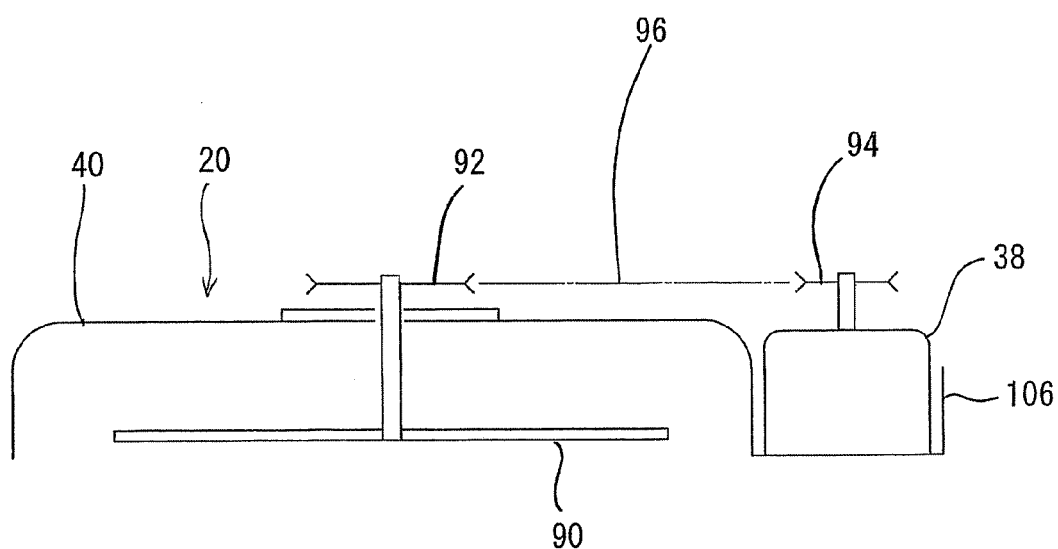
FIG. 16 illustrates a cross-sectional view of a lawnmower and a mower driving motor according to a ninth exemplary embodiment of the present invention.

FIG. 16 illustrates a cross-sectional view of the mower 20 and the mower driving motor 38 according to a ninth exemplary embodiment of the present invention that relates to the first aspect. In this embodiment, a motor support 106 including a bottom plate portion is fixed to the deck 40 of the mower 20 at one side (right in FIG. 16). A casing of the mower driving motor 38 is fixed on the bottom plate portion of the motor support 106. The rotational shaft of the mower driving motor 38 protrudes upward from the casing. In a configuration wherein the mower driving motor 38 is positioned at one side of the deck 40 of the mower 20, the rotational shaft of the mower driving motor 38 extends in the vertical direction. Furthermore, the belt 96 is wound around the driven pulley 92 fixed to the drive shaft of the mower blade 90 provided in the deck 40 and the drive pulley 94 fixed to the rotational shaft of the mower driving motor 38. Because the remaining configuration and actions are the same as in the above described first embodiment illustrated in FIGS. 1 and 2 or the above described seventh embodiment illustrated in FIGS. 13 and 14, the same reference numerals are assigned to equivalent portions and description thereof is not repeated.

In the above-described seventh through ninth exemplary embodiments illustrated in FIGS. 13 through 16, the mower driving motor 38 can include a braking mechanism. Furthermore, in the above-described seventh through ninth exemplary embodiments illustrated in FIGS. 13 through 16, the mower driving motor 38 can be an electric motor or a hydraulic motor.

Furthermore, the above-described seventh through ninth exemplary embodiments illustrated in FIGS. 13 through 16 can be selectively combined with the second through sixth exemplary embodiments illustrated in FIGS. 4 through 12.

Tenth Exemplary Embodiment

Figure 17:
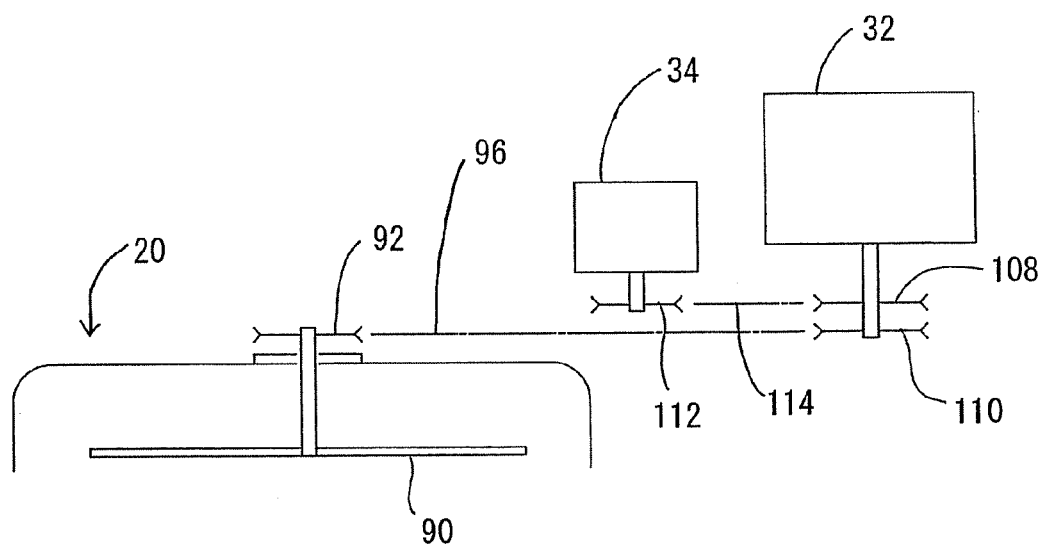
FIG. 17 illustrates a cross-sectional view of a lawnmower, an engine, and a generator according to a tenth exemplary embodiment of the present invention.

FIG. 17 illustrates a cross-sectional view of the mower 20, the engine 32, and the generator 34 according to a tenth exemplary embodiment of the present invention that relates to the first aspect. The lawnmower vehicle according to this embodiment includes the engine 32 that can drive the generator 34. The engine 32 has a rotational shaft extending in the vertical direction. A first drive pulley 108 and a second drive pulley 110 are fixed on the rotational shaft of the engine 32. One belt 114 is wound around the first drive pulley 108 and the driven pulley 112 fixed to the generator 34. The driving force of the engine 32 can be transmitted to the generator 34 via the belt 114. Furthermore, another belt 96 is wound around the second drive pulley 110 and the driven pulley 92 fixed to the drive shaft of the mower blade 90. The driving force of the engine 32 can be transmitted to the mower 20 via the belt 96. Because the remaining configuration and actions are the same as in the above described first embodiment illustrated in FIGS. 1 and 2, the same reference numerals are assigned to equivalent portions and description thereof is not repeated.

Eleventh Exemplary Embodiment

Figure 18:
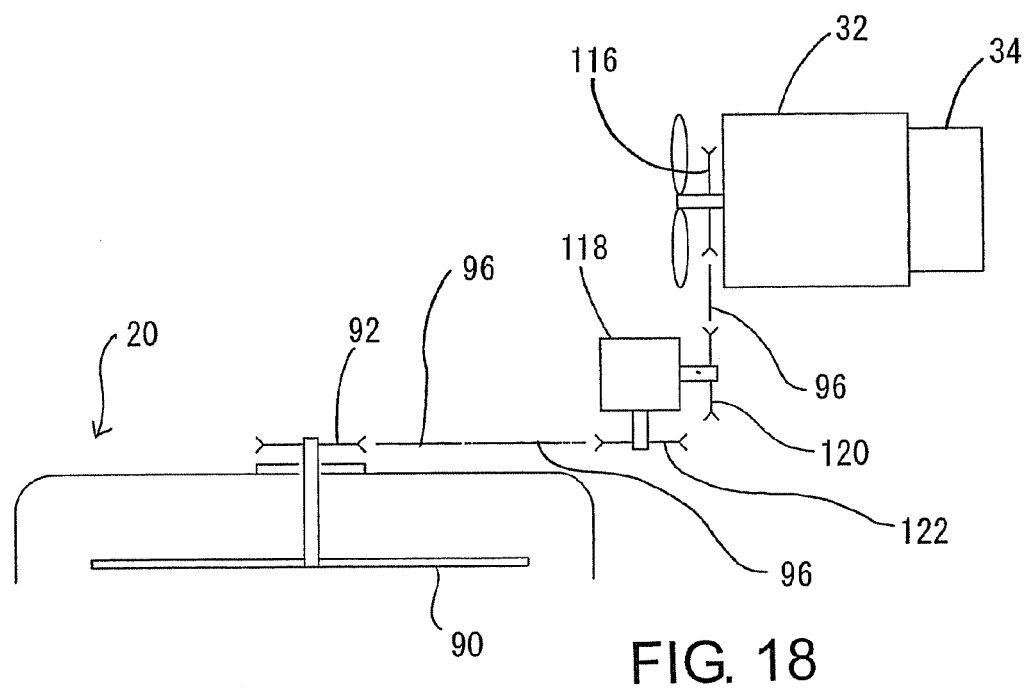
FIG. 18 illustrates a cross-sectional view of a lawnmower, an engine, and a generator according to an eleventh exemplary embodiment of the present invention.

FIG. 18 illustrates a cross-sectional view of the mower 20, the engine 32, and the generator 34 according to an eleventh exemplary embodiment of the present invention that relates to the first aspect. The lawnmower vehicle according to this embodiment includes the engine 32 capable of driving the generator 34. The engine 32 has a rotational shaft extending in the horizontal direction. The generator 34 is fixed to one side of the engine 32, so that the driving power of the rotational shaft of the engine 32 can be transmitted to the generator 34.

A drive pulley 116 is fixed on the rotational shaft of the engine 32. The driven pulley 92 is fixed on the drive shaft of the mower blade 90. A bevel gear unit 118 is fixed on the main frame 30 (refer to FIGS. 1 and 2) between the engine 32 and the mower 20. The bevel gear unit 118 includes a horizontal shaft and a vertical shaft which are rotatably supported by a casing. One belt 96 is wound around a pulley 120 fixed to the horizontal shaft and the drive pulley 116 fixed to the rotational shaft of the engine 32. Furthermore, another belt 96 is wound around a pulley 122 fixed to the vertical shaft and the driven pulley 92 fixed to the drive shaft of the mower blade 90. The horizontal shaft and the vertical shaft have inner ends fixed to bevel gears (not illustrated) provided in the casing. The bevel gears are meshed each other. Thus, the driving force of the engine 32 can be transmitted to the mower 20 via the bevel gear unit 118. Because the remaining configuration and actions are the same as in the above described first embodiment illustrated in FIGS. 1 and 2, the same reference numerals are assigned to equivalent portions and a duplicate illustration and description thereof is omitted.

The lawnmower vehicle according to the above-described tenth and eleventh exemplary embodiments illustrated in FIGS. 17 and 18 can include a clutch that can selectively transmit the driving power of the engine 32 to the mower blade 90. Furthermore, the lawnmower vehicle can include a braking mechanism that can stop the rotating mower blade 90 when the clutch is in a non-power transmission state.

In the seventh through eleventh exemplary embodiments illustrated in FIGS. 13 through 18, a gear mechanism including one or two deceleration stages can be provided in the power transmission mechanism between the power source (38 or 32) and the mower blade 90. Furthermore, the power transmission mechanism can be a chain mechanism or a hydraulic mechanism, or any other mechanism.

Twelfth Exemplary Embodiment

Figure 19:
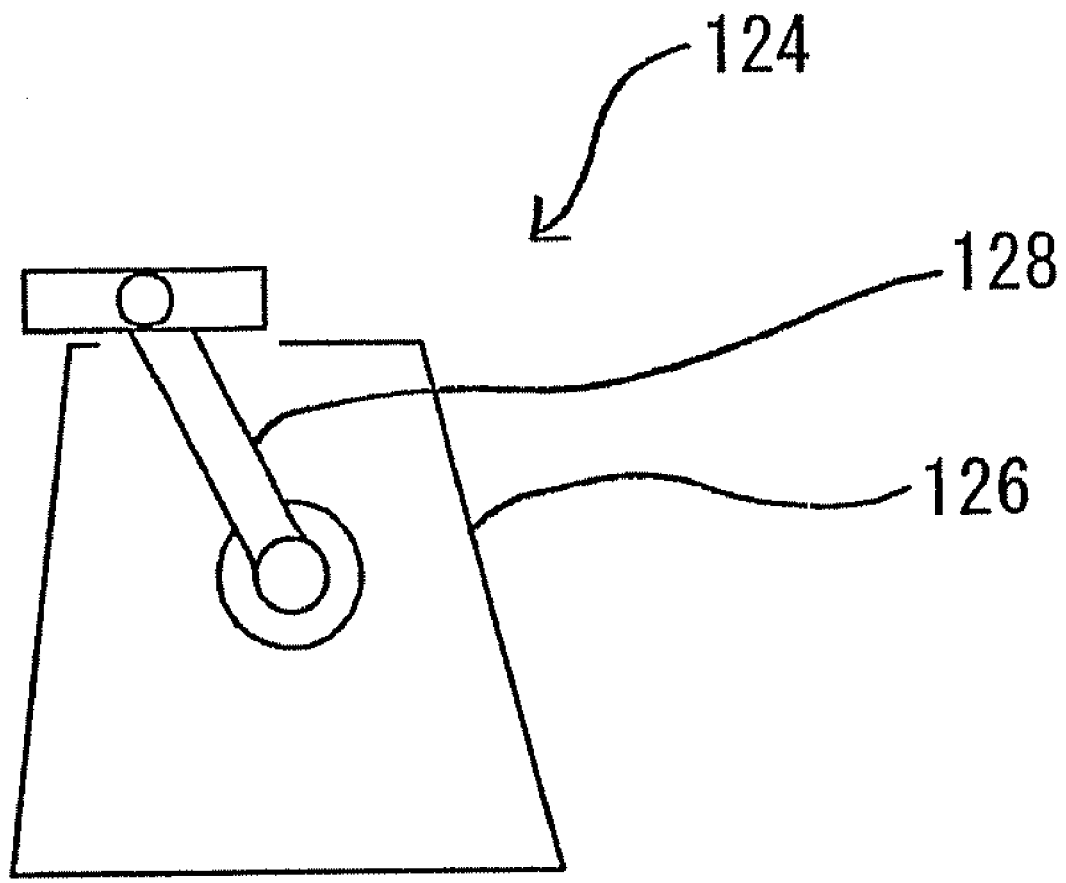
FIG. 19 illustrates a schematic diagram of a pedal powered generator according to a twelfth exemplary embodiment of the present invention.

FIG. 19 illustrates a pedal powered generator 124 according to a twelfth exemplary embodiment of the present invention that relates to the first aspect that is installable on the lawnmower vehicle of the first exemplary embodiment described with reference to FIGS. 1 and 2. The lawnmower vehicle according to this embodiment does not include the engine 32 and the generator 34 (refer to FIGS. 1 and 2) described in the first exemplary embodiment. The pedal powered generator 124 includes a support base 126 positioned near legs of an operator sitting on the driver's seat 26 (refer to FIG. 1), a crank shaft 128 rotatably supported by the support base 126, and pedals attached to both ends of the crank shaft 128.

Figure 20:
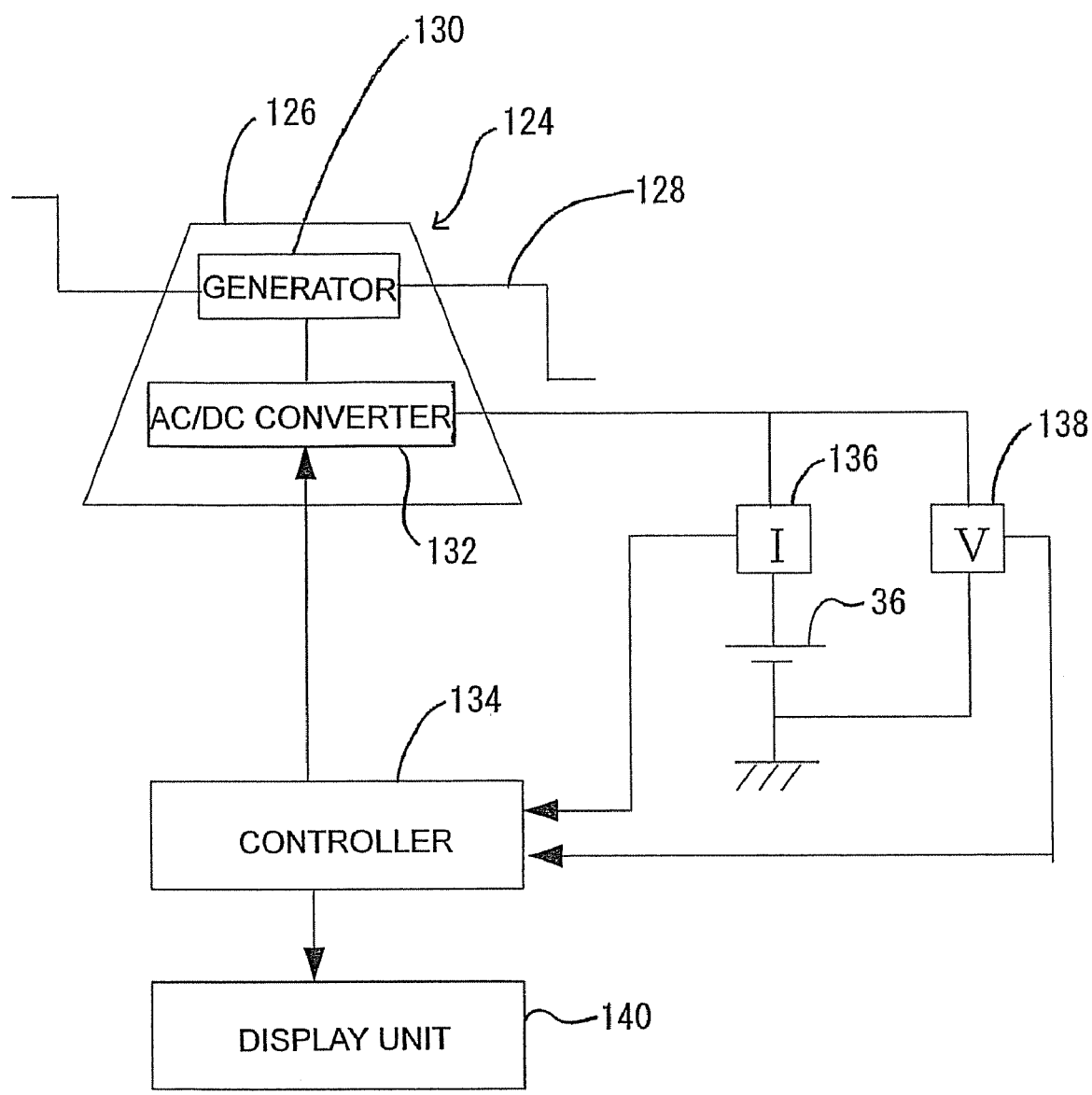
FIG. 20 is a block diagram illustrating part of a lawnmower vehicle including the pedal powered generator according to the twelfth embodiment.

FIG. 20 is a block diagram illustrating part of a lawnmower vehicle including the pedal powered generator 124 according to the twelfth exemplary embodiment. As illustrated in FIG. 20, a generator 130 capable of generating electricity in accordance with rotation of the crank shaft 128 is provided in the support base 126 constituting the pedal powered generator 124. For example, a gear mechanism is provided between the crank shaft 128 and the generator 130. The rotational force of the crank shaft 128 can be transmitted to the generator 130. The crank shaft 128 can include a rotation center axis coaxial with a rotation center axis of the generator 130. The secondary battery 36 stores electric energy generated by the generator 130.

The lawnmower vehicle includes an alternating-current/direct-current converter (AC/DC converter) 132 and a controller 134. The AC/DC converter 132 is, for example, a rectifier or an inverter that is connected between the generator 130 and the secondary battery 36. The controller 134 is a microcomputer including a central processing unit (CPU). A current sensor 136 can detect current relating to the secondary battery 36. A voltage sensor 138 can detect electric voltage relating to the secondary battery 36. The controller 134 receives detection values from the current sensor 136 and the voltage sensor 138. The controller 134 outputs a control signal to the AC/DC converter 132 that converts AC energy generated by the generator 130 into DC energy. The secondary battery 36 stores the electric energy generated by the generator 130.

Furthermore, a display unit 140 is connected to the controller 134. The display unit 140 can display at least one of the present power generation amount and the present electric power usage in response to a signal from the controller 134. The display unit 140 can be configured to display calorimetric consumption of an operator which can be calculated from the power generation amount. Furthermore, the controller 134 can store a power generation amount and a working time for each of two or more operators. The display unit 140 can display the stored information for each operator.

According to this embodiment, an operator can pedal to generate electricity from the pedal powered generator 124 (FIG. 20) and store the generated electric energy into the secondary battery 36. The secondary battery 36 supplies electric power to the first electric motor 16, the second electric motor 18, and the mower driving motor 38. That is, the motors 16, 18, and 38 can be driven. An operator can exercise and improve their physical strength while mowing a lawn, while at the same time suppressing consumption of fuel or energy.

It may be preferable that the power supply circuit includes a relay in an electric path connecting the secondary battery 36 to the first electric motor 16, the second electric motor 18, or the mower driving motor 38 (refer to FIG. 2). In this case, the controller 134 (FIG. 20) can control to connect the relay only when the electric energy stored in the secondary battery 36 exceeds a predetermined level. Because the remaining configuration and actions are the same as in the above described first embodiment illustrated in FIGS. 1 and 2, a duplicate illustration and description thereof is omitted. This embodiment can be selectively combined with each of the above-described embodiments.

Thirteenth Exemplary Embodiment

Figure 21:
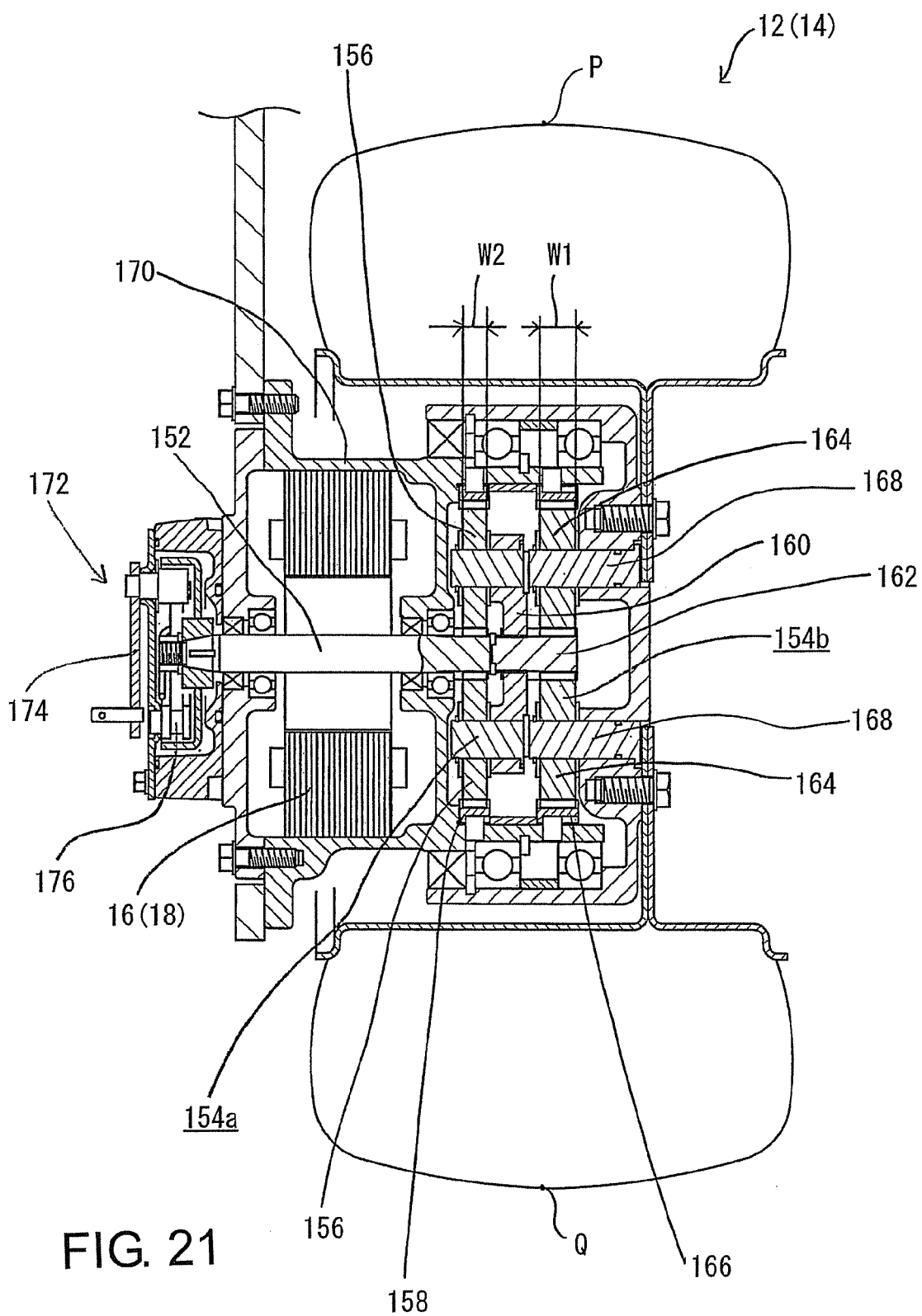
FIG. 21 illustrates a cross-sectional view of a driving portion for the main drive wheel according to a thirteenth exemplary embodiment of the present invention.

FIG. 21 illustrates a cross-sectional view of a driving portion of the main drive wheel 12 (or 14) according to a thirteenth exemplary embodiment of the present invention that relates to the first aspect. In this embodiment, two-stage planetary gear mechanisms 154a and 154b are provided to transmit the rotational force of a rotary shaft 152 of the first electric motor 16 (or the second electric motor 18) to the main drive wheel 12 (or 14) described in the first exemplary embodiment described with reference to FIGS. 1 and 2.

More specifically, the first-stage planetary gear mechanism 154a includes a sun gear provided at one end (right end portion in FIG. 21) of the rotary shaft 152, pinion gears 156a meshing with the sun gear, and a ring gear 158 meshing with the pinion gears 156. Furthermore, a carrier 160 supports the pinion shaft supporting the pinion gear 156, and the carrier 160 is engaged with a second sun gear provided on an outer peripheral surface of a second rotary shaft 162 which is supported coaxially with the rotary shaft 152 such that they are rotatable relative to each other. A second pinion gear 164 constituting the second-stage planetary gear mechanism 154b is meshed with the second sun gear and a second ring gear 166 so that the main drive wheel 12 and 14 are rotated by a second pinion shaft 168 supported at the second pinion gear 164. Furthermore, as illustrated in FIG. 21, when the main drive wheel 12 (or 14) and the driving portion of the main drive wheel 12 (or 14) are viewed on a virtual plane including the rotation center axis, the first electric motor 16 including the rotary shaft 152 is accommodated within a virtual circle including outer ends P and Q of the main drive wheel 12 (or 14).

Further, the ring gear 158 constituting the first-stage planetary gear mechanism 154a and the second ring gear 166 constituting the second-stage planetary gear mechanism 154b are fixed to the housing 170 supported inside the main drive wheel 12, 14. For this purpose, a plurality of pins are inserted through the holes formed in part of the housing 170, and inner end portions according to radial direction of the pins are locked to recessed portions provided on the outer peripheral surfaces of the ring gear 158 and the second ring gear 166. Inner rings of a pair of bearings are opposed to outer end portions according to radial direction of the pins to prevent the pins from removing from the housing 170. Thereby, the ring gear 158 and the second ring gear 160 are supported in a manner such that they are incapable of rotating with respect to the housing 170.

Furthermore, the first-stage planetary gear mechanism 154a and the second-stage planetary gear mechanism 154b have the same deceleration ratio. A second pinion gear 164 of the second-stage planetary gear mechanism 154b has a face width W1 which is larger than a face width W2 of the pinion gear 156 of the first-stage planetary gear mechanism 154a (W1>W2).

Furthermore, a braking device 172 is provided at the other end (left side in FIG. 21) of the rotary shaft 152. The braking device 172 applies a braking force to the main drive wheel 12. According to this embodiment, the rotation of the rotary shaft 152 can be decreased stepwise via the two-stage planetary gear mechanisms 154a and 154b. If the structure illustrated in FIG. 21 is inversed in the right-and-left direction, the structure can be applied to the other main drive wheel 14 (or 12). Because the remaining configuration and actions are the same as in the above described first embodiment illustrated from FIG. 1 to FIG. 2, a duplicate illustration and description thereof is omitted.

The structure for transmitting the rotational force from the electric motors 16 and 18 to the main drive wheels 12 and 14 is not limited to the gear mechanism including two deceleration stages and therefore can be replaced with a gear mechanism including one or three deceleration stages. Furthermore, the rotational force of the electric motor 16 (or 18) can be transmitted to the main drive wheel 12 (or 14) without employing any deceleration mechanism.

If the caster wheels 22 and 24 (refer to FIG. 2) are driven by electric motors, a driving portion for each caster wheel 22 (or 24) can be configured to have a structure similar to the arrangement described in this embodiment.

Fourteenth Exemplary Embodiment

Figure 22:
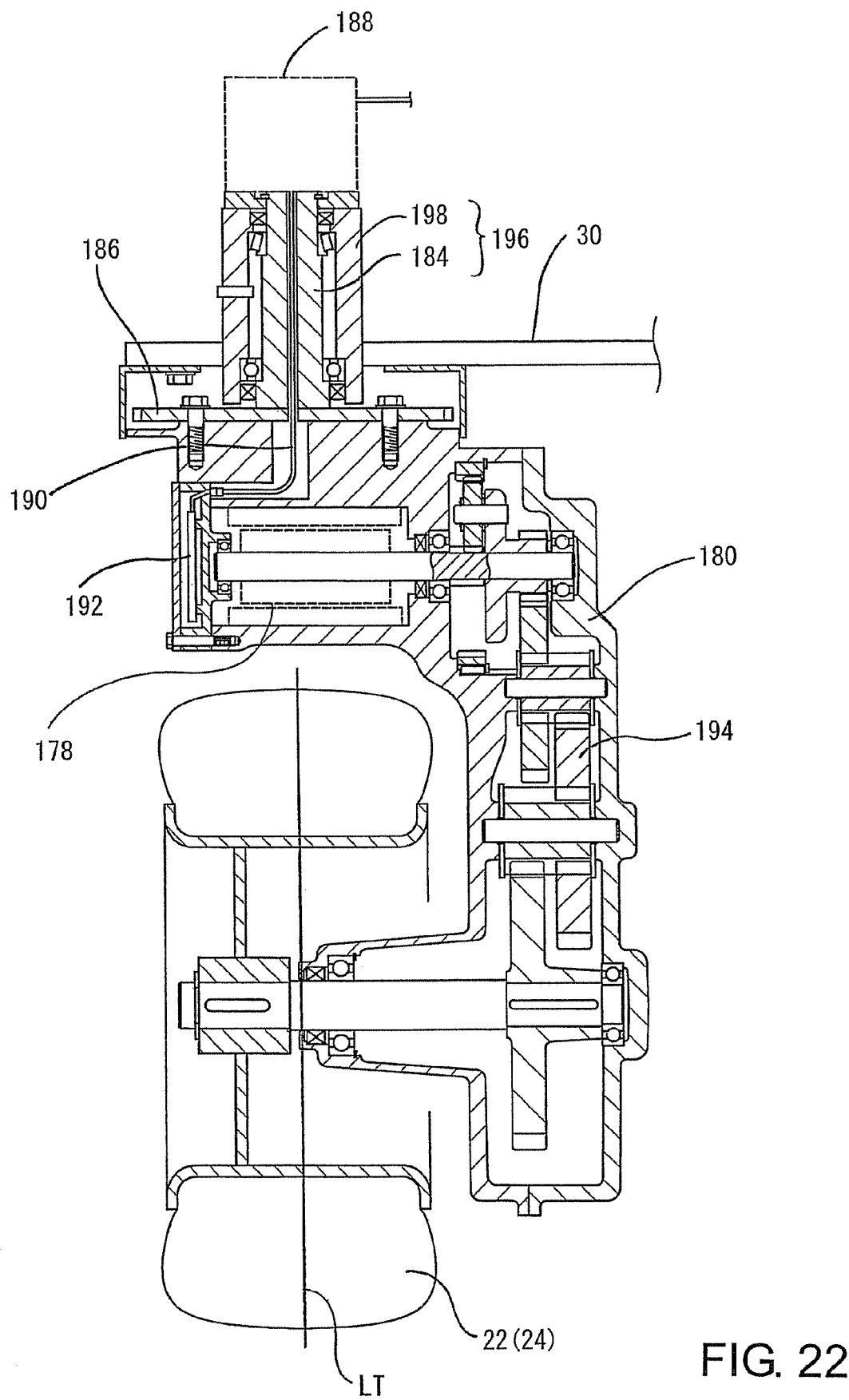
FIG. 22 illustrates a cross-sectional view of a support portion and a driving portion for a caster wheel according to a fourteenth exemplary embodiment of the present invention.

FIG. 22 illustrates a cross-sectional view of a support portion and a driving portion for the caster wheel 22 (or 24) according to a fourteenth exemplary embodiment of the present invention that relates to the first aspect. This embodiment is different from the first exemplary embodiment described with reference to FIGS. 1 and 2 in that the caster wheel 22 (or 24) is driven by an electric traction motor 178 and is forcibly steerable by an electric steering motor (not illustrated). More specifically, this embodiment includes the electric motor 178 (traction power source) that can drive caster wheel 22 (or 24). FIG. 22 illustrates the support portion and the driving portion for the caster wheel 22. If the structure illustrated in FIG. 22 is reversed in the right-and-left direction, the structure can be applied to the other caster wheel 24.

Furthermore, the caster wheel 22 (or 24) can rotate around a horizontal axis and is supported to a support housing 180 (deceleration mechanism housing). The support housing 180 is supported to the main frame 30 and can freely rotate around a vertical axis. Namely, a shaft portion 184 is supported to the main frame 30 via a bearing so that the shaft portion 184 can rotate around a vertical axis. An upper end of the support housing 180 is fixed to the shaft portion 184 via a gear 186. A slip ring 188 is supported on the main frame 30. The slip ring 188 receives a control signal from the controller. The motor control units 62, 64 and 66 (refer to FIG. 2) include the controller. A cable 190 extending downward from the slip ring 188 is connected to a motor driver 192 (a motor drive circuit) provided in the support housing 180. The motor driver 192 is connected via a cable (not illustrated) to the electric traction motor 178 for driving the caster wheel 22 (or 24). The electric motor 178, positioned above the caster wheel 22 (or 24), has a rotational shaft extending in the horizontal direction. The electric motor 178 is accommodated in the support housing 180.

Furthermore, a gear mechanism 194 including a plurality of spur gears is provided to transmit the rotation of the rotational shaft of the electric motor 178 to the caster wheel 22 (or 24). The spur gears constituting the gear mechanism 194 rotate together with the electric motor 178 and the gear 186 around a turning axis of the caster wheel 22 (or 24) which is a vertically extending steering axis (i.e., the center axis of the shaft portion 184). Furthermore, the gear 186 meshes with a gear fixed to the rotational shaft of the electric steering motor (not illustrated) for turning the caster wheel 22 (or 24). When the electric steering motor rotates, the caster wheel 22 (or 24) changes its turning angle about the steering axis.

The gears constituting the gear mechanism 194 are not limited to spur gears and can be replaced with bevel gears or various gears. The support housing 180, the electric motor 178, and the gear mechanism 194 cooperatively constitute a driving unit. Furthermore, according to the illustrated example, a tire center line LT crossing the center of the caster wheel 22 (or 24) in the width direction accords with the steering axis. The illustrated configuration can preferably reduce the resistive force acting on the steering wheel (steering resistance). Furthermore, the layout of the cable 190 connecting the slip ring 188 to the motor driver 192 can preferably to prevent the cable 190 from distorted when the caster wheel 22 (or 24) rotates about the steering axis. Furthermore, it is unnecessary to provide a stopper for restricting the steering angle of the caster wheel 22 (or 24) within a predetermined angle.

Figure 23:
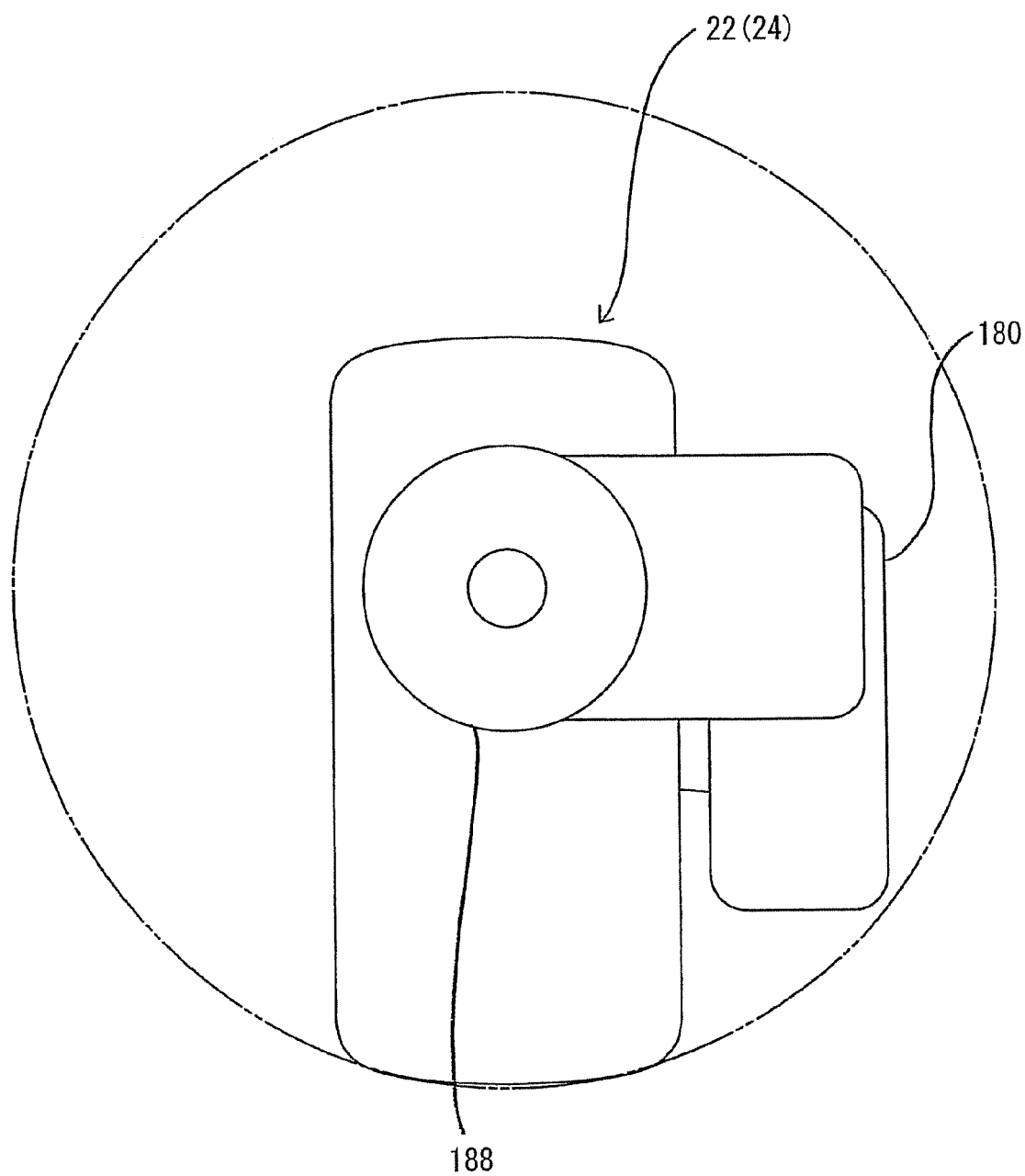
FIG. 23 is a plan view of the structure illustrated in FIG. 22.

FIG. 23 is a plan view of the structure illustrated in FIG. 22. In FIG. 23, an alternate long and two short dashes line indicates a locus of the outermost end of a tire of the caster wheel 22 (or 24) which can rotates about the vertical steering axis. In this embodiment, when the vehicle is viewed from upside to downside, a supporting member 196 (FIG. 22), i.e., a bracket supporting the support housing 180 to the main frame 30 (FIG. 22), and driving portion are positioned inside the circular locus defined by the outermost end of the tire of caster wheel 22 (or 24). The supporting member 196 includes a cylindrical portion 198 fixed to the main frame 30 and the shaft portion 184 supported to the cylindrical portion 198 via the bearing. The shaft portion 184 and the gear 186 cooperatively constitute a fulcrum portion for rotation. Although not illustrated in FIG. 23, the gear 186 is also positioned inside the circular locus defined by the outermost end of the caster wheel 22 (or 24). Because the remaining configuration and actions are the same as in the above described first embodiment illustrated in FIGS. 1 and 2, their description is not repeated.

Fifteenth Exemplary Embodiment

Figure 24:
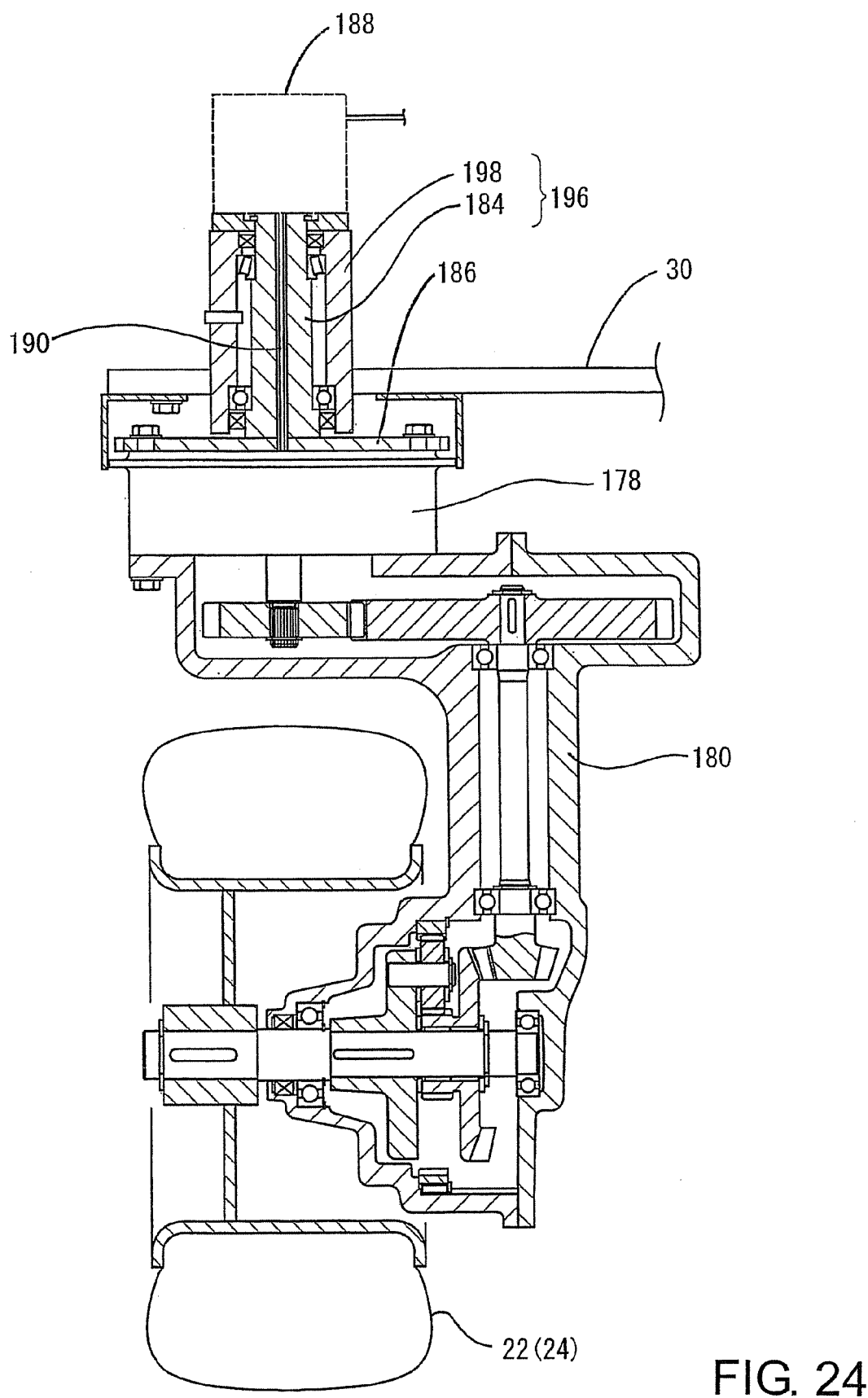
FIG. 24 illustrates a cross-sectional view of a support portion and a driving portion for a caster wheel according to a fifteenth exemplary embodiment of the present invention.

FIG. 24 illustrates a cross-sectional view of a support portion and a driving portion for the caster wheel 22 (or 24) according to a fifteenth exemplary embodiment of the present invention that relates to the first aspect. This embodiment is different from the first exemplary embodiment described with reference to FIGS. 1 and 2 in that the caster wheel 22 (or 24) is driven by the electric traction motor 178 and can be forcibly steered by an electric steering motor.

In this embodiment, the gear 186 is fixed to the casing of the electric motor 178 by means of screws. The electric motor 178 has a rotational shaft extending in the vertical direction. The gear 186 is integrally fixed to the shaft portion 184 constituting the supporting member 196. The support housing 180 is fixed to the lower surface of the casing accommodating the electric motor 178. The rotation of the rotational shaft of the electric motor 178 can be transmitted to the caster wheel 22 (or 24) via the gear mechanism including a pair of spur gears, a pair of bevel gears, and a planetary gear mechanism.

If the structure illustrated in FIG. 24 is inversed in the right-and-left direction, the structure can be applied to the other caster wheel 24 (or 22). Because the remaining configuration and actions are the same as in the above described fourteenth embodiment illustrated in FIGS. 22 and 23, the same reference numerals are assigned to equivalent portions and their description is not repeated.

Sixteenth Exemplary Embodiment

Figure 25:
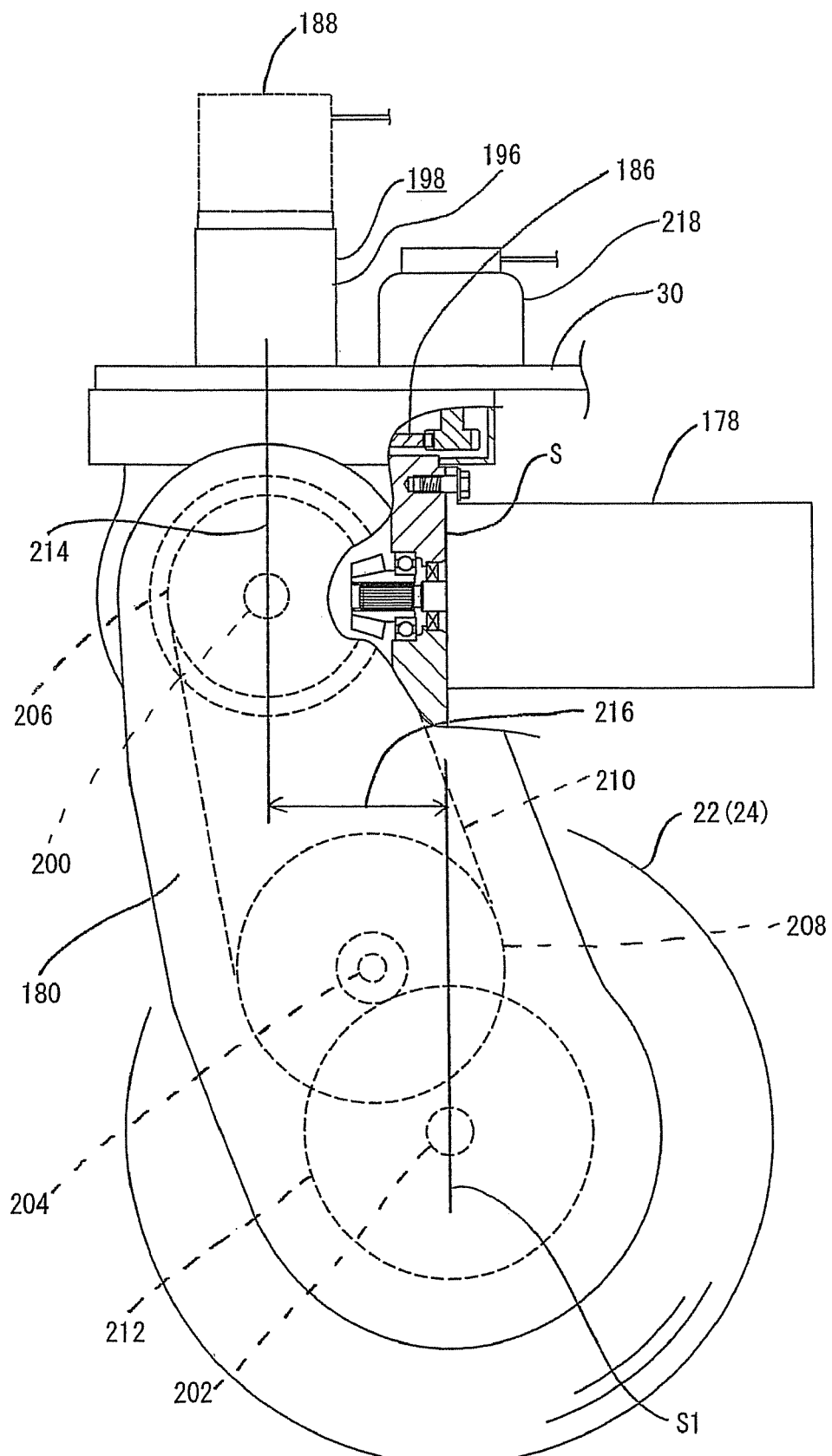
FIG. 25 illustrates a partial cross-sectional view of a support portion and a driving portion for a caster wheel according to a sixteenth exemplary embodiment of the present invention.

FIG. 25 illustrates a partial cross-sectional view of a support portion and a driving portion for the caster wheel 22 (or 24) according to a sixteenth exemplary embodiment of the present invention that relates to the first aspect. In the present embodiment, the configuration of the above described fourteenth embodiment illustrated in FIG. 22 is modified such that the electric motors 178 for driving the caster wheels 22 and 24 are provided in positions that are rotated 90 degrees when taking steering axis 214 in the vertical direction as a center, and an upper side rotary shaft 200 is operatively coupled to a rotary shaft of the electric motors 178 by a bevel gear mechanism. A steering axis 214 is a vertical axis defining the steering center of the wheel 22 (or 24). The electric motor 178 has a rotational shaft extending in the horizontal direction. An intermediate rotary shaft 204 is disposed between the upper side rotary shaft 200 and the lower side rotary shaft 202 that is fixed to the caster wheels 22 and 24, and a chain 210 is suspended between a driving side sprocket 206 that is fixed to the upper side rotary shaft 200 and a driven side sprocket 208 that is fixed to the intermediate rotary shaft 204. The intermediate rotary shaft 204 and the lower side rotary shaft 202 are operatively coupled by a gear mechanism 212. As a result, the rotary shafts of the electric motors 178 and the lower side rotary shafts 202 that are fixed to the caster wheels 22 and 24 are operatively coupled by a chain sprocket mechanism. Furthermore, the support housing 180 has a setup surface S for the electric motor 178 which is positioned at the opposite side relative to a chain sprocket mechanism (right side in FIG. 25) and.

A virtual plane S1 extends in the up-and-down direction and crossing the center axis of the caster wheel 22 (or 24). The steering axis 214 is positioned on one side relating to the virtual plane S1. The electric motor set up surface S faces the other side relating to the virtual plane S1. Furthermore, a virtual plane including the electric motor setup surface S is positioned near or on the center axis of the caster wheel 22 (or 24). The virtual plane including the electric motor setup surface S can be offset from the center axis of the caster wheel 22 (or 24) in the right-and-left direction in FIG. 25. Furthermore, the gear 186 fixed on the upper portion of the support housing 180 meshes with a gear fixed on the rotational shaft of the electric steering motor 218. When the electric steering motor 218 rotates, the caster L wheel 22 (or 24), the support housing 180, and the chain sprocket mechanism rotate together about the vertical steering axis 214.

Furthermore, according to the illustrated example, the steering axis 214 of the caster wheel 22 (or 24) is offset from the virtual plane S1 extending in the up-and-down direction and crossing the center axis of the caster wheel 22 (or 24). This offset is generally referred to as "caster trail" 216. If the caster trail 216 is appropriate, the steering angle of the caster wheel 22 (or 24) which is freely steerable can be stabilized when the main drive wheels 12 and 14 (refer to FIG. 2) are driven. In FIG. 25, the left part corresponds to the front side of the vehicle in the longitudinal direction. The right part corresponds to the rear side of the vehicle in the longitudinal direction. If the structure illustrated in FIG. 25 is inversed in the right-and-left direction as well as in the back-and-rear direction, the structure can be applied to the other caster wheel 24 (or 22). The remaining configuration and actions are the same as in the above described fourteenth embodiment illustrated from FIG. 22. The caster trail 216 can be set to 75 mm or less (including 0 mm).

Seventeenth Exemplary Embodiment

Figure 26:
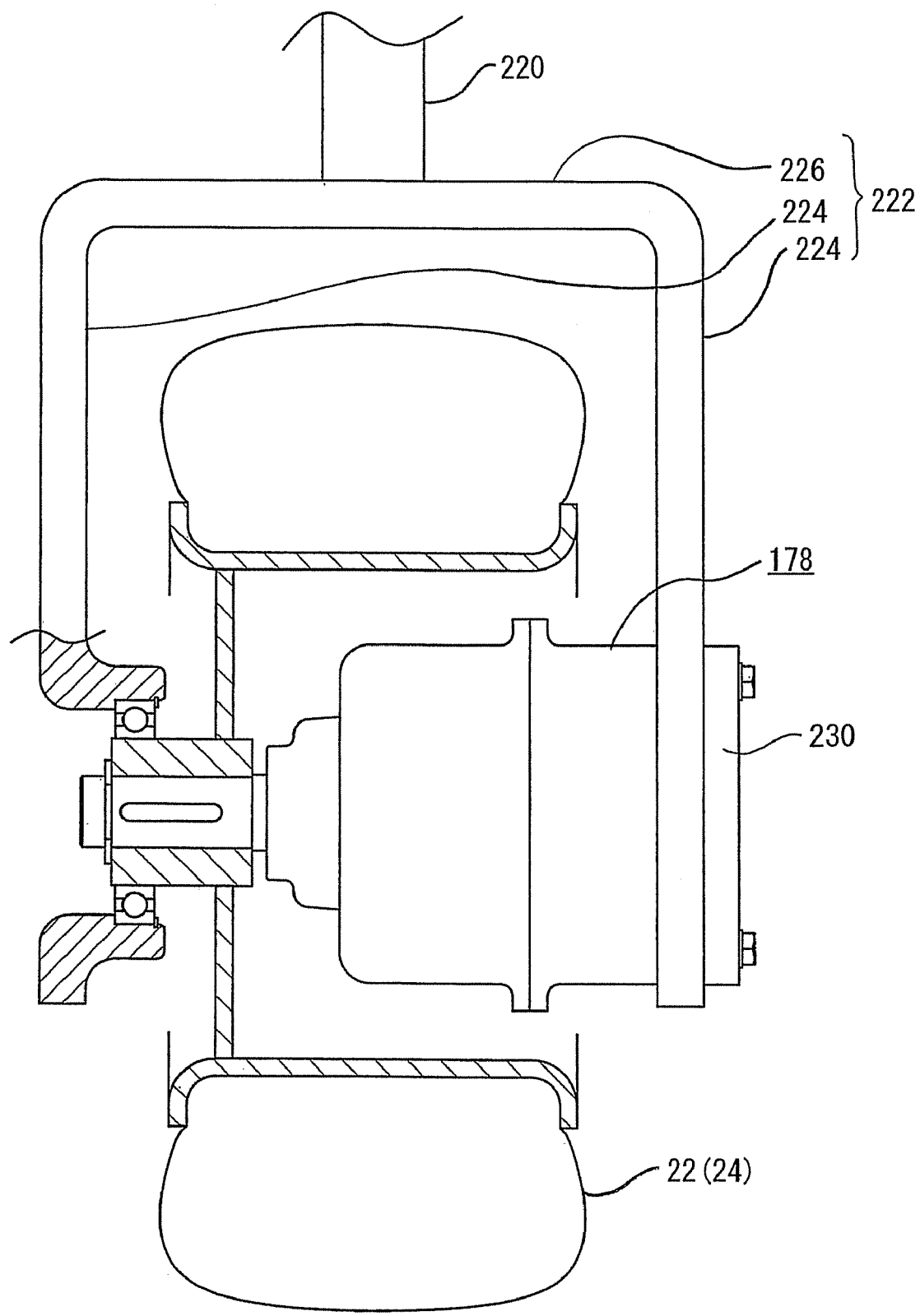
FIG. 26 illustrates a partial cross-sectional view of a caster wheel and a caster wheel support portion according to a seventeenth exemplary embodiment of the present invention.

FIG. 26 illustrates a partial cross-sectional view of the caster wheel 22 (or 24) and a caster wheel support portion according to a seventeenth exemplary embodiment of the present invention that relates to the first aspect. This embodiment is different from the first exemplary embodiment described with reference to FIGS. 1 and 2 in that a support shaft 220 extending in the vertical direction is supported to the main frame 30 (refer to FIG. 1) via a bearing (not illustrated) so that the support shaft 220 can freely rotate about the center axis of the support shaft 220. The support shaft 220 has a lower portion connected to a caster wheel supporting member 222. The caster wheel supporting member 222 includes a pair of support plate portions 224 having upper ends connected via a joint portion 226. The support plate portions 224 are faced to axial ends of the caster wheel 22 (or 24).

Figure 27:
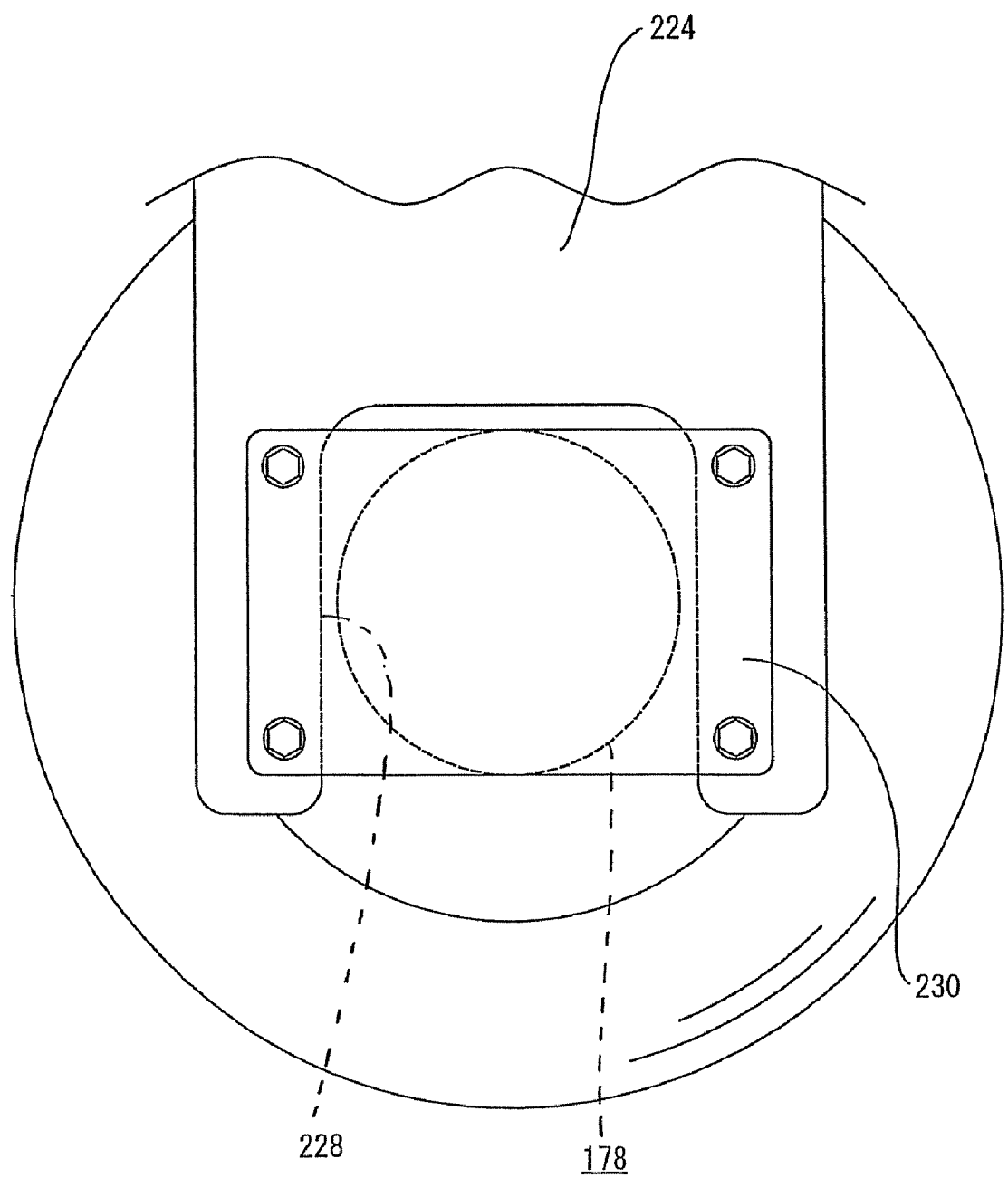
FIG. 27 is a right side view of the structure illustrated in FIG. 26.

One end of the casing accommodating the electric traction motor 178 for driving the caster wheel 22 (or 24) is fixed to one support plate portion 224 (right in FIG. 26). The rotational shaft of the electric motor 178 is fixed to the caster wheel 22 (or 24). FIG. 27 is a right side view of the structure illustrated in FIG. 26. As illustrated in FIG. 27, a recessed portion 228 is formed at the lower end of one support plate portion 224. In a state where the casing of the electric motor 178 is partly inserted into the recessed portion 228, a plate portion 230 constituting the casing is fixed to the support plate portion 224 by means of screws.

Referring again to FIG. 26, a bearing is provided between an opening formed on the other support plate portion 224 (left in FIG. 26) and the front end portion of the rotational shaft of the electric motor 178. The center of a tire of the caster wheel 22 (or 24) in the width direction accords with the center axis of the support shaft 220. As described above, in this embodiment, the caster wheel 22 (or 24) is supported in a condition in which it can rotate by both sides of the caster wheel supporting member 222 fixed to the main frame 30 relating to caster wheel 22 (or 24). The caster wheel 22 (or 24) can be driven by the electric motor 178. Because the remaining configuration and actions are the same as in the above described first embodiment illustrated in FIGS. 1 and 2, a duplicate illustration and description thereof is omitted.

The gear mechanism used for steering the caster wheel 22 (or 24) in the above-described fourteenth through seventeenth exemplary embodiments illustrated in FIGS. 22 through 26 can be replaced with a chain sprocket mechanism or other power transmission mechanism. Furthermore, in the above-described fourteenth through seventeenth exemplary embodiments illustrated in FIGS. 22 through 26, a clutch (e.g., a one-way clutch, or a two-way clutch) can be provided in the power transmission mechanism between the electric traction motor 178 and the caster wheel 22 (or 24). For example, the two-way clutch includes a switching unit capable of switching the path of power transmission between two one-way clutches.

Furthermore, in the above-described thirteenth through seventeenth exemplary embodiments illustrated in FIGS. 21 through 26, the main drive wheels 12 and 14 or the caster wheels 22 and 24 can be configured to be structurally symmetrical in the right-and-left direction or identical with each other. Furthermore, the above-described thirteenth through seventeenth exemplary embodiments illustrated in FIGS. 21 through 27 can be selectively combined with the above-described second through twelfth exemplary embodiments illustrated in FIGS. 4 through 20. Furthermore, the caster wheels 22 and 24 can be replaced with omni wheels which can move in the rotation axis direction of the caster wheels 22 and 24. The omni wheels, if include no driving mechanism, can be selectively combined with the arrangement described in the above-described fourteenth through seventeenth exemplary embodiments illustrated in FIGS. 22 through 26.

Although not illustrated in the drawings of the above-described embodiments, it is preferable to provide an appropriate neutral zone for the operation unit such as the operating lever 28 (FIG. 1) and the steering wheel 74 (FIG. 9). It is also preferable to provide a setting unit enabling an operator to manually select the setting of the neutral zone. For example, in the first exemplary embodiment described with reference to FIGS. 1 and 2, if the operation lever 28 is in an upright position (i.e., in a released position), the electric motor 16 (or 18) is stopped (i.e., in a neutral state). If an operator pushes the operation lever 28 forward or pulls it backward, the corresponding electric motor 16 (or 18) rotates in the forward or backward direction.

However, if a neutral zone is set, the controller controls the diving circuit of each electric motor 16 (or 18) so that the corresponding electric motor 16 (or 18) is kept in a stopped condition until the inclination of the operation lever 28 exceeds a predetermined angle. Furthermore, it is preferable to provide a switch enabling an operator to selectively set the neutral zone and input a switching signal to the controller. If it is determined that setting of a neutral zone is requested based on a switching signal, the controller stops the corresponding electric motor 16 (or 18) until the inclination of the operation lever 28 exceeds a predetermined angle. Furthermore, it is preferable to provide a unit enabling an operator to arbitrary adjust setting of range of the neutral zone. Additionally, the neutral zone is selectable from among a plurality of preset values.

Eighteenth Exemplary Embodiment

Figure 28:
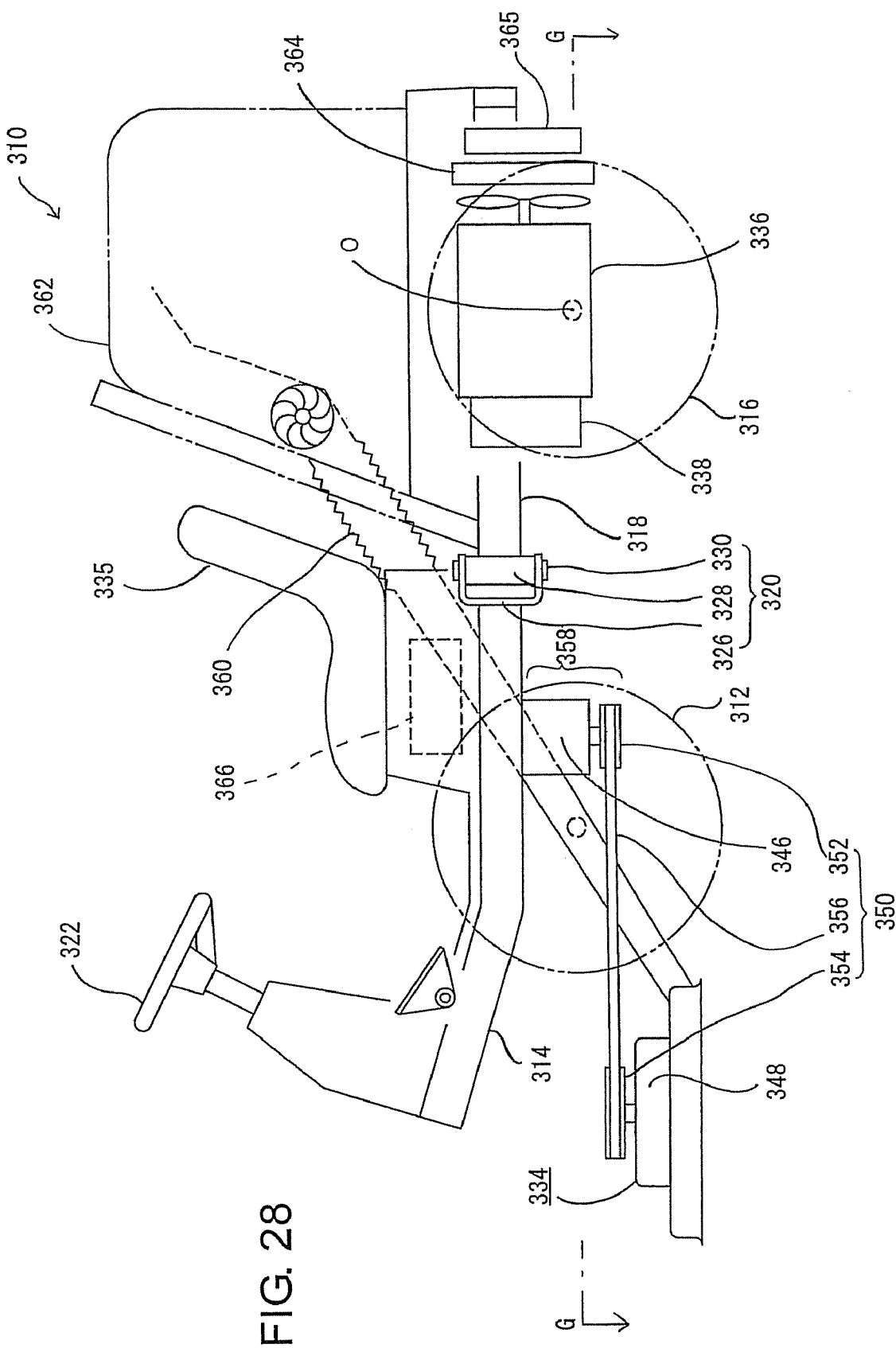
FIG. 28 illustrates a schematic diagram of a configuration of a lawnmower vehicle according to an eighteenth exemplary embodiment of the present invention.
Figure 29:
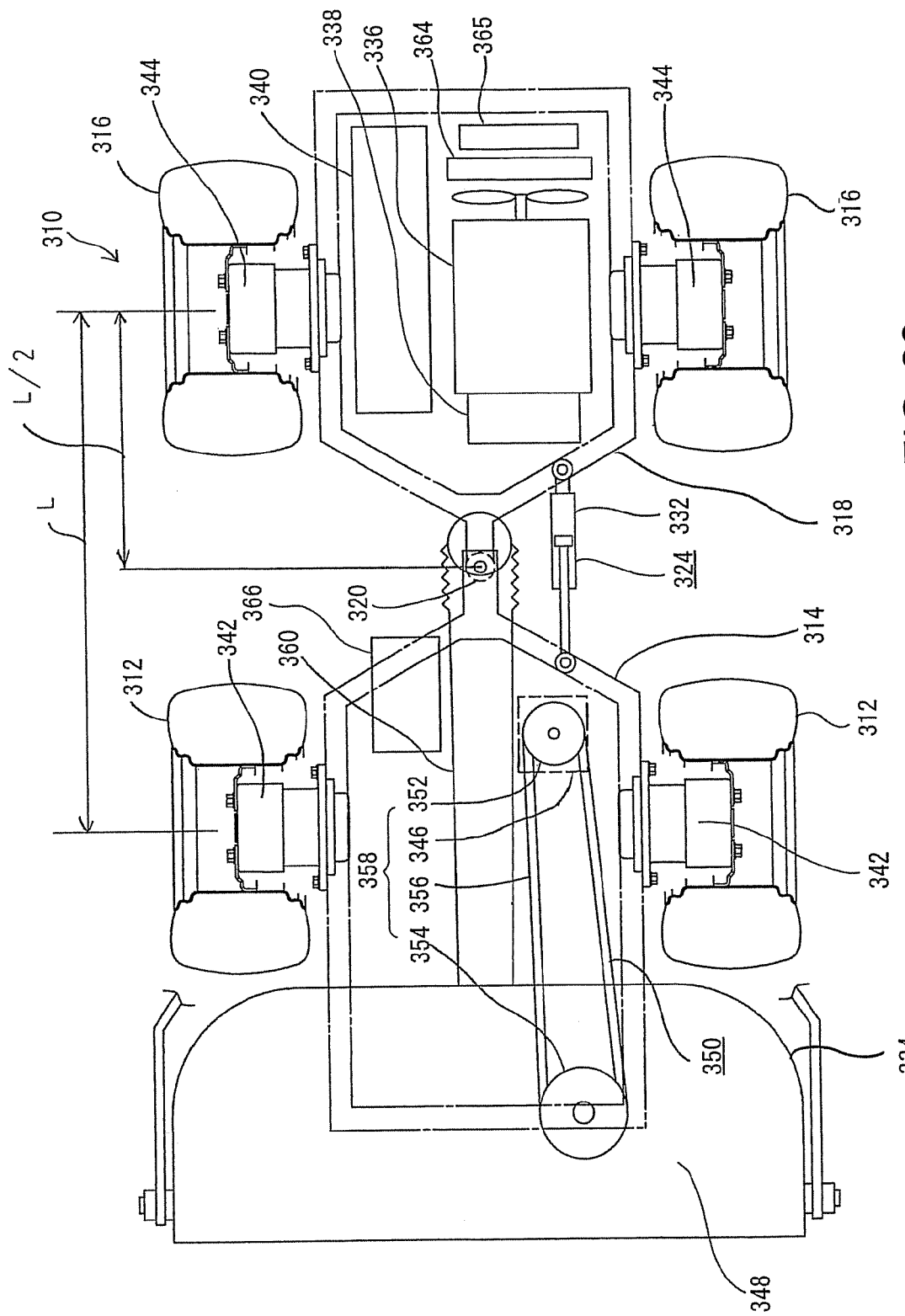
FIG. 29 illustrates a cross-sectional view substantially taken along a line G-G of FIG. 28.

An eighteenth exemplary embodiment of the present invention is described with reference to the attached drawings. FIG. 28 illustrates an example configuration of a lawnmower vehicle 310 (riding lawnmower vehicle) according to the eighteenth exemplary embodiment of the present invention that relates to a second aspect. FIG. 29 illustrates a cross-sectional view of the lawnmower vehicle taken along a line G-G of FIG. 28. The front-and-rear direction in the following description accords with the front-and-rear direction of a vehicle. For example, the left side of FIG. 28 or 29 is the front side of a vehicle and the right side is the rear side of the vehicle. In the following embodiment, a secondary battery is a source capable of supplying electric power to an electric motor. The secondary battery can be replaced with a capacitor.

Furthermore, the electric motor according to this embodiment is not only an electric power supply source operable to transmit a rotational driving force to at least the main drive wheel but also a generator operable to recover regenerative energy when a braking force is applied to the wheel. Furthermore, the lawnmower vehicle according to this embodiment is a hybrid-type vehicle that includes a secondary battery (electric accumulator), an engine, and a generator. The secondary battery is a power source unit capable of supplying electric power to an electric motor. The engine and the generator can supply electric energy to the secondary battery.

The secondary battery which stores electric energy supplied from an external device is replaceable with any power source unit having a self generation function (e.g., fuel cell, or solar battery). For example, it is preferable to provide a power generation panel for a solar battery on a lawnmower vehicle body, fender, sun visor, grass storage tank, or the like. Furthermore, in the following description, the lawnmower vehicle can be a four-wheel drive type vehicle that drives all of front and rear wheels by electric motors or a two-wheel drive type vehicle that drives either the front wheels or the rear wheels by electric motors.

The lawnmower vehicle 310 includes an articulated-type turning mechanism. The lawnmower vehicle 310 includes a front frame 314 supporting two front wheels 312 and a rear frame 318 supporting two rear wheels 316. The front frame 314 and the rear frame 318 are linked with each other via a joint unit 320 and can swing about the joint unit 320 in such a manner that the vehicle body can twist. A steering apparatus 324 (FIG. 29) changes a twist angle between the front frame 314 and the rear frame 318 in accordance with an operation of a steering wheel 322 (FIG. 28). The steering apparatus 324 includes a turning cylinder 332 (FIG. 29). Furthermore, the lawnmower vehicle 310 includes a mower 334.

Furthermore, the joint unit 320 includes a center pin 330 connecting the front frame 314 to the rear frame 318. The center pin 330 is positioned between front and rear axles in the longitudinal direction of the vehicle (in the right-and-left direction in FIG. 28 and FIG. 29). Namely, the center pin 330 is positioned on the midpoint of a line connecting a rotation center of the front wheels 312 to a rotation center of the rear wheels 316. It is however acceptable that the center pin 330 is offset from the midpoint of the line connecting the rotation center of the front wheels 312 to the rotation center of the rear wheels 316.

The lawnmower vehicle 310 includes an engine 336 (driving source), a generator 338, a secondary battery 340 (refer to FIG. 29), two electric front-wheel driving motors 342, and two electric rear-wheel driving motors 344. The engine 336 is an internal combustion engine. The generator 338 is connected to an output shaft of the engine 336 and is driven by the engine 336. The secondary battery 340 stores electric energy supplied from the generator 338. To independently drive the front wheels 312 and the rear wheels 316, two electric front-wheel driving motors 342 are provided on the front side of the vehicle, and two electric rear-wheel driving motors 344 are provided on the rear side. The front-wheel drive electric motors 342 and the rear-wheel drive electric motors 344 correspond to the electric traction motor.

The output shaft of the engine 336 is connected to, or integrally formed with, a drive shaft of the generator 338. If a drive pulley is fixed to an end of the output shaft of the engine 336 and a driven pulley is fixed to the drive shaft of the generator 338, the engine 336 can transmit the driving force to the generator 338 via a belt wound around the drive pulley and the driven pulley.

The electric motors 342 and 344 are driven by electric power that is supplied from the secondary battery 340. Each casing accommodating the electric front-wheel driving motor 342 is fixed to the front frame 314. Each casing accommodating the electric rear-wheel driving motor 344 is fixed to the rear frame 318. The mower 334 is supported via a supporting mechanism (not illustrated) to the front frame 314 on the front side of the front wheels 312. The mower 334 is operationally connected to a mower driving motor 346 (power source). The mower driving motor 346 is fixed to the bottom of the front frame 314 (vehicle body frame) on the rear side (right side in FIG. 28) of a deck 348 constituting the mower 334 in the longitudinal direction of the vehicle.

The mower driving motor 346 is, for example, an electric motor or a hydraulic motor. According to the illustrated example, a power transmission mechanism 350 is provided between the mower driving motor 346 and the mower 334. The mower 334 includes one or more mower blades (not illustrated in FIGS. 28 and 29) which are supported to the deck 348 and can rotate about a vertical axis. The power transmission mechanism 350 can transmit the driving force of the mower driving motor 346 to the mower 334. The power transmission mechanism 350 includes a belt 356 wound around a drive pulley 352 fixed to a rotational shaft of the mower driving motor 346 and a driven pulley 354 fixed to the drive shaft of the mower blade.

Here, the mower 334 is connected to the mower driving motor 346 via the power transmission mechanism 350 that can transmit a driving force. The mower driving motor 346 and the power transmission mechanism 350 cooperatively constitute a mower driving apparatus 358. The configuration including the mower driving motor 346 fixed to the vehicle body frame, and the power transmission mechanism 350 including the belt 356 wound around two pulleys 352 and 354 can be replaced with the mower driving apparatus 44 (refer to FIG. 1) described in the first through sixth exemplary embodiments illustrated in FIGS. 1 through 12.

A working machine lifting actuator (not illustrated) can adjust the height of the mower 334. For example, if the working machine lifting actuator includes a hydraulic cylinder, an electric motor or the engine 336 can drive a hydraulic pump (i.e., hydraulic source) to supply pressure oil to the hydraulic cylinder. Furthermore, the mower 334 can include auxiliary caster wheels (not illustrated). The mower 334 is connected to a discharge duct 360 (grass-collecting duct) via which the cut grass can be discharged rearward. The discharge duct 360 is configured to comprise a bellows-like portion.

The discharge duct 360 has a front end connected to the rear end center of the deck 348 in the width direction thereof. The discharge duct 360 extends rearward between two front wheels 312 from rear end portion of the deck 348 and further extends obliquely upward on the rear side of a driver's seat 335 and above the joint unit 320 connecting the front frame 314 to the rear frame 318. The discharge duct 360 has a rear end connected to a grass storage tank 362. Accordingly, the grass storage tank 362 is connected via the discharge duct 360 to the mower 334, more specifically to the rear end portion of the deck 348 constituting the mower 334.

According to one example, the mower blade can be configured to have a steel wire or a resin-made (e.g., polyamide resin) wire at its front end portion. According to this configuration, an operator can smoothly cut lawn grass with the wire forcibly swung and protruding laterally from the deck 348. Thus, energy consumption of the mower 20 can be reduced. Furthermore, a deceleration device including a deceleration mechanism (e.g., a gear mechanism including at least one deceleration stage) can be provided in the power transmission mechanism that transmits the driving force of the mower driving motor 346 to the drive shaft of the mower blade.

Furthermore, both the discharge duct 360 and the power transmission mechanism 350 are positioned between two (right and left) electric front-wheel driving motors 342. Alternatively, either the discharge duct 360 or the power transmission mechanism 350 can be positioned between two (right and left) electric front-wheel driving motors 342. Furthermore, the mower driving motor 346 and the discharge duct 360 overlap each other when viewed one end to the other end in the width direction of the lawnmower vehicle 310 (i.e., from front side to rear side in FIG. 28, or from downside to upside in FIG. 29).

Furthermore, the discharge duct 360 can be configured to overlap at least one of the mower driving motor 346, the secondary battery 340, and a capacitor when viewed from one end to the other end in the width direction of the lawnmower vehicle 310. Furthermore, as illustrated in FIG. 29, the mower driving apparatus 358 is offset from the center of the lawnmower vehicle 310 in the width direction thereof. At least one of the mower driving apparatus 358 and the discharge duct 360 can be offset away from the center of the lawnmower vehicle 310 in the width direction thereof.

As illustrated in FIG. 29, the engine 336, the generator 338, and the secondary battery 340 are fixed to the bottom of a flat horizontal plate constituting the rear frame 318. Namely, the engine 336, the generator 338, and the secondary battery 340 are positioned under the grass storage tank 362 (FIG. 28). At least one of the engine 336, the generator 338, and the secondary battery 340, a fuel cell, a capacitor, and an inverter can be fixed to the rear frame 318. It is also preferable to position at least one of the fuel cell, the capacitor, and the inverter under the grass storage tank 362 (FIG. 28). The engine 336, the generator 338, and the secondary battery 340 are positioned between two rear wheels 316. It is also preferable to position at least one of the engine 336, the generator 338, and the secondary battery 340, the fuel cell, the capacitor, and the inverter between two rear wheels 316.

The engine 336 and the secondary battery 340 have a lower end positioned at the same height as, or below, the rotation center axis O (FIG. 28) of the rear wheels 316. The secondary battery 340 can be configured to be easily detachable from the rear frame 318 or a member fixed to the rear frame 318 by means of a clamp or the like. Furthermore, at least one of the secondary battery 340, the capacitor, and the fuel cell can be configured to be easily detachable from the rear frame 318 (or the front frame 314) or the member fixed to the rear frame 318 (or the front frame 314) by means of a clamp or the like.

The engine 336 according to this embodiment is smaller than a comparable engine provided to a general lawnmower vehicle that can generate a sufficient power to drive at least either the front wheels or the rear wheels without using any electric motor (i.e., a non-hybrid type). A fuel tank (capable of storing gasoline) according to this embodiment is also smaller than a comparable fuel tank provided to a general lawnmower vehicle.

Furthermore, the engine 336 and the secondary battery 340 overlap each other when viewed from one end to the other end in the width direction of the vehicle. Furthermore, the engine 336, the secondary battery 340, a radiator 364 (cooling device), and the rear wheels 316 overlap each other when viewed from one end to the other end in the width direction of the vehicle. The radiator 364 cools cooling water supplied to the engine 336. Furthermore, an oil cooler 365 is provided on the rear side of the radiator 364. The oil cooler 365 can cool lubrication oil supplied to the engine 336 or cooling oil supplied to the electric motors 342 and 344. The secondary battery 340 is fixed to the rear frame 318. In this configuration or another configuration which does not have the secondary battery 340, another secondary battery can be disposed under the driver's seat 335 of the front frame 314.

Furthermore, a motor control unit 366 is disposed on the front frame 314 and under the driver's seat 335. The control unit 366 controls operations of the secondary battery 340, the electric front-wheel driving motors 342, and the electric rear-wheel driving motors 344. The motor control unit 366 includes a controller (control circuit unit), an inverter, and a DC/DC converter. According to another embodiment, at least one of the controller, the inverter, and the DC/DC converter can be disposed under the driver's seat 335.

The electric front-wheel driving motors 342 and the electric rear-wheel driving motors 344 are DC brushless motors that can rotate in both forward and backward directions. The controller can control the rotational speed (number of revolutions per unit time) of respective electric motors 342 and 344.

The motor control unit 366 includes electric motor driving circuits corresponding to respective electric motors 342 and 344. The electric motor driving circuit drives a corresponding electric motor 342 (or 344) according to a control signal supplied from the CPU. As feedback from the first electric motors 342 and 344, signals representing rotational speed (number of revolutions per unit time), rotational direction, current value, and the like are sent to the motor control unit 366. Furthermore, an electrically driven braking unit (not illustrated) that applies a braking force to the front wheels 312 or the rear wheels 316 is provided at an appropriate portion corresponding to the electric motors 342 (or 344).

The motor control unit 366 generates a control signal supplied to the braking unit. The electric energy generated by the generator 338 can be supplied directly or via the secondary battery 340 to the electric motors 342 and 344. In another embodiment, the electric motors 342 (or 344) can be configured to function as a generator capable of generating electric energy when a braking force is applied to either the front wheels 312 or the rear wheels 316. The electric energy generated by the electric motors 342 (or 344) can be stored via a corresponding electric power regeneration unit(s) into the secondary battery 340.

The secondary battery 340 is, for example, a lead storage battery, lithium-ion battery pack, or nickel hydrogen battery pack, which can store electric energy and, if necessary, can supply electric power to the electric motors 342 and 344 or other electric loads.

The secondary battery 340 can supply electric energy to the mower driving motor 346 (i.e., a power source for the mower 334). An operator can control an operation of the mower driving motor 346 by turning on or off a lawnmower startup switch (not illustrated) provided near the driver's seat 335 (FIG. 28) If the mower driving motor 346 is an electric motor, the motor control unit 366 detects an on/off state of the lawnmower startup switch (not illustrated) and controls a drive circuit for the mower driving motor 346 based on a detection signal to cause the mower driving motor 346 to operate or stop. As described above, if the mower driving motor 346 is an electric motor, an operator can operate the mower 334 while the engine 336 is not operating. Thus, the user can operate the mower with less noise.

In another embodiment, the controller can adjust a rotational speed difference between right and left electric motors 342 and 344 (FIG. 29) when an operator rotates the steering wheel 322 (i.e., in accordance with a twist motion of the front frame 314 and the rear frame 318). For example, if the vehicle turns left (or right), both the right front wheel 312 and the right rear wheel 316 are positioned on the outer (or inner) side of the turning vehicle. Both the left front wheel 312 and the left rear wheel 316 are positioned on the inner (outer) side of the turning vehicle. In this case, under a rotational speed control performed for the electric motors 342 and 344, the rotational speeds of the right front wheel 312 and the right rear wheel 316 become faster (or slower) than the rotational speeds of the left front wheel 312 and the rear wheel 316.

The degree of operation (amount of rotation) of the steering wheel 322 (FIG. 28) can be detected by a steering sensor (operation amount detection unit) and sent to the motor control unit 366 that controls the operation of respective electric motors 342 and 344 based on the detection signal. In this case, an actuator expands or contracts the turning cylinder 332 in accordance with a rotational direction and an operation amount (the degree of operation) of the steering wheel 322. A power steering device, if provided on the vehicle, can reduce the level operating force required to operate the steering wheel 322 (FIG. 28). An electric motor or the engine 336 can drive a hydraulic pump (hydraulic source) to supply pressure oil to a hydraulic cylinder constituting the power steering device.

The riding lawnmower vehicle according to this embodiment includes the front frame 314 supporting the front wheels 312, the rear frame 318 supporting the rear wheels 316, and the joint unit 320 connecting the front frame 314 and the rear frame 318 that cooperatively constitute an articulated vehicle body. The steering apparatus 324 changes the twist angle between the front frame 314 and the rear frame 318 according to operation of the steering wheel 322. Thus, the front wheels 312 or the rear wheels 316 can change the orientation appropriately, without causing any slip, or with reducing slip, during a turning operation of the vehicle. The joint unit 320 includes an appropriate mechanism (not illustrated) for supporting the front frame 314 and the rear frame 318 in such a manner that they can swing about a rotation axis extending in the front-and-rear direction. Thus, the vehicle can smoothly travel over a rough road or ground with four wheels (front wheels 312 and rear wheels 316) stably contacting the road or ground.

The present embodiment provides an improved structure for an articulated vehicle body including the front frame 314 and the rear frame 318 and capable of changing the twist angle between the front frame 314 and the rear frame 318 according to the operation of the steering wheel 322. The mower 334 is connected to the grass storage tank 362 via the discharge duct 360. The power transmission mechanism 350 can transmit the rotational force of the mower driving motor 346 to the mower 334.

The power transmission mechanism 350 includes two pulley, i.e., drive pulley 352 and the driven pulley 354, and the belt 356 wound around these pulleys. Furthermore, the discharge duct 360 and the power transmission mechanism 350 are positioned between two electric motors 342 (FIG. 29) that drive the front wheels 312. Thus, this embodiment can effectively use a space between two electric motors 342 driving the front wheels. The limited space of the vehicle can be effectively used. Furthermore, the discharge duct 360 connecting the mower 334 and the grass storage tank 362 (FIG. 28) can be configured into a nearly straight shape which is easy to collect cut grass.

The engine 336, the generator 338, and the secondary battery 340 (FIG. 29) are fixed to the rear frame 318. According to this embodiment, the driver's seat 335 (FIG. 28) is provided on the front frame 314 and the rear frame 318 has a space which can be effectively used. Thus, the limited space of the vehicle can be more effectively used.

The mower driving motor 346 for the mower 334 is fixed to the front frame 314. The driving mechanism for the mower 334 is not provided on the rear frame 318. The limited space of the vehicle can be effectively used. The mower driving motor 346 is offset from the mower 334 of the vehicle in the longitudinal (front-and-rear) direction thereof. A wide space can be provided between the mower 334 and the front frame 314. The efficiency of use of the finite space of the vehicle can be enhanced. Namely, while maintaining a wide space comparable to that of a conventional lawnmower vehicle, the front frame 314 and the rear frame 318 can be lowered. The lower space of the vehicle can be effectively used. As a result, the effect of using a limited space of the vehicle can be enhanced.

Furthermore, the centroid of the vehicle can be lowered if the front frame 314 and the rear frame 318 are lowered. Furthermore, because this arrangement enables use of parts or components, such as the driven pulley 354, used for a conventional riding lawnmower vehicle that includes a power transmission mechanism for transmitting the driving force of the engine 336 to the lawnmower 334, this arrangement can be realized at reduced cost.

The front wheels 312 are driven by the electric front-wheel driving motors 342. The rear wheels 316 are driven by the electric rear-wheel driving motors 344. This is preferable for reducing the fuel required for the vehicle having the front frame 314 and the rear frame 318 swingably connected and cooperatively constituting an articulated body whose twist angle can be changed according to a rotation of the steering wheel 322.

Furthermore, the engine 336 and the secondary battery 340 have a lower end positioned at the same height as, or below, the rotation center axis O (FIG. 28) of the rear wheels 316. Therefore, the centroid of the lawnmower vehicle 310 can be lowered. The lower space of the lawnmower vehicle 310 can be effectively used. As a result, the efficiency of use of a limited space of the vehicle can be enhanced. Furthermore, the electric front-wheel driving motors 342 are fixed to the front frame 314. The electric rear-wheel driving motors 344 are fixed to the rear frame 318. The front wheels 312 are rotatably supported by the casing of the electric motors 342. The rear wheels 316 are rotatably supported by the casing of the electric motors 344. The front wheels 312 and the rear wheels 316 can include the same type tires.

Nineteenth Exemplary Embodiment

Figure 30:
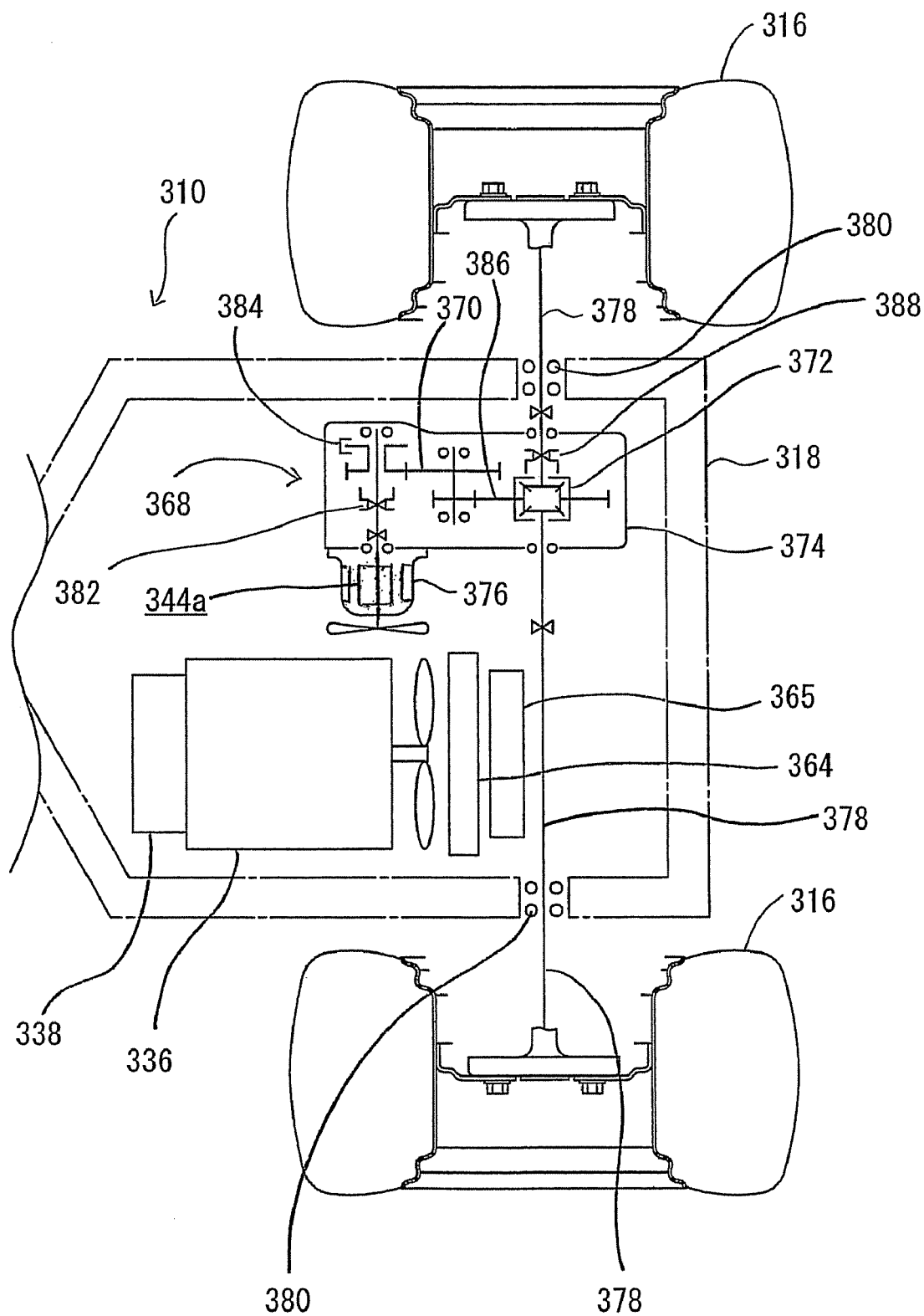
FIG. 30 illustrates a lawnmower vehicle according to a nineteenth exemplary embodiment of the present invention, corresponding to the right portion of FIG. 29.

FIG. 30 illustrates a lawnmower vehicle according to a nineteenth exemplary embodiment of the present invention that relates to the second aspect, corresponding to the right hand portion of FIG. 29. This embodiment includes an electric rear-wheel driving motor 344a common to two rear wheels 316. The electric rear-wheel driving motor 344a can drive both of the rear wheels 316. A single motor unit 368 is fixed to the rear frame 318 under the rear frame 318. The motor unit 368 includes the electric rear-wheel driving motor 344a commonly used to drive two rear wheels 316, a deceleration gear mechanism 370 including at least one deceleration stage, and a differential gear mechanism 372. A gear casing 374 covering the deceleration gear mechanism 370 and the differential gear mechanism 372 is integrally fixed with a casing 376 constituting the electric rear-wheel driving motor 344a.

The electric rear-wheel driving motor 344a is offset rightward (upward in FIG. 30) from the center of the rear frame 318 in the width direction of the vehicle (the up-and-down direction in FIG. 30). The motor unit 368 is offset rightward (upward in FIG. 30) from the center of the rear frame 318 in the width direction of the vehicle (the up-and-down direction in FIG. 30). If the motor unit 368 is offset from the center of the rear frame 318 in the width direction of the vehicle, the engine 336 can be disposed on the opposite side of the rear frame 318 in the width direction of the vehicle. Thus, the degree of effectively using a limited space can be enhanced. If the rear wheels 316 are both, or all, driven by the single motor unit 368, the number of electric motors required for driving the rear wheels 316 can be reduced and the cost can be reduced. Furthermore, a height size of the motor unit 368 (front-to-back direction in FIG. 30) is shorter than a longitudinal size of the motor unit 368 (right-and-left direction in FIG. 30). The lower space of the lawnmower vehicle 310 can be effectively used. As a result, the efficiency of use of the lower space of the vehicle can be enhanced.

The right and left rear wheels 316 are fixed to right and left axles 378 which are engaged with differential side gears of the differential gear mechanism 372. Each axle 378 includes a plurality of shafts connected via constant velocity joints. The driving force of the electric rear-wheel driving motor 344a can be transmitted to the right and left rear wheels 316 via the deceleration gear mechanism 370, the differential gear mechanism 372, and the right and left axles 378. Furthermore, two bearings 380 are provided at both ends of the rear frame 318 in the width direction. More specifically, the bearing 380 has an outer ring directly fixed to the rear frame 318 and supports an intermediate portion of the axle 378 so that the axle 378 can freely rotate. The right side (upper side in FIG. 30) axle 378 is shorter than the left side (lower side in FIG. 30) axle 378.

Furthermore, a clutch 382 is provided between a rotational shaft of the electric rear-wheel driving motor 344a and a rotational shaft constituting the deceleration gear mechanism 370. The clutch 382 is a manual type or an automatic type that can selectively connect or disconnect a power transmission path. For example, if the electric rear-wheel driving motor 344a is malfunctioned or failed, an operator can cause the clutch 382 to disconnect the power transmission path to let the vehicle move smoothly. The deceleration gear mechanism 370 includes a brake 384 that can decelerate and stop the rotating shaft of the electric rear-wheel driving motor 344a. The brake 384 is positioned near an outer periphery of a disc plate fixed to the rotational shaft constituting the deceleration gear mechanism 370. The brake 384 can apply a pressing force to both sides of the disc plate. The brake 384 is driven manually or automatically by an operator via an operation unit.

Furthermore, a differential lock mechanism 388 is provided between a ring gear meshing with a drive shaft 386 constituting the differential gear mechanism 372 and the right (upper side in FIG. 30) axle 378. The differential lock mechanism 388 includes a clutch that can lock the differential gear mechanism 372 if an operator presses a differential lock on/off switch. When the differential gear mechanism 372 is locked, two rear wheels 316 can integrally rotate at the same rotational speed. For example, if one of the right and left rear wheels 316 is trapped in a low friction area, i.e., muddy area or the like, an operator can cause the differential lock mechanism 388 to lock the differential gear mechanism 372 so that the vehicle can more easily move out of the low friction area.

According to this embodiment, a pair of bearings 380 provided at right and left sides of the rear frame 318 can support the intermediate portions of the right and left axles 378. Thus, this embodiment can prevent an excessive load from acting on a rotation support portion between the gear casing 374 (constituting the motor unit 368) and the axle 378. If desired, the differential gear mechanism 372 can include a limited slip differential mechanism (LSD) which can generate a differential limiting force according to a rotational speed difference between two rear wheels 316 or an input torque of the differential gear mechanism 372. For example, the differential gear mechanism 372 can include a limited slip differential mechanism that can adjust the hydraulic force acting on a friction plate. Because the remaining configuration and actions are the same as in the above described eighteenth embodiment illustrated in FIGS. 28 and 29, their description is not repeated. In this embodiment, one of the right and left axles 378 can be constituted by a single axle.

The single motor unit 368 according to this embodiment is provided for the rear wheels 316. However, it is often preferable to provide a similar single motor unit for driving the front wheels. If the same type single motor unit can be used for the front wheels and the rear wheels 316, the number of types of parts (or components) required for the motor units can be reduced. Similar to the single motor unit 368 for the rear wheels 316, the single motor unit provided for the front wheels can include at least one of a clutch, a brake, a differential lock mechanism, and a limited slip differential mechanism. A pair of bearings can be provided at right and left sides of the front frame to support right and left axles of the front wheels in a condition in which they can rotate. Furthermore, the differential lock mechanism is not limited to a device associated with a differential lock on/off switch that enables an operator to manually operate. For example, the differential lock mechanism can be configured to automatically operate in response to detection of slippage of wheels.

Twentieth Exemplary Embodiment

Figure 31:
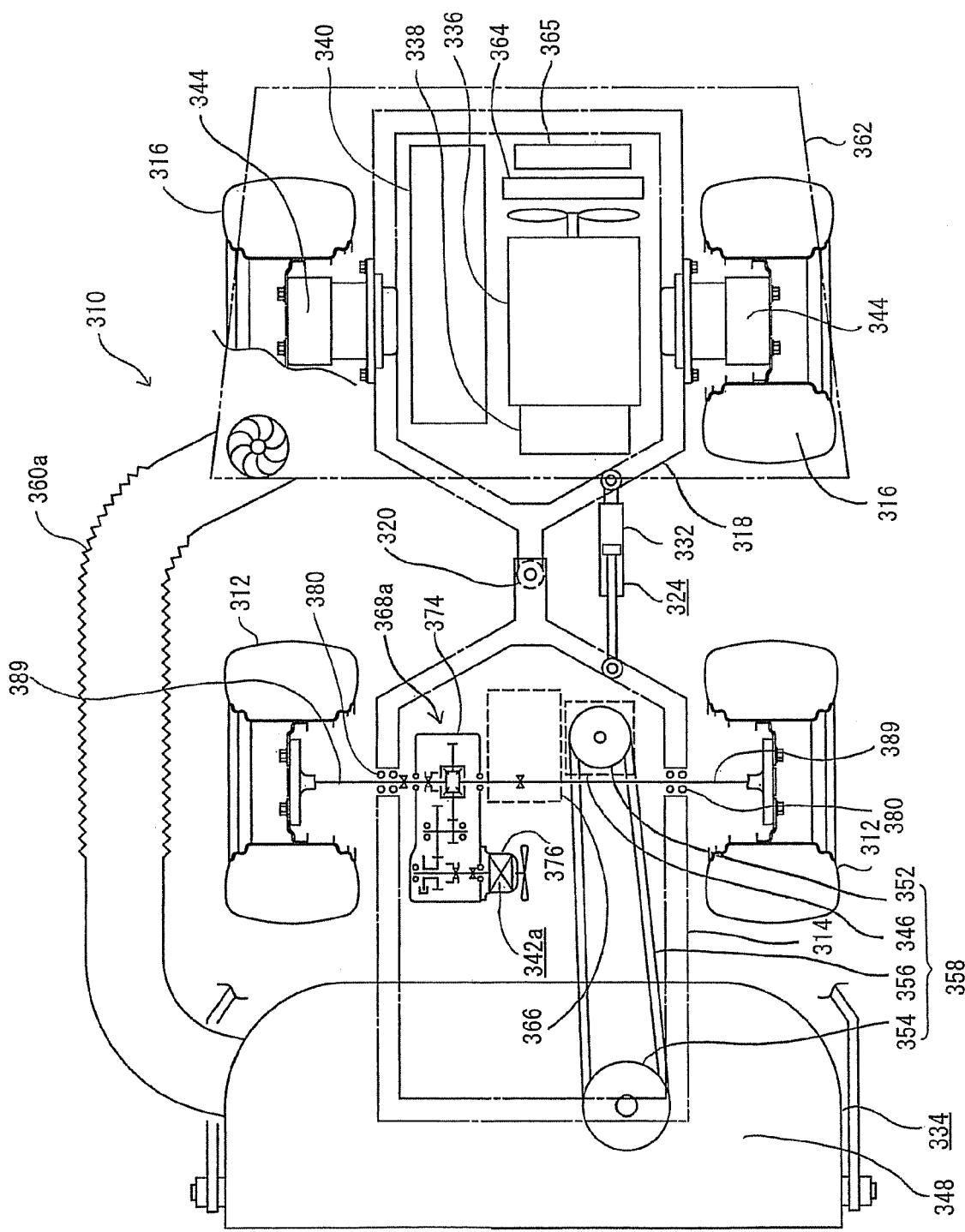
FIG. 31 illustrates a lawnmower vehicle according to a twentieth exemplary embodiment of the present invention, corresponding to FIG. 29.

FIG. 31 illustrates a lawnmower vehicle according to a twentieth exemplary embodiment of the present invention that relates to the second aspect, corresponding to FIG. 29. In addition to the arrangement of the eighteenth exemplary embodiment described in FIGS. 28 and 29, this embodiment includes an electric front-wheel driving motor 342a that can drive two front wheels 312. The electric front-wheel driving motor 342a is an electric traction motor common to the front wheels 312. A single motor unit 368a is fixed to the front frame 314 under the front frame 314.

Similar to the motor unit 368 of the nineteenth exemplary embodiment described in FIG. 30, the motor unit 368a includes the electric front-wheel driving motor 342a commonly used to drive two front wheels 312, the deceleration gear mechanism 370 (refer to FIG. 30) including at least one deceleration stage, and the differential gear mechanism 372 (refer to FIG. 30). The gear casing 374 covering the deceleration gear mechanism 370 and the differential gear mechanism 372 is integrally fixed to the casing 376 constituting the electric front-wheel driving motor 342a. The electric front-wheel driving motor 342a is offset rightward (upward in FIG. 31) from the center of the front frame 314 in the width direction of the vehicle. Furthermore, the motor unit 368a is offset rightward (upward in FIG. 31) from the center of the front frame 314 in the width direction of the vehicle central position.

The right and left front wheels 312 are fixed to right and left axles 389 (FIG. 31) engaged with differential side gears of the differential gear mechanism 372 (refer to FIG. 30). Each axle 389 includes a plurality of shafts connected via constant velocity joints. The driving force of the electric front-wheel driving motor 342a can be transmitted to the right and left front wheels 312 via the deceleration gear mechanism 370 (refer to FIG. 30), the differential gear mechanism 372 (refer to FIG. 30), and the right and left axles 389. Furthermore, two bearings 380 are provided at both ends of the front frame 314 in the width direction. More specifically, the bearing 380 has an outer ring directly fixed to the front frame 314 and supports an intermediate portion of the axle 389 so that the axle 389 can freely rotate.

Furthermore, in this embodiment, the deck 348 constituting the mower 334 is connected to the grass storage tank 362 via the discharge duct 360a. As illustrated in FIG. 31, the discharge duct 360a extends from the deck 348 along a detour passing the outside of the right front wheel 312 and is connected to the grass storage tank 362. Because the remaining configuration and actions are the same as in the above described the eighteenth embodiment illustrated in FIGS. 28 and 29 or the above described the nineteenth embodiment illustrated in FIG. 30, the same reference numerals are assigned to equivalent portions and their description is not repeated.

Twenty-First Exemplary Embodiment

Figure 32:
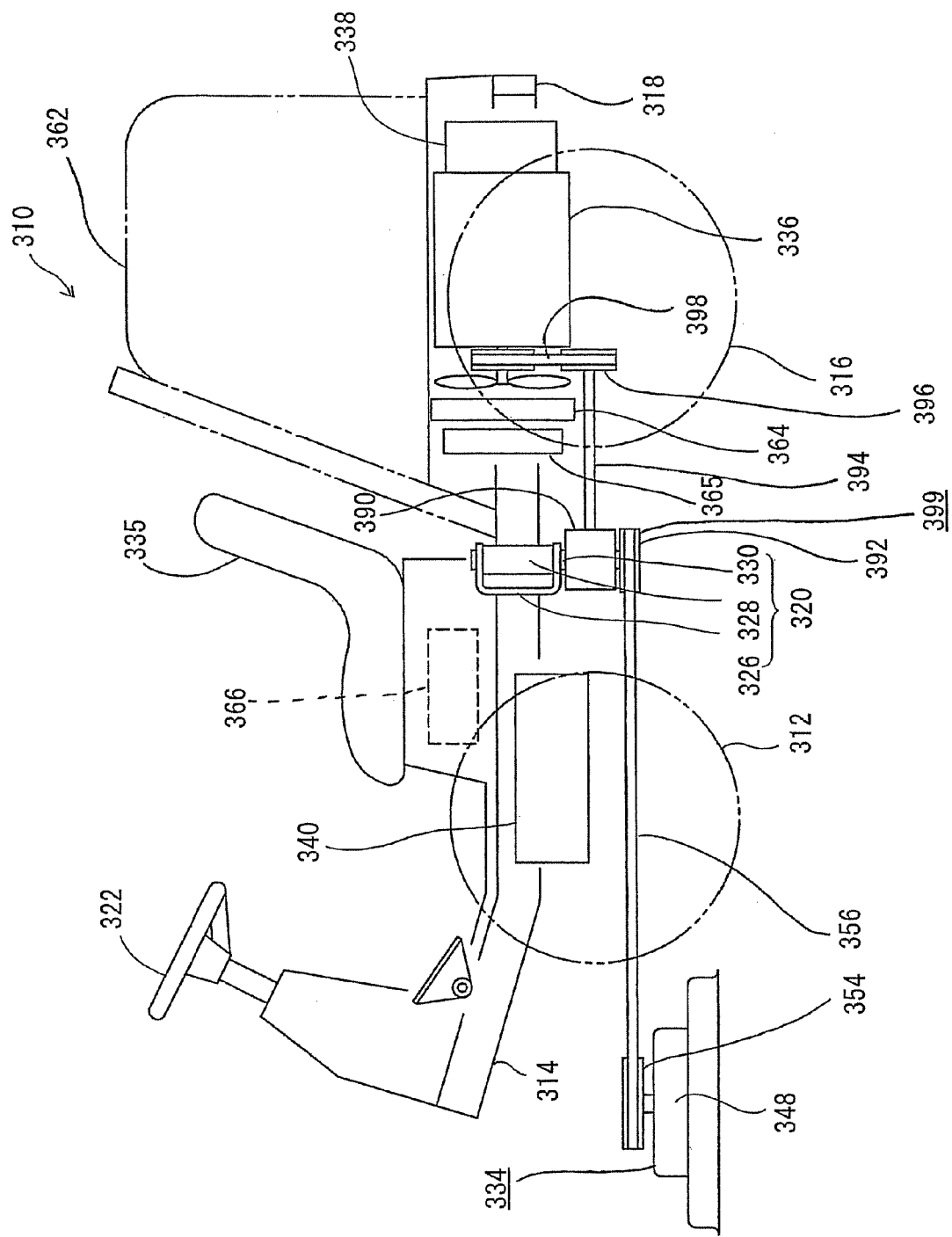
FIG. 32 illustrates an example configuration of a lawnmower vehicle according to a twenty-first exemplary embodiment of the present invention.

FIG. 32 illustrates an example configuration of a lawnmower vehicle according to a twenty-first exemplary embodiment of the present invention that relates to the second aspect. In this embodiment, in addition to the arrangement according to the eighteenth exemplary embodiment described with reference to FIGS. 28 and 29, a mower blade (not illustrated) constituting the mower 334 can be driven by the engine 336. To this end, under the center pin 330 (rotational power transmission shaft) constituting the joint unit 320, a portion protruding from the lower end of a front side connecting member 326 is rotatably supported by a gear casing 390. A first intermediate pulley 392 is fixed to the lower end of the center pin 330.

Furthermore, a driven bevel gear (not illustrated) is fixed to the lower end of the center pin 330 that presents in the gear casing 390. A drive bevel gear (not illustrated) is fixed to the front end (left end in FIG. 32) of a power transmission shaft 394 extending in the horizontal direction. The drive bevel gear meshes with a driven bevel gear. A second intermediate pulley 396 is fixed to the rear end (right end in FIG. 32) of the power transmission shaft 394. A belt 398 is wound around the second intermediate pulley 396 and a drive pulley fixed to the output shaft of the engine 336.

The belt 356 is would around the first intermediate pulley 392 and the driven pulley 354 fixed to a drive shaft of the mower blade. The driven bevel gear fixed to the center pin 330 and the drive bevel gear fixed to the power transmission shaft 394 cooperatively constitute a bevel gear mechanism. The center pin 330 and the first intermediate pulley 392, which are fixed together, constitute an intermediate element 399. The intermediate element 399 can perform power transmission between the power transmission shaft 394 and the belt 356 (two power transmission elements. A swing center of the joint unit 320 connecting the front frame 314 to the rear frame 318 is coaxial with the center pin 330.

When the engine 336 is operated, the driving force of the engine 336 can be transmitted to the mower 334 via the belt 398 wound around the drive pulley and the second intermediate pulley 396, the power transmission shaft 394, the bevel gear mechanism, and the belt 356 wound around the first intermediate pulley 392 and the driven pulley 354. In other words, the belt 398 wound around the drive pulley and the second intermediate pulley 396, the power transmission shaft 394, the bevel gear mechanism, and the belt 356 wound around the first intermediate pulley 392 and the driven pulley 354 cooperatively constitute a power transmission mechanism that can transmit the driving force of the engine 336 to the mower 334. Furthermore, the secondary battery 340 is fixed to the front frame 314 under the driver's seat 335.

According to this embodiment, regardless of the twist angle between the front frame 314 and the rear frame 318, the distance between the intermediate element 399 and the mower 334 does not change. Furthermore, the distance between the intermediate element 399 and the engine 336 does not change. Therefore, this embodiment can use some of the parts (or components) used for a conventional riding lawnmower vehicle in which the driving force of the engine 336 can be transmitted to the mower 334 via the power transmission mechanism, and as a result can realize cost reduction. Furthermore, this embodiment does not require any tension adjustment mechanism for maintaining the tension of the belt 356 at a constant level, although the belt 356 wound around the driven pulley 354 and the first intermediate pulley 392 constitutes one of two power transmission elements configured to transmit the driving force via the intermediate element 399.=Because the remaining configuration and actions are the same as in the above described the eighteenth embodiment illustrated in FIGS. 28 and 29, the same reference numerals are assigned to equivalent portions and their description is not repeated.

Twenty-Second Exemplary Embodiment

Figure 33:
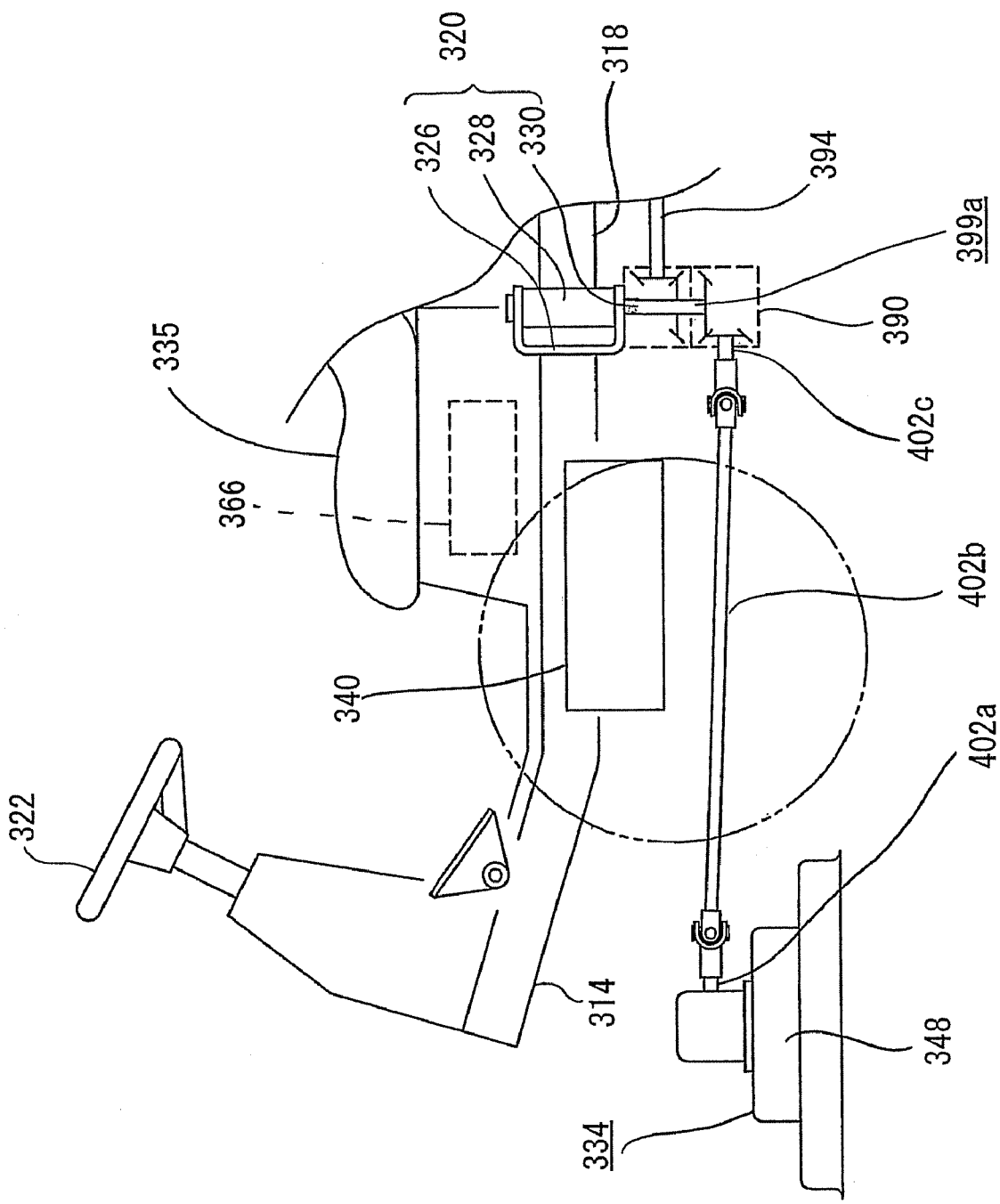
FIG. 33 illustrates a lawnmower vehicle according to a twenty-second exemplary embodiment of the present invention, corresponding to the left portion of FIG. 32.

FIG. 33 illustrates a lawnmower vehicle according to a twenty-second exemplary embodiment of the present invention that relates to the second aspect, corresponding to the left-hand portion of FIG. 32. In this embodiment, in addition to the arrangement of the twenty-first exemplary embodiment described in FIG. 32, the mower blade (not illustrated) constituting the mower 334 can be driven by the engine 336 (refer to FIG. 32). To this end, under the center pin 330 (rotational power transmission shaft) constituting the joint unit 320, a portion protruding from the lower end of the front side connecting member 326 is rotatably supported by the gear casing 390. Two bevel gears are fixed to the lower end of the center pin 330. The bevel gear fixed to the front end of the power transmission shaft 394 meshes with an upper bevel gear among two bevel gears in the gear casing 390.

Furthermore, three power transmission shafts 402a, 402b, and 402c are connected via universal couplings to transmit the driving force. A bevel gear fixed to the rearmost power transmission shaft 402c meshes with a lower bevel gear among two bevel gears in the gear casing 390. Thus, the driving force of the engine 336 can be transmitted to the drive shaft of the mower blade.

In this embodiment, the center pin 330 and two bevel gears, which are fixed with each other, constitute an intermediate element 399a. The intermediate element 399a performs power transmission between two power transmission shafts 394 and 402c (two power transmission elements).

According to this embodiment, regardless of the twist angle between the front frame 314 and the rear frame 318, the distance between the intermediate element 399a and the mower 334 does not change. Furthermore, the distance between the intermediate element 399a and the engine 336 does not change. Therefore, this embodiment can use some of the parts (or components) used for a conventional riding lawnmower vehicle in which the driving force of the engine 336 can be transmitted to the mower 334 via the power transmission mechanism, and as a result can realize cost reduction. Furthermore, this embodiment can use a plurality of power transmission shafts 402a, 402b, and 402c to constitute one of two power transmission elements configured to transmit the driving force via the intermediate element 399a. Because the remaining configuration and actions are the same as in the above described the twenty-first embodiment illustrated in FIG. 32, their description is not repeated.

Twenty-Third Exemplary Embodiment

As understood referring to the description of the seventh exemplary embodiment described with reference to FIGS. 13 and 14, a lawnmower vehicle according to a twenty-third exemplary embodiment of the present invention that relates to the second aspect includes the mower driving motor 38 having a rotational shaft extending in the vertical direction and disposed on the mower 20 corresponding to the mower 334 illustrated in FIGS. 28 and 29 (on the deck 40 corresponding to the deck 348 illustrated in FIGS. 28 and 29). The overall length La of the mower driving motor 38 in the axial direction is shorter than the outer diameter Da of the casing accommodating the mower driving motor 38 (La<Da).

According to this embodiment, the mower 20 is driven by the mower driving motor 38. The overall axial length La of the mower driving motor 38 is set to be shorter than the outer diameter Da. The rotational shaft of the mower driving motor 38 extends in the vertical direction and is disposed on the deck 40 constituting the mower 20, at the altitude higher the mower blade 90 constituting the mower 20. Therefore, the upper end of the mower driving motor 38 can be lowered even if the mower driving motor 38 is disposed on the deck 40 of the mower 20. Therefore, the space between the deck 40 of the mower 20 and the front frame 314 (refer to FIG. 28) can be widened.

Thus, this embodiment can further enhance the efficiency of use of the finite space within the vehicle. Namely, while maintaining a wide space comparable to that of a conventional lawnmower vehicle, the front frame 314 and the rear frame 318 (refer to FIG. 28) can be lowered. The lower space of the vehicle can be effectively used. As a result, the degree of effectively using a limited space of the vehicle can be enhanced. Furthermore, the centroid of the vehicle can be lowered if the front frame 314 and the rear frame 318 are lowered. Because the remaining configuration and actions are the same as in the above described seventh embodiment illustrated in FIGS. 13 and 14 or the above described the eighteenth embodiment illustrated in FIGS. 28 and 29, their description is not repeated.

In this embodiment, the power transmission mechanism between the mower driving motor 38 and the mower 20 can include a gear mechanism including at least one deceleration stage or a chain wound around at least two sprockets. Furthermore, if the power transmission mechanism between the mower driving motor 38 and the mower 20 includes a gear mechanism, the gear mechanism can include a worm deceleration mechanism or a planetary gear deceleration mechanism.

Twenty-Fourth Exemplary Embodiment

A twenty-fourth exemplary embodiment of the present invention that relates to the second aspect is similar to the eighth exemplary embodiment described with reference to FIG. 15 and therefore, in this embodiment, reference numerals are similar to those illustrated in FIG. 15. A lawnmower vehicle according to the twenty-fourth exemplary embodiment of the present invention includes the mower driving motor 38 having a rotational shaft extending in the horizontal direction and disposed on the deck 40 corresponding to the deck 348 illustrated in FIGS. 28 and 29. The front end of the rotational shaft is inserted in the gear cover 100. Furthermore, the overall axial length La of the mower driving motor 38 is longer than the outer diameter Da of the casing accommodating the mower driving motor 38 (La>Da).

According to this embodiment, the mower 20 is driven by the mower driving motor 38. The overall axial length La of the mower driving motor 38 is set to be longer than the outer diameter Da. The rotational shaft of the mower driving motor 38 extends in the horizontal direction and is disposed on the deck 40 constituting the mower 20, at the altitude higher the mower blade 90 constituting the mower 20. Therefore, similar to the above-described twenty-third exemplary embodiment, the upper end of the mower driving motor 38 can be lowered even if the mower driving motor 38 is disposed on the deck 40 of the mower 20.

Therefore, the space between the deck 40 of the mower 20 and the front frame 314 (refer to FIG. 28) can be widened. Thus, this embodiment can still further enhance the efficiency of use of the finite space within the vehicle. Namely, while maintaining a wide space comparable to that of a conventional lawnmower vehicle, the front frame 314 and the rear frame 318 (refer to FIG. 28) can be lowered. The lower space of the vehicle can be effectively used. As a result, the degree of effectively using a limited space of the vehicle can be enhanced. Furthermore, the centroid of the vehicle can be lowered if the front frame 314 and the rear frame 318 are lowered. Because the remaining configuration and actions are the same as in the above described eighth embodiment illustrated in FIG. 15 or the above described the eighteenth embodiment illustrated in FIGS. 28 and 29, their description is not repeated.

In this embodiment, the power transmission mechanism between the mower driving motor 38 and the mower 20 can include a gear mechanism including at least one deceleration stage including a belt wound around at least two pulleys or a chain wound around at least two sprockets. Furthermore, if the power transmission mechanism between the mower driving motor 38 and the mower 20 includes a gear mechanism, the gear mechanism can include a worm deceleration mechanism or a planetary gear deceleration mechanism.

Twenty-Fifth Exemplary Embodiment

A twenty-fifth exemplary embodiment of the present invention that relates to the second aspect is similar to the embodiment described with reference to FIG. 16 and therefore, in this embodiment, reference numerals similar to those illustrated in FIG. 16 are employed for corresponding components. In the twenty-fifth exemplary embodiment, the motor support 106 including a bottom plate portion is fixed to one side of the deck 40 (right in FIG. 16) corresponding to the deck 348 illustrated in FIGS. 28 and 29 which constitutes the mower 20 corresponding to the lawnmower 334 illustrated in FIGS. 28 and 29. The mower driving motor 38 has a casing fixed to the bottom plate portion of the motor support 106. The rotational shaft of the mower driving motor 38 protrudes upward from the casing. In a state where the mower driving motor 38 is positioned at one side of the deck 40 of the mower 20, the rotational shaft of the mower driving motor 38 extends in the vertical direction. Furthermore, the belt 96 is wound around the driven pulley 92 fixed to the drive shaft of the mower blade 90 provided in the deck 40 and the drive pulley 94 fixed to the rotational shaft of the mower driving motor 38. Because the remaining configuration and actions are the same as in the above described the eighteenth embodiment illustrated in FIGS. 28 and 29 or the above described the twenty-third embodiment, their description is not repeated.

In the above-described twenty-third through twenty-fifth exemplary embodiments, the mower driving motor 38 (refer to FIGS. 13 through 16) can include a braking mechanism. The braking mechanism is, for example, an electric type or a hydraulic type or a mechanical type that can press both surfaces of a frictional disc plate fixed to the rotational shaft of the mower driving motor 38. The braking mechanism can stop the rotating shaft of the mower driving motor 38. For example, if the braking mechanism is an electric type, the frictional disc plate can be disposed between two pressing members. One of two pressing members is fixed to a movable iron core disposed inside a coil and shifting in the axial direction in response to an operation signal input via an operation unit.

The above-described braking mechanism can be incorporated into the mower driving motor 346 constituting the lawnmower vehicle 310 according to the eighteenth exemplary embodiment illustrated in FIGS. 28 and 29 or the twentieth exemplary embodiment illustrated in FIG. 31. Furthermore, in the above-described twenty-third through twenty-fifth exemplary embodiments, the mower driving motor 38 (refer to FIGS. 13 through 16) can be an electric motor or a hydraulic motor.

Furthermore, one of the above-described twenty-third through twenty-fifth exemplary embodiments can be combined with any of the above-described nineteenth and twentieth exemplary embodiments illustrated in FIG. 30 and FIG. 31.

Twenty-Sixth Exemplary Embodiment

A twenty-sixth exemplary embodiment of the present invention that relates to the second aspect is similar to the thirteenth exemplary embodiment described with reference to FIG. 21 and therefore, in this embodiment, reference numerals similar to those illustrated in FIG. 21 are employed for corresponding components. The twenty-sixth exemplary embodiment differs from the eighteenth exemplary embodiment described with reference to FIGS. 28 and 29 in that the rotational force of the rotary shaft 152 of the first electric motors 16 (or the second electric motors 18), corresponding to the electric front-wheel driving motors 342 (or the electric rear-wheel driving motors 344), can be transmitted via two-stage planetary gear mechanisms 154a and 154b to the main drive wheel 12 (or 14) corresponding to the front wheels 312 (or the rear wheels 316) illustrated in FIGS. 28 and 29. Because the remaining configuration and actions are the same as in the above described the thirteenth embodiment illustrated in FIG. 21 or the above described the eighteenth embodiment illustrated in FIGS. 28 and 29, their description is not repeated.

The structure for transmitting the rotational force from the electric motors 16 and 18 to the front wheels 312 or the rear wheels 316, corresponding to the front wheels 312 or the rear wheels 316 illustrated in FIGS. 28 and 29, is not limited to the gear mechanism including two deceleration stages and therefore can be replaced with a gear mechanism including one or three deceleration stages. Furthermore, the rotational force of the electric motor 16 (or 18) can be transmitted to the main drive wheel 12 (or 14) without using any deceleration mechanism.

In the above-described eighteenth through twenty-sixth exemplary embodiments, the grass storage tank 362 disposed on the rear side of the driver's seat 335 can be omitted. In this case, the secondary battery 340 fixed to the rear frame 318 can be replaced with a larger, higher capacity battery. Furthermore, if the grass storage tank 362 is omitted, the discharge duct 360 can be also omitted. The grass cut by the mower 334 can be discharged to one side of the mower 334 directing in the width direction of the lawnmower vehicle 310.

Furthermore, for the purpose of cost reduction, a manufacturer of the lawnmower vehicle 310 can use common components for manufacturing both the lawnmower vehicle 310 that does not include the grass storage tank 362 and the lawnmower vehicle 310 equipped with the grass storage tank 362. For example, the front frame 314 and the rear frame 318 can be commonly used for the lawnmower vehicle 310 that does not include the grass storage tank 362 and the lawnmower vehicle 310 equipped with the grass storage tank 362.

Furthermore, the lawnmower vehicle described in the above-described eighteenth through twenty-sixth exemplary embodiments can be configured into a full-electric type vehicle that does not include the engine 336 and supplies electric power from the secondary battery 340 to either one or both of the electric front-wheel driving motors 342 (or 342*a*) and the electric rear-wheel driving motors 344 (or 344*a*) to drive the front wheels 312 and the rear wheels 316. The secondary battery 340 stores electric energy supplied from an external power source.

For example, a plug-in system enables the secondary battery 340 to store electric energy supplied from an external power source. Furthermore, for the purpose of cost reduction, a manufacturer of the lawnmower vehicle 310 can use common components when manufacturing both a hybrid-type lawnmower vehicle 310 that includes the engine 336, the generator 338, the electric motors 342, 342*a*, 344, and 344*a*, and a full-electric type lawnmower vehicle that does not include the engine 336 and the generator 338. For example, the front frame 314 and the rear frame 318 can be commonly used for the hybrid-type lawnmower vehicle 310 and the full-electric type lawnmower vehicle.

Furthermore, the lawnmower vehicles described in the above-described eighteenth through twenty-sixth exemplary embodiments can be configured to drive the front wheels 312 (or the rear wheels 316) by the engine 336 and drive the rear wheels 316 (or the front wheels 312) by electric motors.

Furthermore, the electrically driven motors described in the above-described embodiments (i.e., the first electric motors 16, the second electric motors 18, the electric front-wheel driving motors 342, the electric rear-wheel driving motors 344, and the like) can be a permanent-magnet synchronous motor, a synchronous reluctance motor using reluctance torque, an axial gap motor, or a vertical solid shaft motor. The axial gap motor includes a pair of rotors disposed in a confronting relationship with a predetermined gap in the axial direction at both sides of a disc-shaped stator. The vertical solid shaft motor includes a stator fixed to a wire-wound stationary shaft and a circular or cylindrical permanent-magnet rotor disposed around the stator. The stator includes a plurality of stator groups. Each stator group includes salient poles protruding in the radial direction. If the motor is a permanent-magnet synchronous motor or a synchronous reluctance motor, the motor can produce a large torque and can be downsized.

Furthermore, the electrically driven motors described in the above-described embodiments (i.e., the first electric motors 16, the second electric motors 18, the electric front-wheel driving motors 342, and the electric rear-wheel driving motors 344 and the like) can be integrated into a motor unit with at least one of an inverter and a controller and can be installed on the lawnmower vehicle 10, 10*a*, 10*b*, and 310.

Furthermore, the lawnmower vehicles described in the above-described embodiments can include an on-vehicle network for the integrated control of the electrically driven motors (i.e., the first electric motors 16, the second electric motors 18, the electric front-wheel driving motors 342, the electric rear-wheel driving motors 344, and the like) based on electric signals obtained from various sensors that detect operation amounts of various operation units (the operating levers 28 and the steering wheel 74 or 322) and other electric components installed on the vehicle.

For example, the on-vehicle network employable for the lawnmower vehicle is CANbus or FlexRay. The on-vehicle network is based on a multiplex communication system using a single wire capable of transmitting control signals to a plurality of electric devices. The CANbus network enables each device to perform communication when the need arises. The FlexRay network allocates a transmission right to each device at predetermined timing. This is generally referred to as "time-trigger type" multiplex communication system. Compared to the CANbus network, the FlexRay network enables each device to promptly start its operation and realize high-speed signal transmission. In particular, it is preferable to employ the FlexRay network in the X-by-Wire system that controls an electric motor or other electric device according to an operation amount of a steering wheel, a brake, or an accelerator pedal of the vehicle.

Twenty-Seventh Exemplary Embodiment

Figure 34:
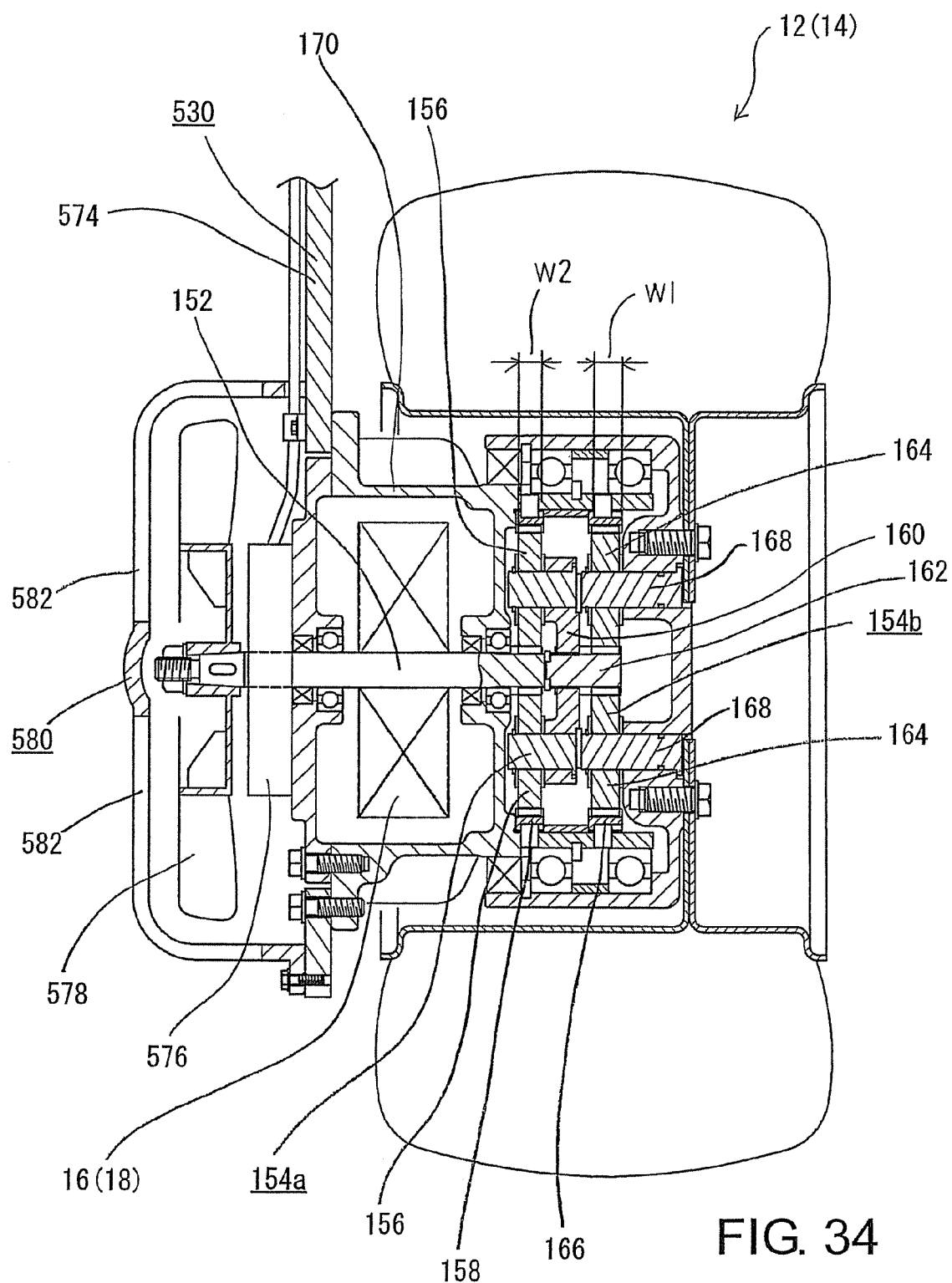
FIG. 34 illustrates a cross-sectional view of a driving portion for the main drive wheel according to a twenty-seventh exemplary embodiment of the present invention.

A twenty-seventh exemplary embodiment of the present invention that relates to a third aspect is described below with reference to FIG. 34. In this embodiment, reference numerals of elements are similar to those used in the first exemplary embodiment illustrated in FIGS. 1 and 2 or the thirteenth exemplary embodiment illustrated in FIG. 21. FIG. 34 illustrates a cross-sectional view of a driving portion for the main drive wheel 12 (or 14) according to this embodiment. As illustrated in FIG. 34, in this embodiment, the rotational force of the rotary shaft 152 of the first electric motor 16 (or the second electric motor 18) can be transmitted to the main drive wheel 12 (or 14) via two-stage planetary gear mechanisms 154*a* and 154*b*.

Furthermore, a motor control unit 576 is fixed to an inner surface (left side in FIG. 34) of a vertical plate portion 574 (constituting a main frame 530) near the other end of the rotary shaft 152 (left end in FIG. 34). The motor control unit 576 includes an inverter. Alternatively, the motor control unit 576 can include both an inverter and a DC/DC converter. Furthermore, a cooling fan 578 is fixed to the other end of the rotary shaft 152 (left end in FIG. 34). A cover 580 accommodating the cooling fan 578 and the motor control unit 576 is fixed to the inner surface (left side in FIG. 34) of the vertical plate portion 574. The cover 580 includes through-holes 582 formed at a plurality of portions. Each through-hole 582 is a communication hole connecting the inner space of the cover 580 to the outside.

If the structure illustrated in FIG. 34 is inversed in the right-and-left direction, the structure can be applied to the other main drive wheel 14 (not illustrated). The structure for transmitting the rotational force from the electric motors 16 and 18 to the main drive wheels 12 and 14 is not limited to the gear mechanism including two deceleration stages and therefore can be replaced with a gear mechanism including one or three deceleration stages. Furthermore, the rotational force of the electric motor 16 (or 18) can be transmitted to the main drive wheel 12 (or 14) without using any deceleration mechanism.

According to this embodiment, the cooling fan 578 is fixed to the rotary shaft 152 of the first electric motor 16 (or the second electric motor 18) provided on the driving portion for the main drive wheel 12 (or 14). Therefore, the cooling fan 578 starts rotating in synchronism with rotation of the rotary shaft 152 of the electric motor 16 (or 18). The electric motor 16 (or 18) can be efficiently cooled by air for cooling flowing from the cooling fan 578. As a result, an improved cooling system for the electric motors 16 and 18 can be realized.

Furthermore, as illustrated in FIGS. 1 and 2, the mower driving motor 38 according to this embodiment is disposed in the stream of air for cooling flowing against the radiator 50 and the oil cooler 52. Therefore, the mower driving motor 38 can be efficiently cooled. It is also possible to dispose the mower driving motor 38 in the stream of air for cooling flowing against at least one of the radiator 50 and the oil cooler 52. Furthermore, similar to the thirteenth exemplary embodiment illustrated in FIG. 21, this embodiment can include the braking device 172 (refer to FIG. 21) provided at the other end (left side in FIG. 34) of the rotary shaft 152. The braking device 172 applies a braking force to the main drive wheel 12.

Twenty-Eighth Exemplary Embodiment

Figure 35:
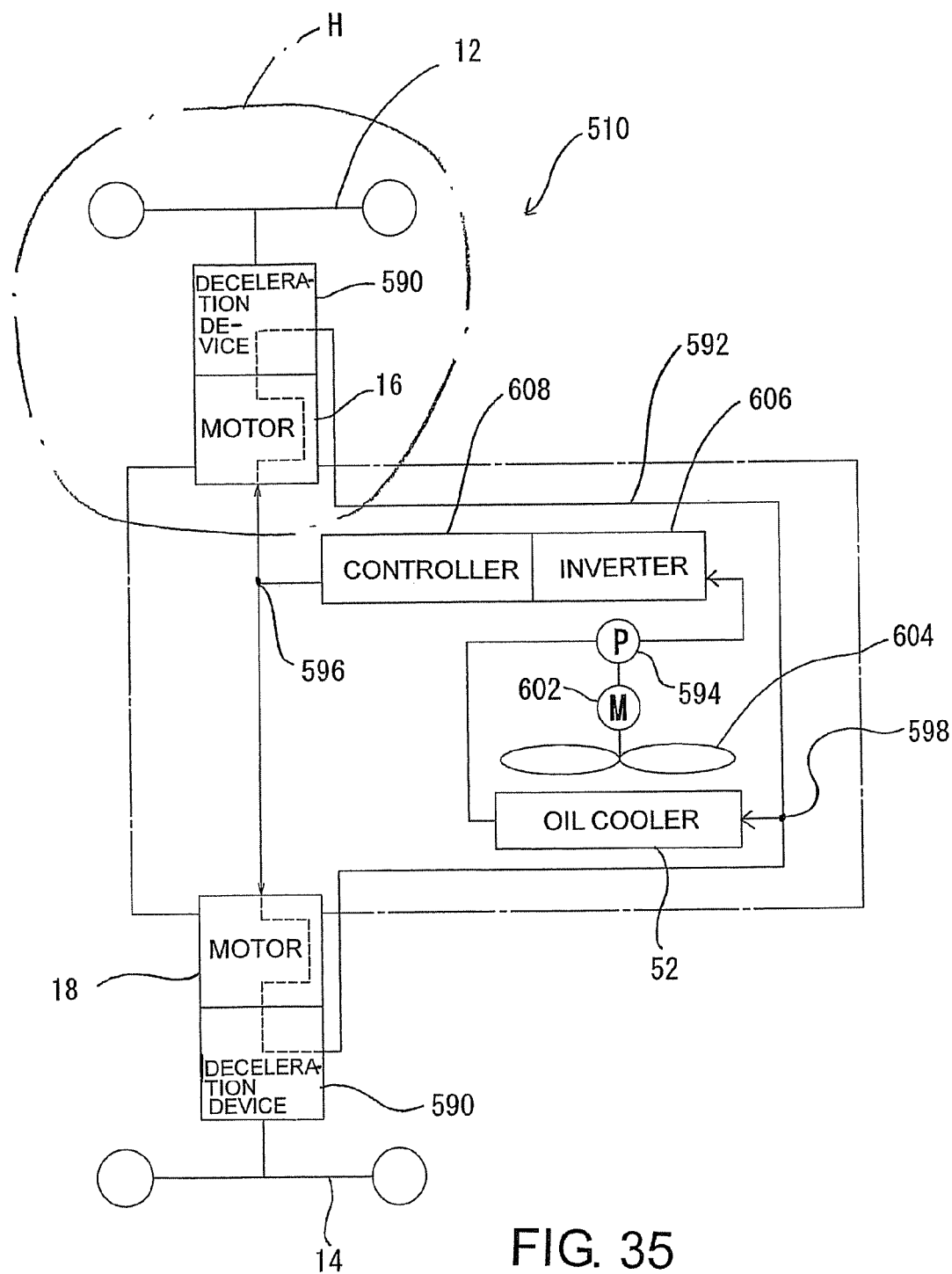
FIG. 35 is a circuit diagram illustrating a cooling system for first and second electric motors according to a twenty-eighth exemplary embodiment of the present invention.

FIG. 35 is a circuit diagram illustrating a cooling system for the first electric motor 16 and the second electric motor 18 according to the twenty-eighth exemplary embodiment of the present invention that relates to the third aspect. A lawnmower vehicle 510 according to this embodiment is configured to supply cooling oil to the first electric motor 16 and the second electric motor 18 that drive two (right and left) main drive wheels 12 and 14 and to two deceleration devices 590 (reduction gear units) that can transmit the driving force of the first electric motor 16 and the second electric motor 18 to the main drive wheels 12 and 14, in addition to the arrangement of the twenty-seventh exemplary embodiment illustrated in FIG. 34.

More specifically, a hydraulic circuit 592 (i.e., coolant channel) includes a hydraulic pump 594 (i.e., coolant pump). The oil (coolant) discharged from the hydraulic pump 594 is separated or branched at a bifurcated portion 596 and supplied to respective (right and left) electric motors 16 and 18. The cooling oil flowing through the electric motor 16 and an associated deceleration device 590 meets at an interflow portion 598 with the cooling oil flowing through the electric motor 18 and an associated deceleration device 590. Then, the cooling oil flows into the oil cooler 52. The oil cooler 52 has an oil outlet connected to an oil inlet of the hydraulic pump 594. According to the cooling system of this embodiment, the single hydraulic pump 594 supplies cooling oil circulating in the hydraulic circuit 592 and can be commonly used to supply cooling oil to the first and second electric motors 16 and 18 as well as to the right and left deceleration devices 590.

Furthermore, a cooling fan 604 is fixed to the rotational shaft of an electric motor 602 that drives the hydraulic pump 594. The cooling fan 604 can supply air for cooling to the oil cooler 52. Namely, the electric motor 602 can be commonly used to drive the hydraulic pump 594 and the cooling fan 604. Furthermore, the hydraulic circuit 592 includes an inverter 606 and a controller 608 which are disposed between the hydraulic pump 594 and the bifurcated portion 596. The inverter 606 can be used to drive the first electric motor 16 and the second electric motor 18. The controller 608 is a control circuit unit capable of controlling the inverter 606. The oil is discharged from an outlet port of the hydraulic pump 594 and flows through a cooling channel provided in the inverter 606 and the controller 608.

According to this embodiment, the single hydraulic pump 594 supplies cooling oil circulating in the hydraulic circuit 592 and can be commonly used to cool the first electric motor 16 and the second electric motor 18. Thus, the cooling system according to this embodiment can efficiently cool the first electric motor 16 and the second electric motor 18. Furthermore, the hydraulic circuit 592 is configured to circulate cooling oil to the first electric motor 16 and the second electric motor 18 and also to the controller 608 and the inverter 606. Thus, the cooling system according to this embodiment can efficiently cool the controller 608 and the inverter 606. It may also be preferable to configure the hydraulic circuit 592 to cool only one of the controller 608 and the inverter 606 with the circulating oil from the first electric motor 16 and the second electric motor 18. Because the remaining configuration and actions are the same as in the above described the twenty-seventh embodiment illustrated in FIG. 34 or the above described first embodiment illustrated in FIGS. 1 and 2, their description is not repeated.

Twenty-Ninth Exemplary Embodiment

Figure 36:
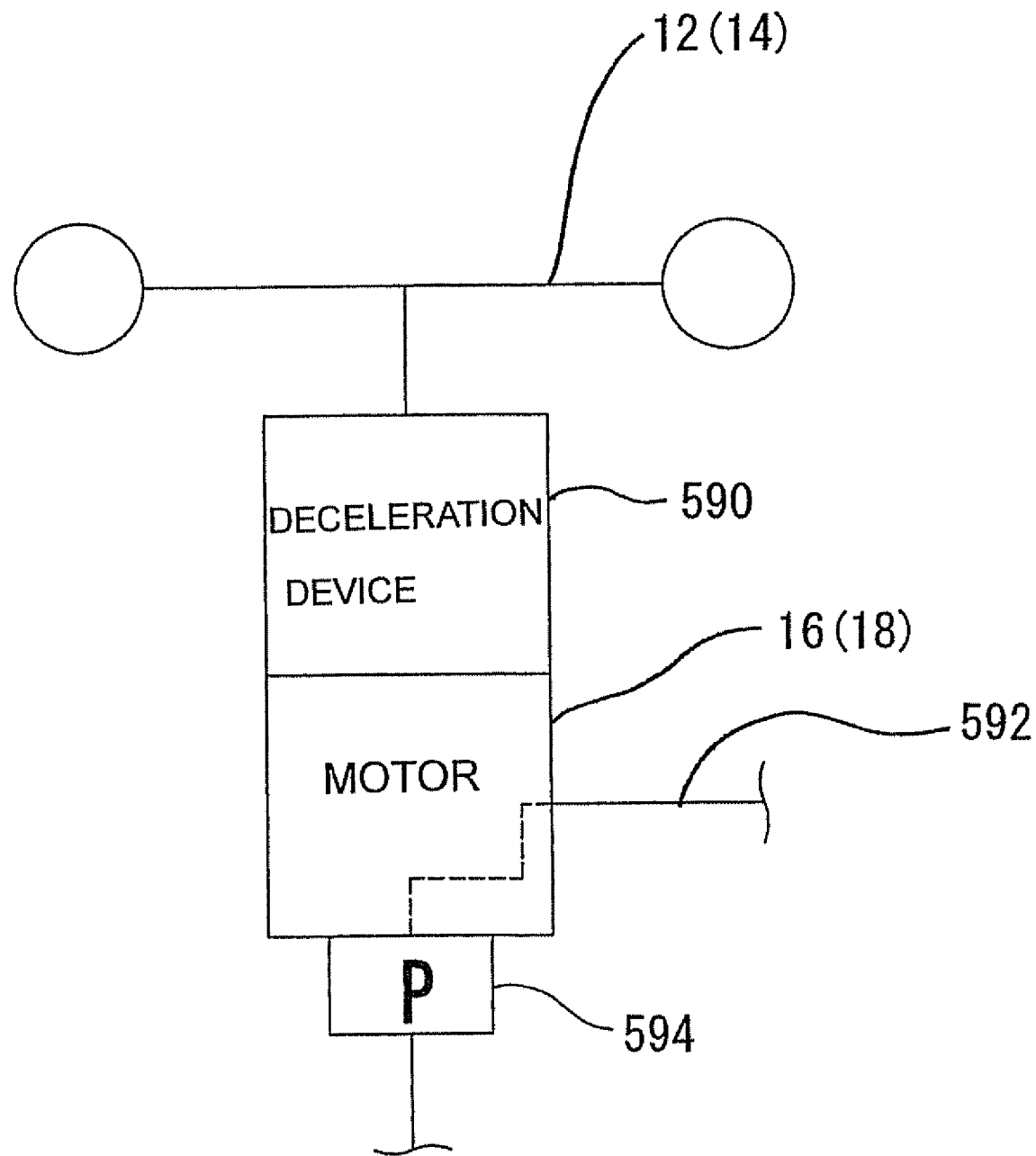
FIG. 36 is an illustration of a portion corresponding to an H portion illustrated in FIG. 35 according to a twenty-ninth exemplary embodiment of the present invention.

FIG. 36 is an illustration of a portion corresponding to the H portion illustrated in FIG. 35 according to a twenty-ninth exemplary embodiment of the present invention that relates to the third aspect. The lawnmower vehicle according to this embodiment includes the hydraulic circuit 592 supplying cooling oil to the first electric motor 16 (or the second electric motor 18) that drives the main drive wheel 12 (or 14) in the twenty-eighth exemplary embodiment described in FIG. 35.

According to this embodiment, the cooling oil circulating in the hydraulic circuit 592 is not supplied to the deceleration device 590 that transmits the driving force of the first electric motor 16 while decelerating to the main drive wheel 12. Instead, lubricating oil or grease is stored in a sealed casing accommodating the deceleration device 590. If lubricating oil is stored in the casing of the deceleration device 590, the liquid lubricating oil can circulate inside the casing according to rotation of a gear constituting the deceleration device 590, or mist lubricating oil can lubricate inside the casing. It is also preferable to provide a dry sump system that includes a circulation pump (not illustrated) driven by a gear constituting the deceleration device 590 to supply lubricating oil to the deceleration device 590 via an external oil tank (not illustrated) for cooling the deceleration device 590.

Furthermore, the hydraulic pump 594 is positioned next to the first electric motor 16. The rotational shaft of the first electric motor 16 is integrated with the rotational shaft of the hydraulic pump 594. If the first electric motor 16 rotates, the hydraulic pump 594 is driven by the rotational shaft of the first electric motor 16 and supplies lubricating oil that circulates in the hydraulic circuit 592 including the first electric motor 16. If the structure illustrated in FIG. 36 is inversed in the right-and-left direction, the structure can be applied to the other main drive wheel 14 (not illustrated). Furthermore, the hydraulic pump 594 disposed between the inverter 606 and the oil cooler 52 illustrated in FIG. 35 can be omitted from the hydraulic circuit 592 according to this embodiment.

According to this embodiment, the driving force of the first electric motor 16 and the second electric motor 18 can be transmitted via the deceleration device 590 to the main drive wheels 12 and 14. The cooling oil is supplied to the first electric motor 16 and the second electric motor 18. Furthermore, lubricating oil or grease is stored in the sealed casing of the deceleration device 590. The cooling oil for the electric motors 16 and 18 is not used for the deceleration device 590. Therefore, the cooling system according to this embodiment can efficiently cool the electric motors 16 and 18. Because the remaining configuration and actions are the same as in the above described the twenty-eighth embodiment illustrated in FIG. 35 or the above described first embodiment illustrated in FIGS. 1 and 2, their description is not repeated.

Thirtieth Exemplary Embodiment

Figure 37:
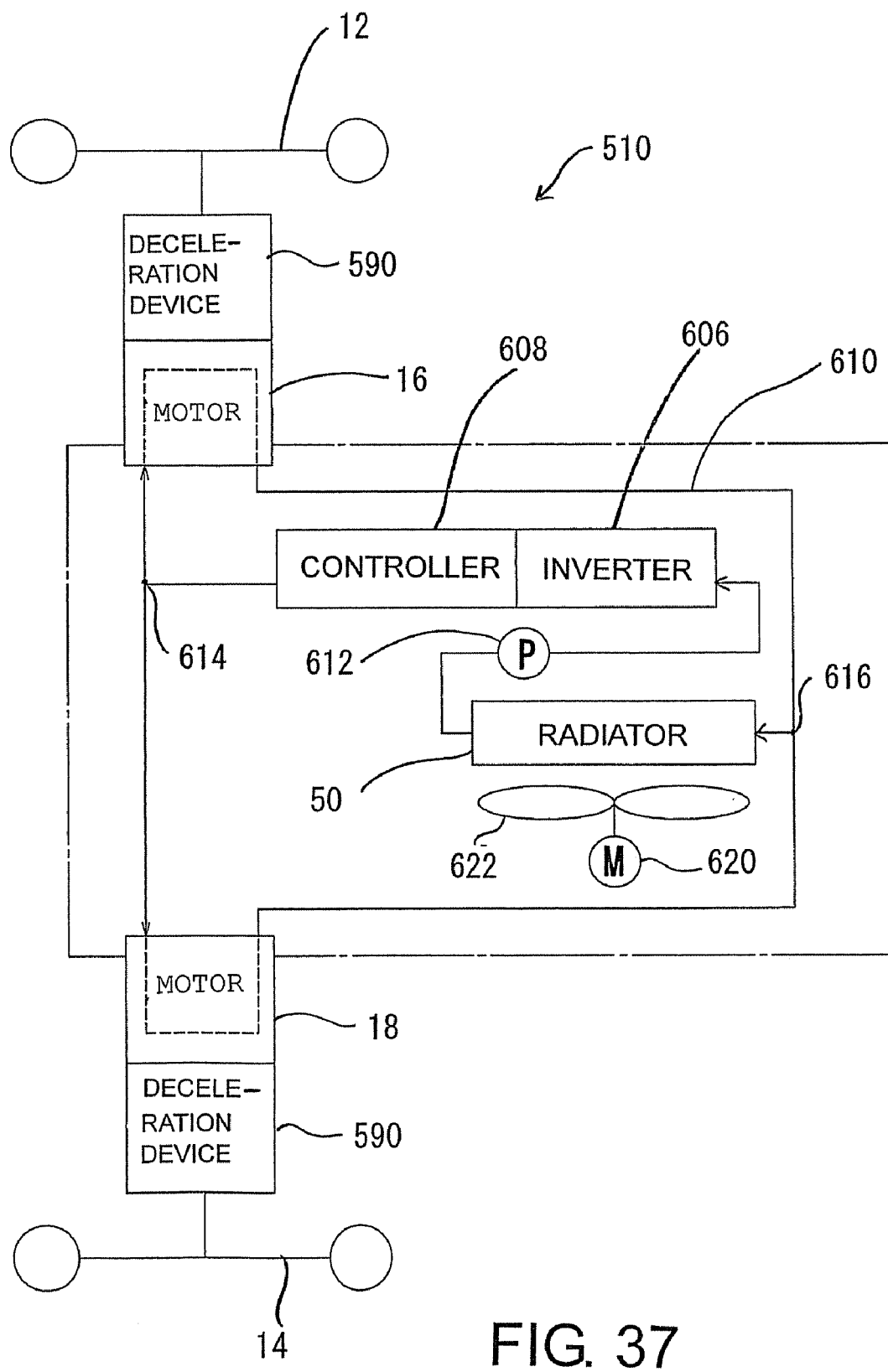
FIG. 37 is a circuit diagram illustrating a cooling system for first and second electric motors according to a thirtieth exemplary embodiment of the present invention.

FIG. 37 is a circuit diagram illustrating a cooling system for the first electric motor 16 and the second electric motor 18 according to a thirtieth exemplary embodiment of the present invention that relates to the third aspect. The lawnmower vehicle 510 according to this embodiment is configured to supply cooling water to the first electric motor 16 and the second electric motor 18 that drive two (right and left) main drive wheels 12 and 14, in addition to the arrangement of the twenty-seventh exemplary embodiment illustrated in FIG. 34 (which is based on the arrangement illustrated in FIGS. 1 and 2). More specifically, a cooling water circuit 610 (i.e. coolant channel) includes a coolant pump 612. The cooling water (coolant) discharged from the cooling water pump 612 is separated or branched at a bifurcated portion 614 and supplied to respective (right and left) electric motors 16 and 18.

The cooling water flowing through the electric motor 16 meets at an interflow portion 616 with the cooling water flowing through the electric motor 18. As such, no cooling water is supplied to the deceleration device 590. Then, the cooling water flows into the radiator 50. The radiator 50 has a cooling water outlet connected to a cooling water inlet of the cooling water pump 612. According to the cooling system of this embodiment, the single hydraulic pump 612 supplies cooling water circulating in the cooling water circuit 610 and can be commonly used to supply cooling water to the first and second electric motors 16 and 18.

Furthermore, a cooling fan 622 is fixed to the rotational shaft of an electric motor 620. The cooling fan 622 can supply air to cool the radiator 50. Furthermore, the cooling water circuit 610 includes the inverter 606 and the controller 608 (control circuit unit) which are disposed between the cooling water pump 612 and the bifurcated portion 614. The cooling water is discharged from an outlet port of the cooling water pump 612 and flows in a cooling channel provided in the inverter 606 and the controller 608.

Similar to the twenty-ninth exemplary embodiment described in FIG. 36, lubricating oil or grease is stored in a sealed casing accommodating the deceleration device 590 (reduction gear unit) corresponding to the first electric motor 16 (or the second electric motor 18). If lubricating oil is stored in the casing of the deceleration device 590, the liquid lubricating oil can circulate inside the casing according to rotation of a gear constituting the deceleration device 590, or mist lubricating oil can lubricate inside the casing. It is also preferable to provide a dry sump system that includes a circulation pump (not illustrated) driven by a gear constituting the deceleration device 590 to supply lubricating oil to the deceleration device 590 via an external oil tank (not illustrated) for cooling the deceleration device 590.

According to this embodiment, the single cooling water pump 612 supplies cooling water circulating in the cooling water circuit 610 which can be used to cool both the first electric motor 16 and the second electric motor 18. Thus, the cooling system according to this embodiment can efficiently cool both the first electric motor 16 and the second electric motor 18. Furthermore, the cooling water circuit 610 is configured to circulate cooling water to cool the first electric motor 16 and the second electric motor 18 and also to the controller 608 and the inverter 606. Thus, the cooling system according to this embodiment can also efficiently cool the controller 608 and the inverter 606.

It may also be preferable to configure the cooling water circuit 610 to cool only one of the controller 608 and the inverter 606 with the circulating water from the first electric motor 16 and the second electric motor 18. Furthermore, lubricating oil or grease is stored in the sealed casing accommodating the deceleration device 590. Thus, the deceleration device 590 does not use any cooling water from the electric motors 16 and 18. The cooling system according to this embodiment can efficiently cool the electric motors 16 and 18. Furthermore, the electric motor 620 driving the cooling fan 622 can be replaced with the engine driving the cooling fan 622. In this case, the cooling water can be used to cool the engine. Because the remaining configuration and actions are the same as in the above described the twenty-seventh embodiment illustrated in FIG. 34 or the above described first embodiment illustrated in FIGS. 1 and 2, their description is not repeated.

Although not illustrated in the drawings, in each of the above-described embodiments, cooling fins can be provided on the outer surface of the casing accommodating at least one of the electric steering motor that changes the orientation of the caster wheel 22 or 24 (refer to FIGS. 1 and 2) and the electric drive motor that drives the caster wheel 22 or 24. According to this arrangement, at least one of the electric steering motor that changes the orientation of the caster wheel 22 or 24 (refer to FIGS. 1 and 2) and the electric drive motor that drives the caster wheel 22 or 24 can be efficiently cooled with natural air (namely, without using any cooling fan driven by a motor).

Furthermore, although not illustrated in the drawings, in the twenty-seventh through thirtieth exemplary embodiments described in FIGS. 34 through 37, an oil piping constituting the hydraulic circuit 592 or a cooling water piping (e.g., a hose) constituting the cooling water circuit 610 can be disposed inside two vertical plate portions 574 protruding from both ends of the main frame 530 that supports the main drive wheels 12 and 14. That is, an appropriate pipe for cooling can be disposed inside the main frame 530. The above-described arrangement can enhance the degree of efficiency of use of a limited space of the lawnmower vehicle 510 including the oil piping or the cooling water piping and can effectively prevent the oil piping or the cooling water piping from being damaged.

Furthermore, in the twenty-seventh through thirtieth exemplary embodiments described in FIGS. 34 through 37, the casing accommodating the hydraulic pump 594 or the cooling water pump 612 and the casing accommodating the first electric motor 16 or the second electric motor 18 can be integrated together into a motor unit. The hydraulic pump 594 or the cooling water pump 612 can be a built-in pump accommodated in the motor unit including the first electric motor 16 or the second electric motor 18. Furthermore, in the twenty-seventh through thirtieth exemplary embodiments described in FIGS. 34 through 37, the mower driving motor 38 (refer to FIGS. 1 and 2) can be configured to be cooled with the oil flowing in the hydraulic circuit 592 or the cooling water flowing in the cooling water circuit 610.

Furthermore, in the twenty-seventh through thirtieth exemplary embodiments described in FIGS. 34 through 37, the lawnmower vehicle can be configured into a full-electric type vehicle that does not include the engine 32 (refer to FIGS. 1 and 2) and can drive the main drive wheels 12 and 14 by supplying electric power from the secondary battery 36 (refer to FIG. 2) to the first electric motor 16 and the second electric motor 18. In this case, the secondary battery 36 stores electric energy supplied from an external power source. For example, a plug-in system enables the secondary battery 36 to store electric energy supplied from an external power source.

What is claimed is:

1. A riding lawnmower vehicle comprising:
    a right main drive wheel and left main drive wheel;
    at least one caster wheel;
    right and left electric traction motors, each provided on a right and left end of a main frame constituting a vehicle body;
    a driver's seat provided on top of the main frame;
    a mower working machine provided under the main frame and driven by an electric motor for driving the mower working machine;
    a secondary battery that is supported by the main frame and supplies electric power to the right and left electric traction motors and the motor for driving the mower working machine; and
    a control unit that controls operation of the right and left electric traction motors,
    wherein the right and left main drive wheels are respectively supported at a left end and a right end of the main frame, and independently driven by the right and left electric traction motors, which can operate as traction power sources,
    when viewed from one end to the other end in the width direction of the vehicle, the main drive wheels overlap at least a part of the secondary battery;
    when viewed from one end to the other end in the width direction of the vehicle, the right and left electric traction motors overlap the main drive wheels; and
    at least part of the control unit is positioned on a top surface side of the main frame and under the driver's seat.

2. The riding lawnmower vehicle according to claim 1, wherein
    the right and left main drive wheels are respectively supported at a rear portion of the mainframe;
    the caster wheel is supported at a more forward portion of the main frame than the right and left main drive wheels;
    the mower working machine is positioned between the right and left main drive wheels and the caster wheel in a front to rear direction; and
    the secondary battery is positioned at the rear side of the driver's seat.

* * * * *